United States Patent [19]

Bachman

[11] Patent Number: 4,523,280

[45] Date of Patent: Jun. 11, 1985

[54] SPREADER CONTROL

[75] Inventor: Wesley J. Bachman, Auburn, Ill.

[73] Assignee: Dickey-john Corporation, Auburn, Ill.

[21] Appl. No.: 469,205

[22] Filed: Feb. 24, 1983

[51] Int. Cl.³ .......................... G06F 15/20; B05B 9/06

[52] U.S. Cl. .................................... 364/424; 364/510; 239/74; 239/156; 222/613

[58] Field of Search .................. 364/424, 510; 239/71, 239/72, 74, 155, 156, 677; 222/613, 614, 617, 623-627, 55, 63

[56] References Cited

U.S. PATENT DOCUMENTS

| | | | |
|---|---|---|---|
| 3,344,993 | 2/1966 | Wilder et al. | 239/305 |
| 3,679,098 | 7/1972 | Weiss | 239/677 |
| 3,782,634 | 1/1974 | Herman | 239/156 |
| 3,877,645 | 4/1975 | Oligschlaeger | 239/155 |
| 4,023,020 | 5/1977 | Lestradet | 364/510 |
| 4,052,003 | 10/1977 | Steffen | 239/71 |
| 4,177,675 | 12/1979 | Friedenberg et al. | 239/156 |
| 4,220,998 | 9/1980 | Kays | 364/510 |
| 4,230,280 | 10/1980 | Leigh | 239/677 |
| 4,232,255 | 11/1980 | Carlen | 239/155 |
| 4,392,611 | 7/1983 | Bachman et al. | 364/510 |

FOREIGN PATENT DOCUMENTS

| | | |
|---|---|---|
| 2045441 | 2/1980 | United Kingdom . |
| 2063517 | 6/1981 | United Kingdom . |

OTHER PUBLICATIONS

Published European patent application 0,068,606, published Jan. 1983, corresponds to U.S. application Ser. No. 264,147 filed May 15, 1981.

*Primary Examiner*—Gary Chin

*Attorney, Agent, or Firm*—Trexler, Bushnell & Wolters, Ltd.

[57] ABSTRACT

An improved control system for a mobile material distribution apparatus of the type having a ground speed sensor, a distributing device for spreading material along the path of travel of the apparatus, a variable rate delivery structure for delivering material to the distributing structure and a delivery rate sensor. The control system comprises a calculating circuit responsive to signals developed by the ground speed sensor and delivery rate sensor and to a signal corresponding to a desired distribution rate of material for periodically calculating the difference between the desired delivery rate and the actual delivery rate and developing a difference signal. A control signal is developed in response to each difference signal for varying the delivery rate of material to the distributing structure as necessary to achieve the desired material delivery rate. The improvement comprises providing a control signal producing circuit responsive to the value of the difference signal being within a predetermined rate of values for developing the control signal as a cyclical signal having a duty cycle which varies in accordance with the value of the difference signal; this control signal producing circuit also being responsive to the value of the difference signal being below the predetermined range of values for accumulating the periodically developed difference signals until the sum of the values of these accumulated difference signals is within the predetermined range of values, and thereafter the control signal producing circuit develops the cyclical variable duty cycle signal in accordance with the sum of the values.

12 Claims, 6 Drawing Figures

NORMAL
MANUAL
CHANGE D.P.
AUTOMATIC
SPREADER CONSTANT
MAT'L DENSITY
TEST SPEED
SPRED WIDTH
FINE TUNE %
DIST CALIB
APPL RATE
POWER OFF
TOTAL APPL.
AREA
SPEED
SEL.
SET
SET UP
OPERATE
N.C.
LCD
LSD
MSD
HLEV
200
202
204
206
208
210
220
88
90
50
48
52
44
42
46
112
114
116
124
126

SPREADER CONTROL

BACKGROUND OF THE INVENTION

This invention is directed generally to material distribution apparatus and more particularly to a novel and improved control system for a mobile material distribution apparatus such as a vehicular spreader.

Mobile material distribution apparatus such as vehicular spreaders for distributing "solid" or granular material and vehicular sprayers for distributing liquid products are known in the art. In such material distribution apparatus, it is generally desired to control the rate, usually by weight, of material distribution per unit area. Accordingly, as the vehicle travels along the ground at a given speed, the rate of distribution of material will be dependent upon both the vehicle speed and the rate at which material is delivered to distribution apparatus of the vehicular sprayer or spreader.

The rate of distribution achieved will further vary in accordance with the relative density of the product being distributed, as well as the width of the spread or spray pattern achieved by the spray nozzle or nozzles or by the "solid" or granular spreading apparatus utilized. In this regard, it will be appreciated that the control systems and variables to be considered in both liquid and solid material application are analogous. Liquid distribution may include such applications as the spraying of liquid fertilizers, weed control products or the like upon a field. Similarly, "solid" or granular material spreading may find application in the distribution of granular fertilizer or similar materials over a field as well as in the distribution of ice control chemicals in granular form upon a road or highway.

While the present invention is not so limited, the description will be facilitated by specific reference to a solid or granular material distribution apparatus or spreader. Generally speaking, control systems for such material distribution apparatus have heretofore controlled the rate of delivery of material to a spinner or similar material distribution device in accordance with the speed of the vehicle to achieve a desired spread or application rate. Such control systems take into account not only the rate of material delivery to this distribution device and the speed of the vehicle, but also the density of material being distributed and the width of the spread pattern. The foregoing variables are utilized in achieving suitable control of the rate of delivery of material to the distribution device, usually in weight per unit time. Such control assures distribution of material to a field or highway at the desired weight per unit area.

There is room for improvement in such systems, however. For example, it is generally desirable in such systems to avoid excessive "hunting" in the operation of the control system in achieving corrections of the material delivery rate. In this regard, it is generally desirable to maintain a relatively smooth operation of mechanical control members in achieving any corrections or variations in the material delivery rate. This in turn maintains the distribution or application rate substantially constant at the desired rate.

In this regard, a conveyor is generally utilized to deliver material from a hopper or other supply of material to one or more distribution devices, such as "spinners" commonly utilized in the spreading of granular material. This conveyor is provided with a variable speed motor, which is often hydraulically controlled. The hydraulic control system may further be provided with a movable member or flow control valve which controls the flow of hydraulic fluid to the conveyor drive motor and hence the speed thereof. This hydraulic control valve may be manually adjusted. However, it is the practice in such control systems to further provide an electric motor for controlling the position of the hydraulic valve remotely, for example, from the operator's station of the vehicle.

Prior art automatic control systems have generally devised various means for effecting automatic control of the position of the valve in accordance with the desired application rate of material. The aim is to achieve a substantially constant, desired application rate irrespective of changes in the speed of the vehicle. It will be recognized, however, that the hydraulic valve and associated drive motor have some inertia or resistance which prevents reliable response thereof to control signals below a certain threshold level. Hence, relatively fine adjustments thereof are often difficult to obtain.

Moreover, the hydraulic, electrical and mechanical components of such a system will experience various tolerances or variations from their nominal operating characteristics. These variations should be taken into account in achieving accurate control of material distribution or application rate.

OBJECTS AND SUMMARY OF THE INVENTION

Accordingly, it is a general object of the present invention to provide a novel and improved automatic control system for material distribution apparatus.

A more specific object is to provide such an automatic control system which controls changes in the rate of material delivery for distribution substantially in proportion to the amount of correction required so as to substantially avoid hunting.

A further object is to provide an automatic control system in accordance with the foregong objects which is capable of integrating or accumulating relatively small or fine corrections or adjustments until the sum of such accumulated corrections is of sufficient magnitude to achieve a reliable adjustment in the rate of material delivery.

A related object is to provide an automatic control system in accordance with the foregoing objects which is further capable of achieving correction of material delivery rates over a relatively broad range while maintaining a relatively fine incremental control of the corrections achieved within this range.

Briefly, and in accordance with the foregoing objects, the invention provides a novel and improved control system for a mobile material distribution apparatus. The material distribution apparatus includes ground speed sensor means for developing a signal corresponding to the ground speed thereof, distributing means for distributing the material as the apparatus moves along a given path of travel, variable rate delivery means for delivering material at a controllably variable rate to said distributing means, delivery rate sensor means for developing a signal corresponding to the actual rate of delivery of material to said distributing means, and desired distribution rate control means for developing signal corresponding to a desired distribution rate of material per unit area. The control system comprises: control circuit means responsive to said ground speed signal, to said actual delivery rate signal and to said desired distribution rate signal for periodically calculating a desired delivery rate of material to the distributing means necessary to achieve said desired distribution rate and for periodically developing a difference signal corresponding to the difference between said desired delivery rate and said actual delivery rate; and control signal producing means responsive to each said difference signal for developing a control signal. The variable rate delivery means is responsive to said control signal for varying the delivery rate of material to said distributing means in the amount necessary to achieve said desired material delivery rate, so as to achieve and thereafter maintain said desired distribution rate. The control signal producing means is further responsive to values of said difference signal within a predetermined range of values for developing said control signal as a cyclical signal having a duty cycle which varies in a predetermined fashion in accordance with the value of said difference signal. The control signal producing means is further responsive to values of said difference signal which are below said predetermined range of values for accumulating said periodically developed difference signals until the sum of the values of the accumulated difference signals is within said predetermined range of values and for thereafter developing said cyclical, variable duty cycle control signal in accordance with the value of said sum.

BRIEF DESCRIPTION OF THE DRAWINGS

The foregoing as well as other objects, features and advantages of the invention will be more readily understood upon reference to the following detailed description of the illustrated embodiment together with reference to the accompanying drawings, wherein.

DETAILED DESCRIPTION OF THE ILLUSTRATED EMBODIMENT

Figure 1:
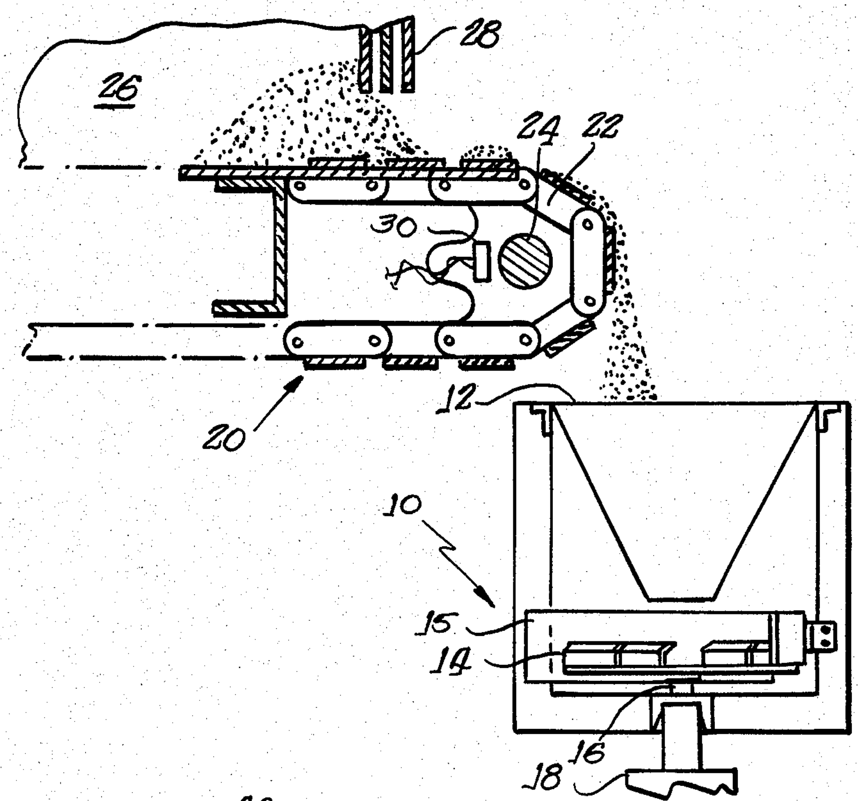
FIG. 1 is a diagramatic illustration of portions of a vehicular spreader with which the control system of the invention may be advantageously utilized.

Referring now to the drawings, and initially to FIG. 1, portions of a vehicular spreader with which the control system of the invention may be utilized are illustrated. In this regard, such a vehicular spreader generally includes a material distribution apparatus which often takes the form of one or more spinners 10. This spinner 10 is provided with an inlet 12 for receiving material to be distributed thereby, and a rotatable blade-like member 14. This spinning or rotating blade 14 ejects the material through suitable apertures 15 to be spread along the path of travel of the vehicular spreader. The spinner blade 14 is preferably mounted to a rotatable axis 16 which may be driven by a suitable motor 18.

Preferably, the motor 18 forms part of a hydraulic drive system (not shown). The material supplied to the inlet 12 of the spinner or distribution member 10 is normally provided by way of a material delivery structure such as a conveyor designated generally by the reference numeral 20. In accordance with conventional practice, the conveyor 20 includes an endless member or belt 22 which is advanced by means of a suitable driveshaft 24. This driveshaft 24 is preferably driven from a suitable hydraulic motor (not shown), which forms part of the hydraulic system previously mentioned.

It will be noted that the conveyor 22 receives a supply of material from a suitable hopper or other material supply 26 (partially illustrated in FIG. 1). Additionally, in accordance with conventional practice an adjustable height outlet gate 28 may be provided for the hopper 26.

In operation, the foregoing structure distributes material over a path of travel of a mobile spreader in accordance with the ground speed of the mobile spreader and in accordance with the rate of material delivery from the conveyor 20 to the material distribution apparatus or spinner 10. Preferably, the rotation of the shaft 16 of the spinner blade 14 is held at a substantially constant or optimum rate. Hence, the amount of material by weight or volume delivered over a path of travel of the mobile spreader per unit area or per unit distance may be controlled by controlling the rate of material delivery from the conveyor 20 to the spinner 10. Such control is preferably achieved by controlling the rate of rotation of the driveshaft 24 and hence the rate of motion of the conveyor 20.

Figure 2:
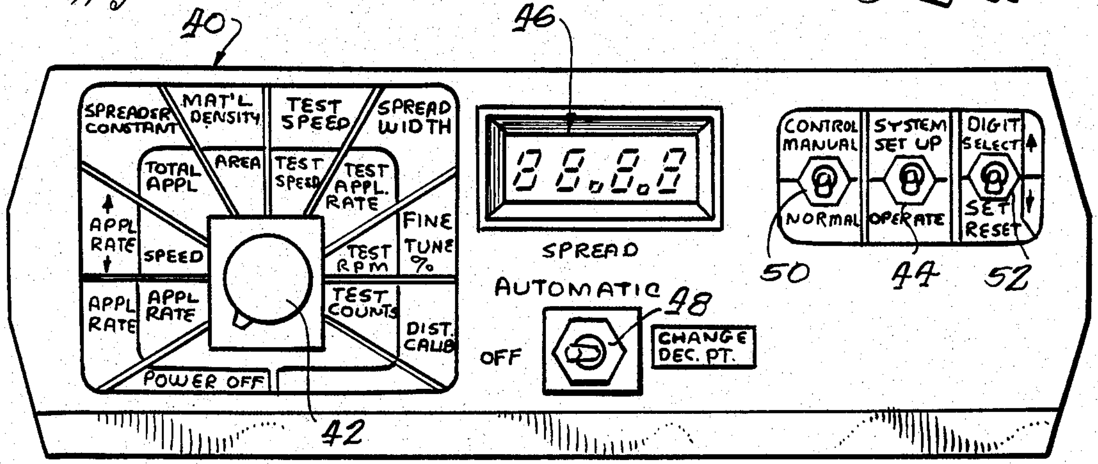
FIG. 2 is a front elevation of an exemplary control panel for the control system of the present invention.

The operation of the control system of the invention will be better understood upon reference to FIG. 2 wherein an exemplary control console 40 is illustrated. This control console 40 includes a rotary function selector dial or switch 42 which is rotatable to one of a plurality of positions for selecting a corresponding function. The dial 42 functions in conjunction with the position of a SYSTEM SETUP/OPERATE toggle switch 44. When the SETUP/OPERATE toggle switch 44 is actuated to the SETUP position, a plurality of functions for setting up the control system are available for selection by the rotary dial 42, as indicated on the outer ring of function names. Similarly, when the SETUP/OPERATE switch 44 is actuated to its OPERATE position a plurality of operating functions indicated on the inner ring about the selector dial 42 are available for selection thereby. Moreover, a display panel 46 displays a numeric value corresponding to the selected function when the switch is either in the OPERATE or SETUP mode. In the illustrated embodiment, this display panel 46 includes four, seven-segment display characters. The display 46 also displays various malfunction indications when in the OPERATE mode.

A SPREAD toggle switch 48 may be left in its center or AUTOMATIC position for automatically controlled spreading operation, or alternatively may be switched to its OFF position or CHANGE DECIMAL PT. position so as to manually control the speed of the conveyor 20. In conjunction with this latter operation of the toggle switch 48 a further CONTROL MANUAL/NORMAL toggle switch 50 is provided for selecting either manual or automatic operation of the control system. A final toggle control switch 52 is designated a DIGIT SELECT/SET/RESET switch and is utilized to set the values of certain set-up functions selected by the rotary selector dial 42. These selected values are indicated on the display 46 to accomplish setup or calibration of the control system.

Having briefly described the control panel 40, the operation thereof for setting up or calibrating of the control system of the invention and thereafter in monitoring the spreading operation will now be described. Initially, with the control toggle 44 in the SETUP position, the selector dial 42 may be rotated to its first, APPL. RATE position (on the outer ring), whereupon the operator may enter the desired application rate in pounds per acre (or kilograms per hectare) which is simultaneously shown on the digital display 46. The right-most digit of the display will be automatically energized when the toggle 52 is placed in the SELECT position. This digit will advance incrementally when the toggle 52 is held at the SET position. When the right-most digit of the display 46 has advanced to the desired number the toggle 52 is again moved to the SELECT position to hold the digit at this number. The process may be repeated using the toggle 52 to individually SELECT and then SET each successive digit to the left in the display 46 until the desired application rate is displayed in the format XX.XX hundreds of pounds per acre. The CHANGE DECIMAL·PT. position of the SPREAD switch 48 is used to place the decimal in the position indicated for the application rate selection function. The displayed number is set into the system when the dial 42 is moved to another position.

The next position of the selector 42 (moving in a clockwise direction) is designated APPL. RATE, accompanied by upwardly and downwardly directed arrows. This position is utilized to permit changes, while in operation, of the application rate previously set by some desired increments in pounds per acre. For example, if the operator wishes to have the option of increasing or decreasing the previously set application rate by 50 pounds per acre increments, while spreading, the DIGIT switch 52 is utilized as described above to enter 0050 in the display 46. No decimal point is utilized in conjunction with this setting.

It will be noted that the DIGIT switch also includes upwardly and downwardly facing arrows adjacent the SELECT and SET positions thereof. When the SYSTEM switch is in the OPERATE position, each operation of the digit switch 52 to the "up" position indicates that the incremental change (e.g. 50 pounds per acre) set in as just described is added to the application rate previously set in the application rate position. Conversely, each time the digit switch is moved to the "down" position, this increment is subtracted from the application rate previously selected.

The SPREADER CONSTANT position of the dial 42 is utilized to set in a gate flow constant for various heights of the gate 28 described above. The appropriate number or constant for a given spreader apparatus will be provided by the spreader manufacturer. For example, if the spreader constant is 32.72, the digits 3272 are entered in the display 46 using the DIGIT switch as described above and the decimal point is placed in the correct position using the SPREAD switch as described above.

Next, a conversion factor corresponding to the density of the product to be spread in pounds per cubic foot entered on the digits of the display 46 in the same fashion, in the format XXX.X using the DIGIT and SPREAD switches. The next position (outer ring) of the dial 42 is designated TEST SPEED. With the dial 42 in this position a value is entered on the display 46 in the same fashion described above. This value indicates in miles per hour the value of an internally generated ground speed signal which is utilized as described later in making stationary system checks or troubleshooting the system. The operator may enter the nominal or expected ground speed of the mobile spreader to be used during the spreading operation.

With the dial 42 in the SPREAD WIDTH position, the width of the spread pattern being used is entered in the display 46 in feet. This entry is in the format XXX.X, using the DIGIT and SPREAD switches as described above.

The next position of the dial 42 (outer ring) is designated FINE TUNE. In this position, the operator may make percentage adjustments in application rate to compensate for overall spreader tolerances or variations from nominal characteristics. This will normally be done after observing operation of the spreader at a given application rate setting. The allowable range of adjustment is plus or minus 9 percent. Hence, only a single digit is entered in the display 46 in the fashion described above.

When the dial 42 is in the DIST CAL position, the toggle 52 may be utilized as before to set the display 46 to the number of pulses per unit distance produced by a particular ground speed sensor to be used with the mobile spreader. Alternatively, the vehicle may be driven over a measured course (400 feet in the illustrated embodiment) and the toggle 48 actuated to AUTOMATIC at the start of the course and to OFF at the end of the course, to achieve automatic setting of this number. The control system will now correctly calculate the ground speed from the pulses received from the particular ground speed sensor associated therewith.

During the spreading operation, the toggle 44 is moved to the OPERATE position, the toggle 50 is moved to the NORMAL position, and the toggle 48 is set to the AUTOMATIC position. The dial 52 is now operative for selecting the operating functions indicated on the inner ring thereof, as described below.

When the dial 42 is moved to the APPL. RATE position (inner ring), the current application rate, based upon the present vehicle speed and present speed of the conveyor 20 will be displayed in pounds per acre on the display 46. This figure should match the application rate selected in the setup mode, absent transient conditions.

The SPEED position of the selector 42 causes the display 46 to indicate the current vehicle or spreader ground speed in miles per hour. Rotation to the next clockwise position TOTAL APPL. displays a cumulative count of the total quantity of material, in pounds, applied by the spreader since the last resetting of an associated accumulator. Similarly, the next or AREA position of the selector 42 causes the cumulative area covered in acres to be displayed. Either of the foregoing accumulators may be reset to zero by moving the selector 42 to the associated TOTAL APPL. or AREA positions while in the OPERATE mode, and holding the DIGIT switch 52 in the lower or RESET position. This will cause an audible alarm, to be described later, to sound. When the audible alarm ceases, the selected accumulator has been reset to zero.

With the toggle 44 still in the OPERATE mode, the remaining positions of the selector dial 42 are for system test purposes. When the spreader vehicle is stationary, the dial 42 may be rotated to the TEST SPEED position to verify the test speed value set in during the SETUP mode. With the selector dial 42 in the TEST APPL. RATE position the digits of the display 46 indicate the application rate in pounds per acre, based upon the test speed and other constants entered during the SETUP mode. It will be recognized that the application rate actually achieved during operation may vary from this TEST APPL. RATE due to variations in the actual density of the product, or in the tolerances in the operation of the conveyor 20, gate 28 and spinner 10. All of these factors may vary somewhat in operation from the nominal values thereof.

With the selector in the TEST RPM position, the actual speed of the monitored drive component of the conveyor 20, which may be the shaft 24 previously described, or some other convenient monitoring location, is indicated in RPM. Finally, with the selector 42 in the TEST COUNTS position the revolutions of the conveyor speed monitored shaft are counted and accumulated. Both the TEST RPM and TEST COUNTS indications are selected while the spreader vehicle is stationary and are based upon the test speed and other constants entered during the SETUP mode.

The TEST APPL. rate switch is used in the OPERATE mode to initially set the control system to the desired application rate. With the spreader vehicle stationary, the desired operating speed is first entered in the SET UP mode with the selector switch in the TEST SPEED position. Thereafter the switch 44 is placed in the OPERATE position and the selector 42 in the TEST APPL. RATE position. The spread switch 48 is then moved between the OFF and CHANGE DEC. PT. positions until the desired application rate is displayed in the display 46. Once the desired application rate is displayed, the selector dial 42 is placed in the SPEED position and spreading may be commenced. If it is desired to operate with the control 50 in the MANUAL position, a constant operating speed must be maintained. However, with the control 50 set to the NORMAL position, the control system achieves the desired application rate, taking into account any incremental adjustments or percentage variations entered as described above, without regard for changes in the ground speed of the spreader vehicle.

As briefly indicated above, the SPREAD CONTROL switch 48 may also be utilized to achieve manual control of the operation of the conveyor 20. In this regard, movement of this switch 48 to the AUTOMATIC position normally causes the control system to automatically regulate the speed of the conveyor 20 to achieve the desired application rate set in during the SETUP procedure, (with switch 44 set to OPERATE and switch 50 set to NORMAL). The control system also takes into account any variations desired in conjunction with the APPL. RATE "up/down" setting or the FINE TUNE PERCENT setting as described above. Spreading of material may be halted by moving the SPREAD switch 48 to its OFF position.

However, the switch 50 is moved to the MANUAL position, the SPREAD switch functions to directly control an electric motor for opening and closing of a hydraulic valve. As mentioned previously, this hydraulic valve controls the speed of a hydraulic motor which drives the conveyor 20. Movement of the switch 48 to the OFF position causes the valve to be moved toward its closed position, decreasing the conveyor speed. Movement of the switch 48 to the CHANGE DEC. PT. position causes the valve to be moved toward its open position, increasing the speed of the conveyor. If the switch 48 is left in its center or AUTOMATIC position, the valve remains in the position to which it was last set.

In addition to the foregoing, as mentioned above, the display 46 is capable of displaying a number of failure or malfunction messages. The message LoHP is displayed when in the OPERATE mode if the contents of the hopper 26 are below a predetermined level. In this regard, a suitable level sensor is provided. This message will be displayed for approximately three seconds accompanied by sounding of an audible alarm. The audible alarm may be eliminated by actuating the SPREAD switch 48 to the OFF position.

The message APEr (application error) is displayed in the OPERATE mode when a hydraulic control valve which regulates the speed of the conveyor 20 is fully opened and the control system can no longer further regulate the speed of the conveyor 20. This message is also accompanied by sounding of the audible alarm and will alternate with the readout of the selected function.

The message ShCr (short circuit) is displayed in either of the SETUP or OPERATE modes should a short circuit occur in the control system. The message is accompanied by a continuous audible alarm.

The message FAIL is displayed in the OPERATE mode if all of the required constants have not been entered by the operator as described above. Additionally, failure of the internal memory components, to be described later, or removal thereof from the required power source, or other electrical malfunctions effecting memory will cause display of the FAIL message. This message is also accompanied by a continuous audible alarm. Additionally, the FAIL message may also be displayed if the constants entered in the SETUP mode are beyond the operational parameters of the control system.

Figure 3:
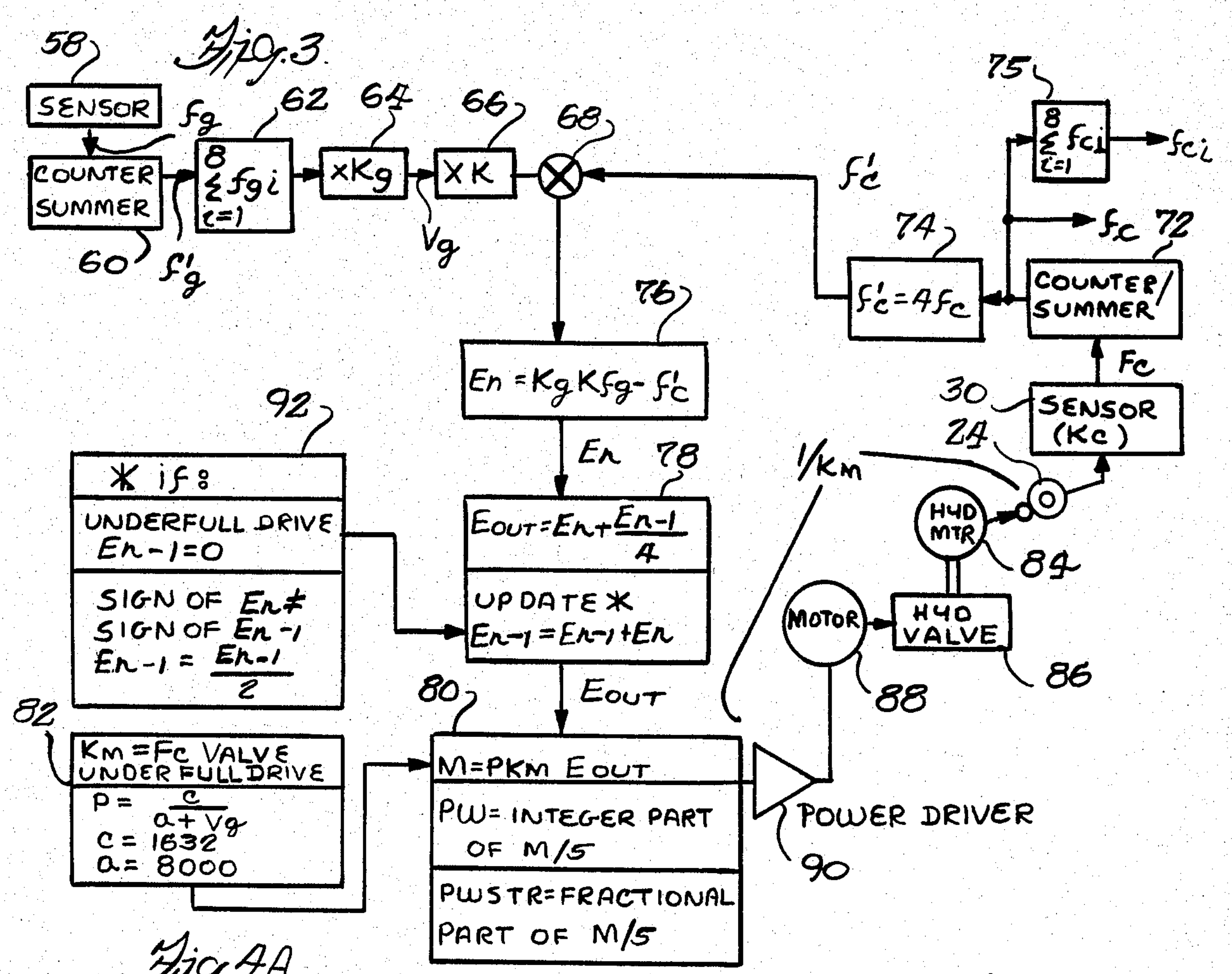
FIG. 3 is a functional block diagram illustrating the operation of the control system of the invention.

Referring now to FIG. 3, a functional block diagram indicates functional aspects of the operation of the control system of the invention. In this regard, various means and functions are accomplished by the use of a microprocessor or microcomputer component and associated memories and registers to be described with reference to FIGS. 4A and 4B. It will be understood that various means, functions, calculations and signals produced, to which reference is made herein, are embodied in such processor or computer components and in various memories, registers and programming, associated therewith.

As illustrated in FIG. 3, a ground speed signal fg comprises a signal produced by any of a plurality of conventional ground speed sensors 58 as known in the art. This ground speed signal fg is fed to a counter/summer 60 which in the illustrated embodiment accumulates pulses from the ground speed sensor 58 and reads the total of the accumulated pulses at 2.5 millisecond intervals. The counter/summer 60 then determines the sum of 50 such counter readings, which is fed out as a signal f'g to a further summer block 62. This latter summer block 62 sums the last eight digital words produced by the counter/summer 60 at 125 millisecond intervals.

A first multiplier 64 multiplies the output of the summer 62 by a factor Kg which represents the number of pulses produced by the particular sensor utilized per unit distance travelled. This factor was entered during the SETUP mode, in the distance calibration procedure described above. This product is here designated Vg.

A further similar multiplier 66 multiplies the foregoing by a factor, K which represents the net result of the remaining constants set in during the SETUP mode. These constants will be remembered to include the desired application rate, the spreader gate constant, the material density and the spread width. Any percent variation of application rate, entered as previously described, is also factored in to this constant K. The output of the multiplier 66 is applied to one side of an error junction 68. This resultant output from multiplier 66 comprises a signal corresponding to a desired speed of conveyor 20. Stated alternatively, this signal corresponds to a desired rate of delivery of material from conveyor 20 to spinner 10 for achieving the desired application rate.

Rotation sensor 30 produces a signal at a frequency Fc in response to rotation of the driveshaft 24 or other monitored part of the conveyor 20. This signal Fc includes the effect of a sensor constant Kc which represents the number of pulses produced by the sensor 30 per revolution of the driveshafts 24. The signal Fc is fed to a counter/summer block 72, which like the similar block 60 described above, reads the counted sensor pulses at 2.5 millisecond intervals and sums 50 such readings. The output of the counter/summer 72 is designated as fc and is fed to a multiplier block 74 which multiplies by a factor of 4 to produce an output signal here designated as f'c, which is fed to the opposite side of the error junction 68. This signal f'c corresponds to the actual speed of conveyor 20 and hence to the actual rate of delivery of material to spinner 10. An additional summing block 75 sums eight successive counts/sums of fc from counter/summer 72, for use in the display functions previously described.

Accordingly, the error junction 68 produces an error or difference signal as illustrated in block 76 and here designated as En. This difference signal En therefore corresponds to the difference between the desired rate of material delivery and the actual rate of material delivery to the spinner 10. In accordance with a preferred embodiment, a further resultant error signal Eout is produced in a block 78 by adding to a calculated error En the immediately previously calculated error En−1 divided by four. This block 78 then also updates the value of error En−1 by adding to it the value of the present error En.

The resultant signal Eout is further modified in a functional block 80 to produce a resultant output drive signal M, which is derived by multiplying Eout by additional factors P and Km.

As illustrated in block 82, the factor Km is chosen to be equal to the output of sensor 30 in response to rotation of the shaft 24 when under full drive condition. The factor P is a gain factor and as also illustrated in block 82, is a function of Vg, the product of fg and Kg, which is the output of block 64 described above. It will be noted that the factor Km is the inverse of the constant or characteristic of the system associated with a given spreader vehicle.

In this regard, as diagrammatically illustrated in FIG. 3, and as previously described, the conveyor shaft 24 is preferably driven by a suitable hydraulic motor 84 at a speed controlled by a suitable hydraulic valve 86. The position of this hydraulic valve 86 is in turn controlled by an electric motor 88 which receives drive signals from a suitable power driver circuit 90. The output signal M derived by the block 80 feeds the power drive circuit 90.

It will be recognized that any given combination of the components including the conveyor shaft 24 the hydraulic drive motor 84, hydraulic valve 86 and electric motor 88 and power driver circuit 90 will in the aggregate respond with a given characteristic or constant to a given signal M produced by the output block 80. This constant is here designated as the inverse of the constant Km when operating under a full or maximum drive signal M to the power driver 90. That is, causing any chain of components from the power driver 90 to the shaft 24 to operate at a maximum rate of change will produce a repeatable, measurable result. Hence, the constant comprising the inverse of Km may be readily determined by producing this full drive condition to the foregoing component. Accordingly, addition of constant Km as a factor in the output signal M eliminates the effect of this constant which will of course vary from one set of drive components to another.

The addition of the gain factor P recognizes that it is desirable to change or correct the speed of the conveyor 24 at a somewhat faster rate as the spreader vehicle speed decreases, to achieve a relatively constant application rate.

In operation, the conveyor sensor 30 develops a signal corresponding to the actual rate of delivery of material from the conveyor 20 to the distributing apparatus or spinner 10 (see FIG. 1). The ground speed sensor 58 develops a signal corresponding to the actual ground speed of the mobile spreader vehicle or other apparatus. Functional blocks 60, 62, 64 and 66 form a portion of a calculating circuit for periodically calculating the desired delivery rate of material by the conveyor to achieve the desired distribution or application rate of material in weight per unit area.

Functional blocks 72 and 74, the error junction 68 and functional block 76 (representing the function of error junction 68) form a further portion of calculating means for periodically calculating the difference between the desired delivery rate and developing a corresponding difference or error signal En. Remaining functional blocks 78 and 80 form a control signal producing means responsive to the error or difference signal En for developing a control signal.

The variable rate conveyor drive system comprising hydraulic motor 84, hydraulic valve 86, electric motor 88 and power driver 90 is then responsive to the control signal developed by blocks 78 and 80 for varying the rate at which material is delivered from the conveyor 22 the distributing means or spinner 10 to achieve and maintain the desired distribution rate.

As will be more fully described with reference to FIG. 5, when the error or difference signal En is of a value within a predetermined range of values, the blocks 78 and 80 develop the control signal as a cyclical signal having a duty cycle which varies substantially proportionately with the value of the difference or error signal En. This is referred to as the "proportional" control range. However, when the error or difference signal En is below this predetermined range of values, the block 78 and 80 function to accumulate the periodically developed error or difference signal until their sum is within the predetermined range of values. Thereafter, the blocks 78 and 80 develop the cyclical, variable duty cycle control signal in accordance with the value of the sum of error or difference signals obtained.

The foregoing summing of error or difference signals can be referred to as an integral control procedure. This procedure is especially useful in cases where the error or difference signal developed is not of sufficient magnitude to cause a reliable effect upon the operation of the control system comprising the hydraulic motor 84, valve 86, electric motor 88 and power driver circuit 90.

Additionally, when the error or difference signal En reaches a value above the predetermined range of values for "proportional" control described above, the control signal producing blocks 78 and 80 produce a constant, maximum level control signal output rather than a cyclical signal. This predetermined maximum level output signal is maintained until the value of the error or difference signal En falls back within the predetermined "proportional" control range of values.

Figure 5:
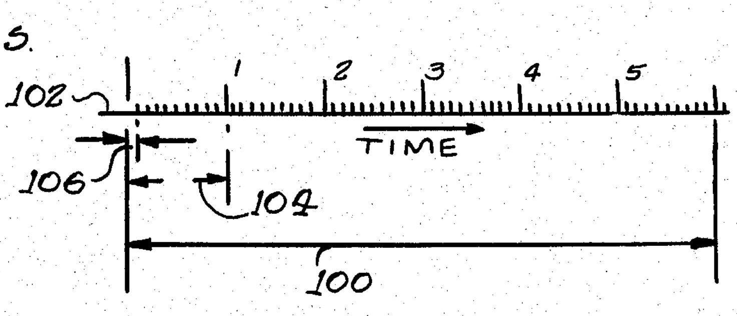
FIG. 5 is a graphical illustration of the operation of the control circuits of FIGS. 4A and 4B.

Reference is next invited to FIG. 5 wherein the details of operation of the block 80 in producing the cyclical, control duty cycle or proportional control signal is illustrated in graph form. In accordance with a preferred form of the invention, a periodic, proportional error correction cycle is designated generally by a time interval indicated by arrows 100 along a time axis or scale 102. This interval 100 is further subdivided into five equal intervals 104, along the time axis or scale 102. Each interval 104 is further subdivided into ten equal sub-intervals 106.

In accordance with the preferred form of the invention, the time length of the overall time interval 100 is 125 milliseconds. Accordingly, the interval 104 is 25 milliseconds in duration and the sub interval 106 is 2.5 milliseconds in duration.

Referring also to FIG. 4, the resultant output control signal M to the power driver 90 produced by the block 80, when in the proportional control range, is a series of pulses of controlled duty cycle, one pulse in each of the five intervals 104. Accordingly, the block 80 further acts to divide the value of signal M by five, so as to produce in each interval 104 a pulse signal of width or duty cycle equal to substantially 1-5th of the value of the signal M. The pulse widths of these signals are further capable of being subdivided into incremental values in increments of the sub-interval 106.

Hence, in each interval 104 a pulse signal is produced of a pulse width or duty cycle equal to the number of increments 106 obtained by dividing the value of M by five, or in other words the integer part of the quotient M/5. Any fractional part of the quotient results in the addition of one additional increment 106 to the pulse width or duty cycle of the pulse produced in one or more of the successive periods or intervals 104, starting with the first interval 104 and in as many additional successive intervals as required to include this fractional part. In other words, one increment 106 is added to the duty cycle of the control signal in each of the periods or intervals 104 up to the number of added increments equal to the dividend of the fractional part of the quotient defined by the value of the signal M divided by the number of intervals or periods, which in the illustrated embodiment is the quotient M/5.

Figure 4A:
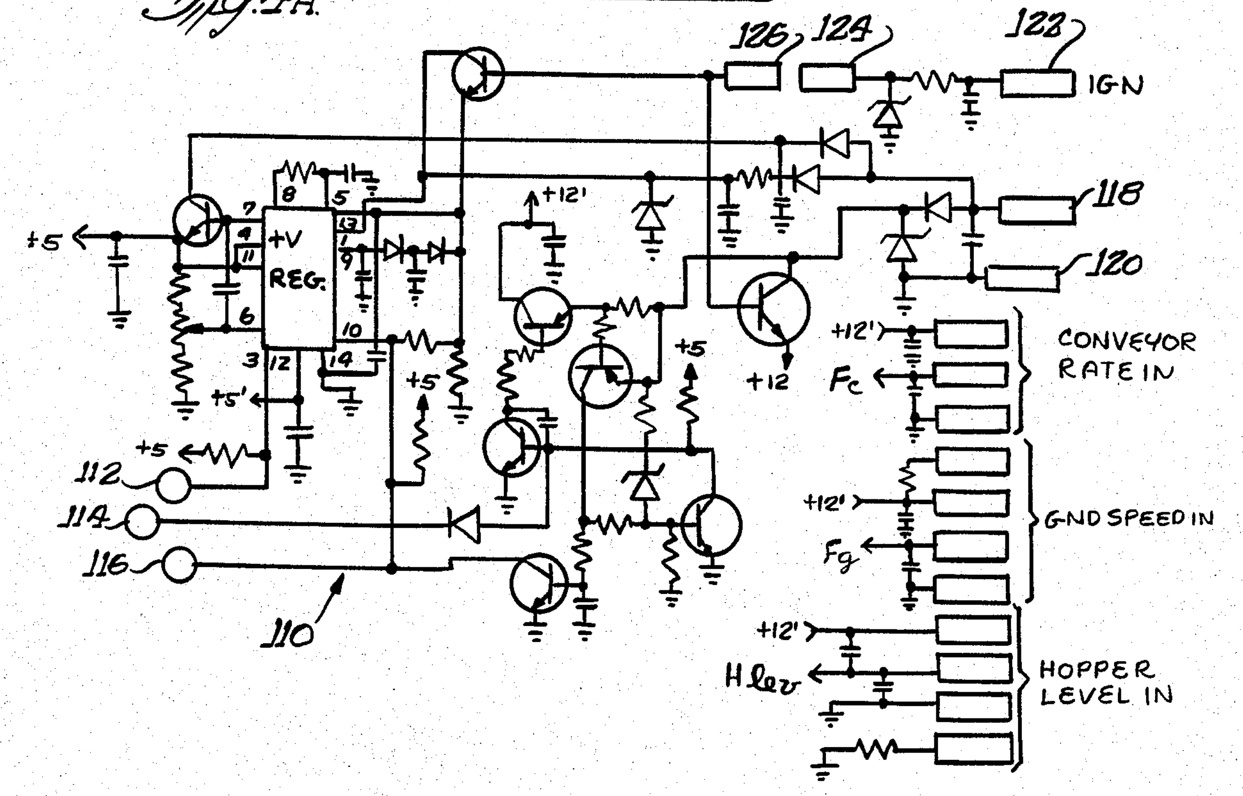
FIGS. 4A and 4B, taken together, form a schematic circuit diagram of a preferred embodiment of the control system of the invention.
Figure 4B:
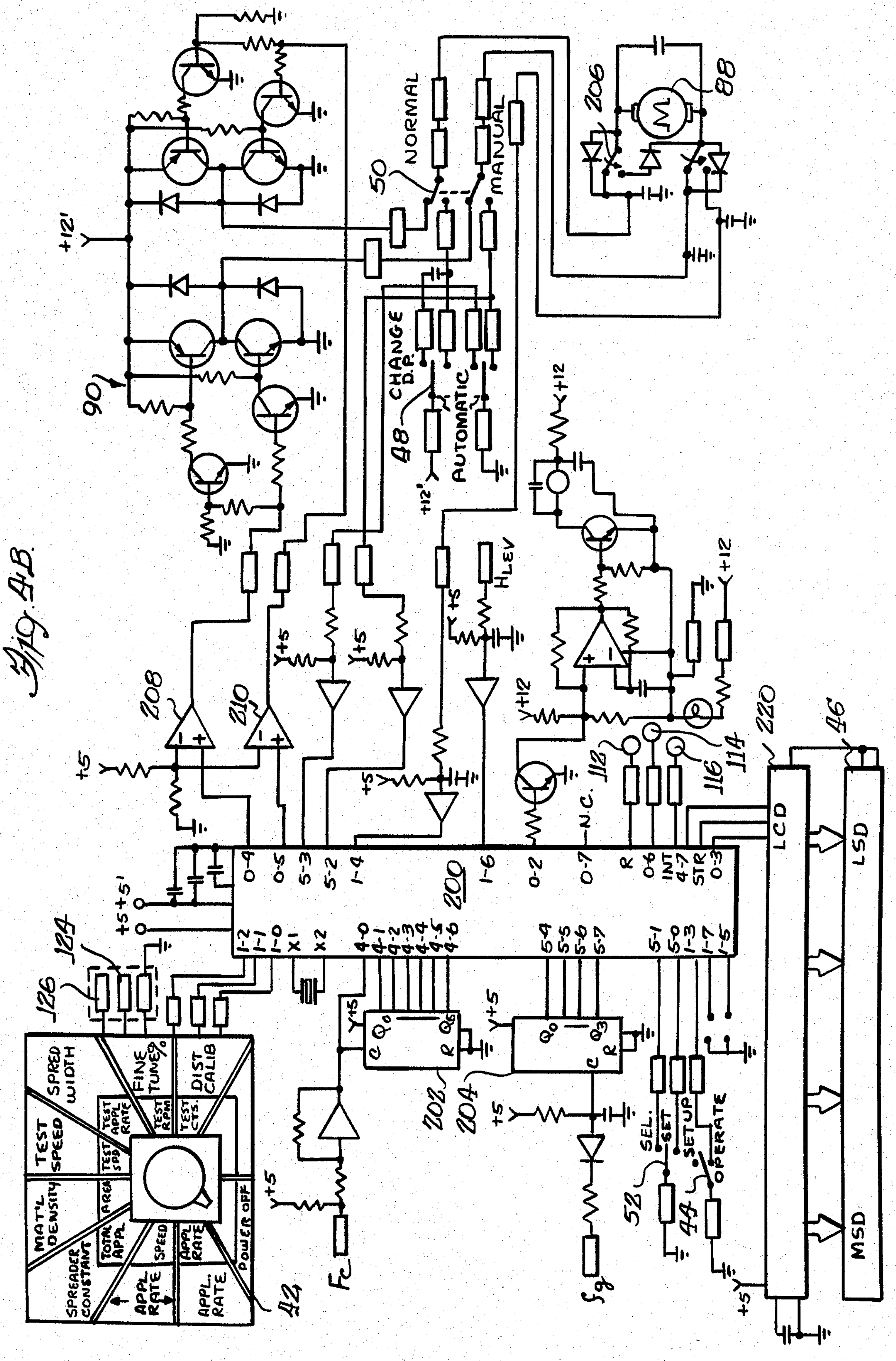

Referring now to FIGS. 4A and 4B a microcomputer and associated circuits comprising the control system functionally illustrated in FIG. 3 are shown in circuit schematic form.

Referring initially to FIG. 4A, a suitable power supply circuit for the remaining circuits of the invention is designated generally by the reference numeral 110. This power supply circuit produces a plurality of regulated DC voltages as generally indicated at various outputs thereof. Additionally, the power supply circuit is provided with three monitored terminals 112, 114 and 116, which as will be presently described, provide means for monitoring of the power supply by the microcomputer component illustrated in FIG. 4B.

The power supply 110 is coupled with a suitable power source such as a twelve volt DC vehicle battery at terminals 118, 120 thereof. Additionally, the power supply may be coupled for energization from the vehicle ignition switch (IGN.) at a terminal 122. This terminal 122 is also coupled with a terminal 124 which runs to the function selector switch 42 as will presently be seen in FIG. 4B. The function selector switch 42 includes a "power off" position. Accordingly, a return terminal 126 from the function selector 42 is provided to the power supply 110. Preferably, however, suitable regulated DC voltages are maintained from the power supply 110 to microcomputer memory and other related circuit components of FIG. 4B without regard for the position of the selector switch 42.

Suitable inputs from the conveyor sensor 30, ground speed sensor 58 and a suitable hopper level sensor (not shown) for the hopper 26 as mentioned above are also illustrated in FIG. 4A. These signal inputs provide suitable filtering for respective signals Fc, fg and Hlev (hopper level), which are fed to the like-labeled inputs in FIG. 4B, to which reference is now invited.

The majority of the functions illustrated and described above with reference to the diagram of FIG. 3 are carried out by a microcomputer component 200. In the illustrated embodiment this microcomputer 200 comprises a single chip microcomputer of the type generally designated MK3875/42. However, the counting functions of the respective counter/summer components 60 and 72 of FIG. 3 are carried out by a pair of integrated circuit counter components 202 and 204 which are coupled to receive the respective Fc and fg input signals from the input circuits of FIG. 4A. The inputs to the respective counters 202 and 204 are provided with suitable buffering and voltage pull-up components as well.

In the illustrated embodiment the counters 202 and 204 comprise seven-stage ripple carry binary counters of the type generally designated CD4024BE. The respective Q outputs of the respective counters 202 and 204 feed respective input terminals or ports of the microcomputer 200 which are designated by their respective port numbers and bit numbers as indicated in FIG. 4B.

Three additional inputs of the microcomputer 200 immediately below the counter 204 receive inputs for indicating the positions of the respective switches 44 and 52 which are again illustrated in circuit schematic form. Two additional inputs therebelow may be left in an open circuit condition or jumpered to circuit ground to indicate whether English or metric units are to be utilized in the control system and to indicate whether granular material such as fertilizer or ice control material such as salt are being distributed or applied by the associated spreader vehicle.

The previously mentioned power supply monitoring terminals 112, 114 and 116 are coupled to suitable terminals for monitoring by the microcomputer 200 as indicated at the lower right-hand portion thereof. The function selector switch 42 is again illustrated in FIG. 4B and the position thereof is determined by the microcomputer 200 by way of inputs fed therefrom to suitable input ports 1-0, 1-1 and 1-2. Additionally, the power supply terminals 124 and 126 from the ignition input 122 of FIG. 4A and circuit ground are coupled to suitable points of the selector switch 42. The hopper level sensor signal Hlev will be seen to feed an input 1-6 of the microcomputer 200 by way of a suitable pull up and buffering circuit.

The microcomputer 200 also receives at port 1-4 a monitored lead from the electric motor 88, which is again illustrated in FIG. 4B. Additionally, the power drive circuit 90 is illustrated in circuit schematic form, as are the circuit connections of the respective switches 48 and 50 of FIG. 1. The circuit of motor 88 is additionally provided with a double pole, double throw control switch 206 for selectively taking the motor 88 out of circuit, whereby the hydraulic control valve 86 (see FIG. 3) may be operated manually if desired. The operation of this further switch 206 is detected by the microcomputer 200 at "motor monitor" input 1-4 thereof. Additional inputs 5-2 and 5-3 of the microcomputer 104 detect operation of the respective switches 48 and 50.

It will be seen that the control signal output from the microcomputer 200 to the power drive circuit 90 comprises a pair of outputs 0-4 and 0-5 of the microcomputer 200. These outputs feed the non-inverting input terminal of each of a pair of operational amplifiers (op amp) 208, 210. The inverting input terminals of the respective op amps 208 and 210 are coupled to a suitable DC reference voltage.

In operation it will be recognized that the op amp 208 and associated output 0-4 will be operative when it is desired to rotate the motor in one direction, whereas the opposite direction of rotation of motor 88 is obtained by energization of the output 0-5 and associated op amp 210.

The respective directions of rotation of motor control movement of the hydraulic valve 86 (see FIG. 3), in two directions for opening and closing thereof, respectively. Respective opening and closing of the hydraulic valve 86 in turn respectively increases or decreases the speed of hydraulic motor 84 which drives the conveyor 20.

The display 46 in the illustrated embodiment comprises a liquid crystal display panel and is energized by the microprocessor by way of a suitable liquid crystal display driver component 220, which in the illustrated embodiment comprises a circuit component of the type generally designated HLCD0438.

In order to fully illustrate a specific embodiment of the invention, an exemplary program for the microcomputer 200 is reproduced on the following pages.

While the invention has been illustrated and described herein above with reference to specific embodiments, the invention is not limited thereto. Those skilled in the art may devise various alternatives, changes and modifications upon reading the foregoing descriptions. The invention includes such alternatives, changes and modifications insofar as they fall within the spirit and scope of the appended claims.

```
THIS FILE ON DISK (CONT1,0) 100% DRIVE
ERRS  LOC OBJECT ADDR LINE            SOURCE STATEMENT

                      0001       TITLE 'THIS FILE ON DISK (CONT1,0) 100% DRIVE'
                      0002  *
                      0003  *    STARTING DATE 7\21\80
                      0004  *
                      0005  *    REVISION DATE 9\29\82
                      0006  *    VERSION #2
                      0007  *
                      0008  *    AUTHOR: STEVE STONE
                      0009  *
                      0010  *    THIS PROGRAM IS USED TO CONTROL A CONVEYOR
                      0011  *    IN A SPREADER SYSTEM
                      0012  *
                 0FC0 0013  VGSTAC    EQU H'FC0'
                 0FD3 0014  KMLOW     EQU H'FD3'
                 0FFA 0015  DIST      EQU H'FFA'
                 0FD7 0016  COUNT     EQU H'FD7'
                 0FFD 0017  TSTSPD    EQU H'FFD'
                 0FDC 0018  APRIM     EQU H'FDC'
                      0019  *
                 0000 0020  POP       EQU 0
                 0001 0021  DCI       EQU 1
                 0002 0022  DC7273    EQU 2
                 0003 0023  DC7071    EQU 3
                 0004 0024  MVITMC    EQU 4
                 0005 0025  MVITMP    EQU 5
                 0006 0026  MVRTMC    EQU 6
                 0007 0027  MVRTMP    EQU 7
                 0008 0028  MULT      EQU 8
                 0009 0029  DIVIDE    EQU 9
                 000A 0030  ADDEXP    EQU 10
                 000B 0031  SUBEXP    EQU 11
                 000C 0032  NRMLZ     EQU 12
                 000D 0033  NRM14     EQU 13
                 000E 0034  EXPR60    EQU 14
                 000F 0035  EXPR2     EQU 15
                      0036  *
                 0000 0037  CON1      RORG 0
                      0038            ENTRY CKMODE,BEGIN
                      0039            EXTRN WAIT,EXTINT,VGSUM,FLOAT,SHRES
                      0040            EXTRN DOK1,SETUP,OPERATE,COMP2S
                      0041            EXTRN ALLON,MESSAGE,DELAY1,SR1
```

```
                      *
0000 1A               BEGIN    DI
0001 70                        CLR
0002 B1                        OUTS 1
0003 B4                        OUTS 4
0004 B5                        OUTS 5
0005 B6                        OUTS 6
0006 B7                        OUTS 7
                      *
                      *   NOW TURN OFF EXTERNAL POWER,ALARM,LOAD LINE
                      *   AND CLOSE VALVE
                      *
0007 2068                      LI H'68'
0009 B0                        OUTS 0
                      *
                      *   NOW CLEAR ALL SCRATCH PAD REGISTERS
                      *
000A 203F                      LI O'77'
000C 50                        LR 0,A
000D 40               LP1      LR A,0
000E 0B                        LR IS,A
000F 70                        CLR
0010 5C                        LR S,A
0011 30                        DS 0
0012 94FA      000D            BNZ LP1
                      *
                      *   NOW TURN ALL SEGMENTS ON DISPLAY ON
                      *   AND WAIT FOR APPROX. 1.5 SECONDS
                      *
0014 2A0000    0000            DCI ALLON
0017 280000    0000            PI MESSAGE
001A 280000    0000            PI DELAY1
001D 290000    0000            JMP WAIT
                      *
                      ****************************************************
                      *
                      *   NOW  DO 2.5 MILLISECOND TIMER INTERRUPT
                      *
                      ****************************************************
                      *
                      *
                               ORG H'20'
                      *
0020 5A               TIMER    LR 10,A
0021 1E                        LR J,W          SAVE STATUS
0022 0A                        LR A,IS         SAVE ISAR
0023 5B                        LR 11,A
                      *
                      *   NOW READ COUNTERS AND ADD NEW COUNTS
                      *   TO FG AND FC ACCUMULATORS.
                      *
0024 A4               READ     INS 4 READ UNTIL TWO CONSECUTIVE
0025 50                        LR 0,A          READS ARE EQUAL
0026 A4                        INS 4
0027 E0                        XS 0
0028 94FB      0024            BNZ READ
                      *
                      *   NOW GET OLD READING AND REPLACE WITH NEW
                      *
002A 62                        LISU 2
002B 6B                        LISL 3
002C 4C                        LR A,S
002D 51                        LR 1,A          STORE OLD IN R1
002E 40                        LR A,0          GET NEW
002F 5C                        LR S,A          PUT IN STORAGE AS OLD
0030 18                        COM
0031 50                        LR 0,A
                      *
                      *   NOW POINT ISAR AT FC ACCUM
                      *
0032 63                        LISU 3
0033 6E                        LISL 6
0034 41                        LR A,1          GET OLD READING
```

```
0035 1F              0115              INC     DO 2'S COMPLEMENT
0036 C0              0116              AS 0
0037 217F            0117              NI H'7F'
0039 50              0118              LR 0,A              SAVE NEW COUNTS
003A CC              0119              AS S     ADD NEW COUNTS TO
003B 5D              0120              LR I,A              VC ACCUMULATOR
003C 4C              0121              LR A,S              ADD CARRY TO HIGH BYTE
003D 19              0122              LNK     IF ANY
003E 5D              0123              LR I,A
                     0124      *
                     0125      *   NOW ADD NEW COUNTS TO SENSOR COUNTER REG.
                     0126      *   ADD THE COUNTS UP IN R30 THEN DIVIDE
                     0127      *   BY 36 AND PUT RESULT IN R31
                     0128      *
                     0129      *
                     0130      *   IF HOLD SWITCH IS SET THEN DON'T ADD COUNTS
                     0131      *
003F A5              0132              INS 5
0040 2104            0133              NI 4
0042 940F     0052   0134              BNZ READ1           BR IF SET
0044 40              0135              LR A,0
0045 CC              0136              AS S
0046 5C              0137              LR S,A
0047 24B8            0138      SUB36   AI -72              DIVIDE BY 36
0049 9208     0052   0139              BNC READ1           BR IF LESS THAN 36
004B 5D              0140              LR I,A              PUT REMAINDER IN R30
004C 4C              0141              LR A,S
004D 1F              0142              INC                 INC R31
004E 5E              0143              LR D,A
004F 4C              0144              LR A,S
0050 90F6     0047   0145              BR SUB36            CHECK FOR MORE
                     0146      *
                     0147      *   NOW DO SAME FOR FG ACCUM
                     0148      *
0052 A5              0149      READ1   INS 5
0053 50              0150              LR 0,A
0054 A5              0151              INS 5
0055 E0              0152              XS 0
0056 94FB     0052   0153              BNZ READ1
0058 62              0154              LISU 2
0059 69              0155              LISL 1
005A 4C              0156              LR A,S
005B 14              0157              SR 4
005C 51              0158              LR 1,A
005D 7F              0159              LIS H'F'
005E FC              0160              NS S
005F 5C              0161              LR S,A              CLR OLD REGISTER
0060 40              0162              LR A,0
0061 18              0163              COM
0062 14              0164              SR 4
0063 50              0165              LR 0,A
0064 15              0166              SL 4
0065 CC              0167              AS S
0066 5C              0168              LR S,A
0067 64              0169              LISU 4
0068 6E              0170              LISL 6
0069 41              0171              LR A,1
006A 18              0172              COM
006B 1F              0173              INC
006C C0              0174              AS 0
006D 210F            0175              NI H'0F'
006F CC              0176              AS S     ADD NEW COUNTS TO
0070 5D              0177              LR I,A
0071 4C              0178              LR A,S
0072 19              0179              LNK     VC ACCUM
0073 5D              0180              LR I,A
                     0181      *
                     0182      *   NOW INCREMENT 40HZ COUNTER
                     0183      *   IF COUNTER IS 10 OR ABOVE GO TO 40HZ TASKS
                     0184      *
0074 62              0185              LISU 2
                     0186      *       LISL 0
0075 2010            0187              LI H'10'
```

```
0077 CC                      AS S
0078 5C                      LR S,A
0079 14                      SR 4
007A 2509                    CI 9
007C 9213    0090            BNC DO40HZ
                   *
                   *   NOW CHECK PULSE COUNTER R24
                   *
007E 6C                      LISL 4
007F 70                      CLR
0080 CC                      AS S
0081 8404    0086            BZ OUTMTR         IF 0 TURN MOTOR OFF
                   *
                   *   NOW DECREMENT PULSE COUNTER REGISTER 24
                   *
0083 3C            DEC1      DS S
0084 9405    008A            BNZ RETURN
                   *
                   *   NOW OUTPUT 0,0 TO MTR
                   *
0086 A0            OUTMTR    INS 0
0087 2230                    OI H'30'
0089 B0                      OUTS 0
                   *
                   *   NOW RETURN FROM INTERRUPTS
                   *
008A 1D            RETURN    LR W,J          RESTORE STATUS
008B 4B                      LR A,11         RESTORE ISAR
008C 0B                      LR IS,A
008D 4A                      LR A,10         RESTORE ACCUM
008E 1B                      EI
008F 1C                      POP
                   *
                   **************************************************
                   *
                   *    NOW DO 40HZ TASKS
                   *
                   **************************************************
                   *
                   *
                   *   NOW TRANSFER PW TO PULSE COUNTER
                   *
0090 6E            DO40HZ    LISL 6
0091 4C                      LR A,S
0092 6C                      LISL 4
0093 5D                      LR I,A
                   *
                   *   NOW DECREMENT PWSTR IF NOT 0
                   *
0094 70                      CLR
0095 CC                      AS S
0096 8405    009C            BZ ALARM
0098 3E                      DS D  DECREMENT PWSTR
                   *
                   *   NOW INCREMENT PULSE COUNTER R24
                   *
0099 4C                      LR A,S
009A 1F                      INC
009B 5C                      LR S,A
                   *
                   *   CHECK ALARM TIMER IF NOT 0 THEN TURN ON
                   *   ALARM.  IF IT IS 0 THEN TURN OFF ALARM.
                   *
009C 66            ALARM     LISU 6
009D 69                      LISL 1
009E 9004    00A3            BR ALM1          BR AROUNT EXTINT
                   *
                   ***********************************************
                   *
                   *   NOW DO EXTERNAL INTERRUPT
                   *
                             ORG H'A0'
                   *
```

```
00A0 290000 0000          JMP EXTINT
                   *
                   **************************************************
                   *
00A3 3C            ALM1      DS S
00A4 8208   00AD             BC ALMON
00A6 70                      CLR
00A7 5C                      LR S,A          KEEP TIMER AT 0
00A8 A0            ALMOFF    INS 0
00A9 21FB                    NI H'FB'
00AB 9004   00B0             BR OUTO
00AD A0            ALMON     INS 0
00AE 2204                    OI 4
00B0 B0            OUTO      OUTS 0
00B1 62                      LISU 2
                   **************************************************
                   *
                   *
                   *   THERE ARE SOME SPECIAL CASES WHERE THE  VALVE
                   *   SHOULD BE CLOSED NO MATTER WHAT THE CONTROL
                   *   IS DOING.  ONE EXAMPLE IS WHEN THE HOLD SWITCH
                   *   IS ON THIS WOULD CAUSE THE VALVE TO CLOSE.
                   *
                   **************************************************
                   *
                   *
                   *   IF SETUP TURN VALVE OFF
                   *
00B2 A1            CHKO      INS 1 IF SETUP MODE TURN VALVE OFF
00B3 2108                    NI 8  CHECK SETUP-OPERATE SWITCH
00B5 8412   00C8             BZ VALOFF
                   *
                   *   IF CHECK SUM FAIL FLAG IS SET THEN CLOSE VALVE
                   *
00B7 78                      LIS 8
00B8 F7                      NS 7
00B9 940E   00C8             BNZ VALOFF          BR IF FLAG IS SET
                   *
                   *   IF GROUND SPEED = LESS THAN 1.5  MPH (VG=<240)
                   *   THEN CLOSE VALVE
                   *
00BB 2080          CKVG      LI H'80'
00BD F8                      NS 8
00BE 8409   00C8             BZ VALOFF        BR IF < 1.5 MPH
                   *
                   *   IF HOLD SWITCH IS SET THEN CLOSE VALVE
                   *
00C0 62            HLDSW     LISU 2
00C1 A5                      INS 5
00C2 2104                    NI 4  CHECK FOR HOLD SWITCH
00C4 9403   00C8             BNZ VALOFF      BR IF HOLD SW. SET
00C6 900E   00D5             BR CKPW
                   *
                   *   NOW TURN VALVE OFF BY LOADING 10 IN PULSE CTR.
                   *   AND CLEAR FC ACCUMULATOR
                   *   AND SET NEGITIVE DRIVE FLAG
                   *
00C8 48            VALOFF    LR A,8
00C9 2201                    OI 1            SET NEG. FLAG
00CB 58                      LR 8,A
00CC 63                      LISU 3
00CD 6E                      LISL 6
00CE 70                      CLR
00CF 5D                      LR I,A
00D0 5C                      LR S,A
00D1 62                      LISU 2
00D2 6C                      LISL 4
00D3 7A                      LIS 10          LOAD PC WITH FULL DRIVE
00D4 5C                      LR S,A
                   *
                   *   END OF SPECIAL CASES
                   *
                   **************************************************
                   *
```

```
                    *
                    *  NOW CHECK PULSE COUNTER R24 IF 0 MOTOR OFF
                    *
00D5 6C             CKPW      LISL 4
00D6 70                       CLR
00D7 CC                       AS S
00D8 9406     00DF            BNZ MTRON
                    *
                    *   IF BOTH ARE 0 THEN TURN MOTOR OFF
                    *
00DA A0             MTROFF    INS 0
00DB 2230                     OI H'30'
00DD 9011     00EF            BR OUTSO
                    *
                    *   IS ERROR SIGN FLAG SET
                    *
00DF 71             MTRON     LIS 1
00E0 F8                       NS 8
00E1 8408     00EA            BZ FASTER
00E3 A0             SLOWER    INS 0
00E4 21CF                     NI H'CF'
00E6 2220                     OI H'20'
00E8 9006     00EF            BR OUTSO
00EA A0             FASTER    INS 0
00EB 21CF                     NI H'CF'
00ED 2210                     OI H'10'
00EF B0             OUTSO     OUTS 0
                    *
                    *   NOW CLR 40HZ TIMER AND INC 8HZ TIMER AND
                    *   CHECK FOR 8HZ TIME OUT
                    *
00F0 68             DONE40    LISL 0
00F1 7F                       LIS H'F'
00F2 FC                       NS S               RESET 40HZ TIMER
00F3 1F                       INC   INC 8HZ
00F4 5C                       LR S,A
00F5 2504                     CI 4  CHK FOR 5 OR ABOVE
00F7 9204     00FC            BNC DO8HZ
00F9 29008A   008A            JMP RETURN
                    *
                    *
                    **********************************************
                    *
                    *    NOW DO 8HZ TASKS
                    *
                    **********************************************
                    *
                    *    FIRST CLR 8HZ COUNTER
                    *
00FC 20F0           DO8HZ     LI H'F0'
00FE FC                       NS S
00FF 5D                       LR I,A
                    *
                    *
                    * INCREMENT ONE SECOND COUNTER
                    *
0100 4C                       LR A,S
0101 1F                       INC
0102 5C                       LR S,A
                    *
                    *   NOW ADD EITHER FC OF FG COUNTS INTO AN
                    *   ACCUM. (COUNT) THIS ACCUM IS USED FOR EITHER
                    *   SENSOR COUNTS OR A FOOT-METER COUNTER
                    *   ALSO IT IS USED IN DIST. CAL. MODE
                    *
                    *   BIT 5 REG. 8 IS USED TO FLAG FOOT COUNTER
                    *   IF BIT 5 IS 1 THEN ADD FG COUNTS
                    *   IF BIT 5 IS 0 THEN ADD FC COUNTS
                    *   IF DIST CAL. INPROGRESS FLAG IS 1 ADD FG COUNTS
                    *
                    *   IF HOLD SWITCH IS SET THEN DO NOT ADD COUNTS
                    *
0103 A5             ONWARD    INS 5 CHECK HOLD SWITCH
```

```
0104 2104                        NI 4
0106 9429    0130                BNZ STAC1
                     *
                     *   IF DISTANCE CAL IS IN PROGRESS ADD FG COUNTS
                     *
0108 71                          LIS 1
0109 F7                          NS 7
010A 8405    0110                BZ STAC          BR IF NOT DIST. CAL
010C 64                          LISU 4
010D 6E                          LISL 6
010E 9011    0120                BR ADDCNT
                     *
                     *  NOW GET READY TO ADD
                     *
0110 6E              STAC        LISL 6
0111 2020                        LI H'20'
0113 F8                          NS 8  CHECK BIT5
0114 64                          LISU 4           POINT ISAR AT FG ACCUM
0115 940A    0120                BNZ ADDCNT        BR IF FG
                     *
                     *  IT IS SENSOR COUNTS SO ADD R31 TO THE COUNT REG
                     *
0117 63                          LISU 3
0118 69                          LISL 1
0119 4C                          LR A,S
011A 52                          LR 2,A
011B 70                          CLR
011C 53                          LR 3,A
011D 5C                          LR S,A           CLR R31
011E 72                          LIS 2
011F 0B                          LR IS,A
0120 2A0FD7  0FD7    ADDCNT      DCI COUNT
0123 0E                          LR Q,DC
0124 16                          LM
0125 CD                          AS I
0126 52                          LR 2,A
0127 16                          LM
0128 19                          LNK
0129 CC                          AS S
012A 53                          LR 3,A
012B 0F                          LR DC,Q
012C 42                          LR A,2
012D 17                          ST
012E 43                          LR A,3
012F 17                          ST
                     *
                     *    READ FC ACCUM. AND PUT IN FCNEW R34-35 AND
                     *    CLR FC ACCUM.
                     *
0130 63              STAC1       LISU 3
0131 6E                          LISL 6
0132 4D                          LR A,I
0133 52                          LR 2,A
0134 4C                          LR A,S
0135 53                          LR 3,A
0136 70                          CLR
0137 5E                          LR D,A
0138 5E                          LR D,A
                     *
                     *  NOW PUT IN FCNEW
                     *
0139 43                          LR A,3
013A 5E                          LR D,A
013B 42                          LR A,2
013C 5C                          LR S,A
                     *
                     *    NOW READ AND RESET FG ACCUM. PUT READ VALUE
                     *   IN R4-5.
                     *
013D 64                          LISU 4
013E 6E                          LISL 6
013F 4D                          LR A,I
0140 54                          LR 4,A
```

```
0141 4C            0481         LR A,S
0142 55            0482         LR 5,A
0143 70            0483         CLR
0144 5E            0484         LR D,A
0145 5E            0485         LR D,A
                   0486  *
                   0487  *  IF IN TEST MODE PUT TEST SPEED IN PLACE OF FG
                   0488  *
0146 62            0489         LISU 2
0147 6F            0490         LISL 7
0148 7F            0491         LIS H'F'
0149 FC            0492         NS S
014A 250B          0493         CI H'0B'
014C 823A   0187   0494         BC STAC2         BR IF NOT TEST MODE
                   0495  *
                   0496  *  CLEAR FG IN CASE ONE SECOND NOT DONE
                   0497  *
014E 70            0498         CLR
014F 54            0499         LR 4,A
0150 55            0500         LR 5,A
                   0501  *
                   0502  *  NOW CHECK FOR ONE SECOND DONE, IF DONE THEN
                   0503  *  CALCULATE FG FROM TEST SPEED.
                   0504  *
0151 62            0505         LISU 2
0152 69            0506         LISL 1
0153 7F            0507         LIS H'F'
0154 FC            0508         NS S
0155 2507          0509         CI 7
0157 822F   0187   0510         BC STAC2         BR IF NOT ONESEC
                   0511  *
                   0512  *  NOW CONVERT TEST SPEED INTO FG COUNTS
                   0513  *
0159 280000 0000   0514         PI FLOAT
015C 01            0515         DC AL1(DCI)
015D 0FFD          0516         DC AL2(TSTSPD)
015F 03            0517         DC AL1(DC7071)
0160 0D            0518         DC AL1(NRM14)
0161 0E            0519         DC AL1(EXPR60)
0162 02            0520         DC 2
0163 0B            0521         DC AL1(SUBEXP)
                   0522  *
                   0523  *  NOW GET DIST. CAL#
                   0524  *
0164 01            0525         DC AL1(DCI)
0165 0FFA          0526         DC AL2(DIST)
0167 02            0527         DC AL1(DC7273)
0168 0D            0528         DC AL1(NRM14)
0169 0A            0529         DC AL1(ADDEXP)
016A 09            0530         DC AL1(DIVIDE)
016B 00            0531         DC AL1(POP)
                   0532  *
                   0533  *  NOW CHECK FOR METRIC IF SO MULT BY .62150404
                   0534  *
016C A1            0535         INS 1
016D 8111   017F   0536         BP SHR1          BR IF ENGLISH
016F 201B          0537         LI H'1B'
0171 54            0538         LR 4,A
0172 209F          0539         LI H'9F'
0174 55            0540         LR 5,A
0175 280000 0000   0541         PI FLOAT
0178 06            0542         DC AL1(MVRTMC)
0179 0C            0543         DC AL1(NRMLZ)
017A 0B            0544         DC AL1(SUBEXP)
017B 05            0545         DC AL1(MVITMP)
017C 04            0546         DC 4
017D 08            0547         DC AL1(MULT)
017E 00            0548         DC AL1(POP)
                   0549  *
                   0550  *  NOW REPLACE FG' WITH RESULT
                   0551  *
017F 280000 0000   0552  SHR1   PI SHRES
0182 6E            0553         LISL 6
```

```
0183 4E              0554              LR  A,D
0184 55              0555              LR  5,A
0185 4C              0556              LR  A,S
0186 54              0557              LR  4,A
                     0558  *
                     0559  *   NOW PUT FG ON TO VGSTAC
                     0560  *
0187 2A0FC0 0FC0     0561  STAC2   DCI VGSTAC
018A 62              0562              LISU 2
018B 69              0563              LISL 1
018C 7F              0564              LIS  H'F'
018D FC              0565              NS   S
018E 2507            0566              CI   7
0190 8206   0197     0567              BC   DOSL1       CHECK FOR 1 SECOND
0192 20F0            0568              LI   H'F0'
0194 FC              0569              NS   S
0195 5C              0570              LR   S,A         CLR 1 SEC. COUNTER
0196 70              0571              CLR
0197 13              0572  DOSL1   SL   1
0198 8E              0573              ADC
0199 44              0574              LR   A,4
019A 17              0575              ST
019B 45              0576              LR   A,5
019C 17              0577              ST
                     0578  *
                     0579  *   NOW ADD FG' TO AREA FG ACCUM
                     0580  *
                     0581  *   IF HOLD SWITCH IS SET DO NOT ADD IN ANY NEW CNTS
                     0582  *
019D A5              0583              INS  5
019E 2104            0584              NI   4   CHECK HOLD SWITCH
01A0 940A   01AB     0585              BNZ  VCACC       BR IF SW. IS SET
01A2 65              0586              LISU 5
01A3 6C              0587              LISL 4
01A4 44              0588              LR   A,4
01A5 CC              0589              AS   S
01A6 5D              0590              LR   I,A
01A7 45              0591              LR   A,5
01A8 19              0592              LNK
01A9 CC              0593              AS   S
01AA 5C              0594              LR   S,A
                     0595  *
                     0596  ***************************************************
                     0597  *
                     0598  *
                     0599  ***************************************************
                     0600  *
                     0601  *   NOW READ AND RESET FC ACCUMULATOR
                     0602  *   IF HOLD SWITCH IS SET THEN FC ACC. = 0
                     0603  *
                     0604  *
                     0605  *   NOW PUT FCNEW IN R2-3
                     0606  *
01AB 63              0607  VCACC   LISU 3
01AC 6C              0608              LISL 4
01AD 4D              0609              LR   A,I
01AE 52              0610              LR   2,A
01AF 4C              0611              LR   A,S
01B0 53              0612              LR   3,A
                     0613  *
                     0614  *   NOW ADD FC TO FC ACCUM FOR WEIGHT
                     0615  *
01B1 65              0616              LISU 5
01B2 6E              0617              LISL 6
01B3 42              0618              LR   A,2
01B4 CC              0619              AS   S
01B5 5D              0620              LR   I,A
01B6 43              0621              LR   A,3
01B7 19              0622              LNK
01B8 CC              0623              AS   S
01B9 5C              0624              LR   S,A
                     0625  *
                     0626  *   NOW ADD FC COUNTS TO 1 SEC ACCUM
                     0627  *
```

```
01BA 66                 FC1SEC   LISU 6
01BB 6C                          LISL 4
01BC 4D                          LR A,I
01BD C2                          AS 2
01BE 52                          LR 2,A
01BF 4E                          LR A,D
01C0 19                          LNK
01C1 C3                          AS 3
01C2 53                          LR 3,A
                        *
                        *   IF ONE SEC. COUNTER IS 0 THEN CLR ACCUM
                        *   AND PUT RESULT IN HOLDING REG. R66-67
                        *
01C3 62                          LISU 2
01C4 69                          LISL 1
01C5 7F                          LIS H'F'
01C6 FC                          NS S
01C7 66                          LISU 6
01C8 6C                          LISL 4
01C9 9404       01CE             BNZ PUTBK         BR IF ONE SEC. IS NOT UP
                        *
                        *    IF COUNTER IS 0 THEN ONESECOND IS UP
                        *
01CB 70                          CLR   CLR ACCUM R64-65
01CC 5D                          LR I,A
01CD 5D                          LR I,A
01CE 42                 PUTBK    LR A,2
01CF 5D                          LR I,A
01D0 43                          LR A,3
01D1 5D                          LR I,A
                        *
                        *   IF SET, SELECT OR DPSHIFT SWITCHES ARE NOT
                        *   ACTIVE THEN CLR SWITCH PRESSED FLAG
                        *
01D2 A5                          INS 5
01D3 2108                        NI 8           CHECK FOR DP ADJ.
01D5 840A       01E0             BZ DECTIM        BR IF ACTIVE
01D7 A5                          INS 5
01D8 2103                        NI H'03'
01DA 9405       01E0             BNZ DECTIM        BR IF ANY ARE SET
01DC 20FB                        LI H'FB'
01DE F8                          NS 8  RESET FLAG
01DF 58                          LR 8,A
                        *
                        *   NOW DECREMENT TIMER (IT CAN BE EITHER A 2 OR
                        *   5 SECOND COUNTER.  IT SETS A FLAG ON TRANSITION
                        *   FROM 1 TO 0.
                        *
01E0 65                 DECTIM   LISU 5
01E1 6A                          LISL 2
01E2 3C                          DS S
01E3 8205       01E9             BC CK0            BR IF > THEN 0
01E5 70                          CLR   CTR WAS 0 KEEP IT THERE
01E6 5C                          LR S,A
01E7 9007       01EF             BR CKMODE
01E9 9405       01EF    CK0      BNZ CKMODE        BR IF CTR NOT 0
01EB 48                          LR A,8
01EC 2208                        OI 8
01EE 58                          LR 8,A            SET TIMER FLAG
                        *
                        *   NOW CHECK MODE FOR SETUP OR OPERATE
                        *
01EF 2020               CKMODE   LI H'20'          CHK FOR DOING K FLAG
01F1 F7                          NS 7
01F2 8404       01F7             BZ CKM1           BR IF NOT SET
01F4 290000     0000             JMP DOK1          JMP IF SET
01F7 62                 CKM1     LISU 2
01F8 6F                          LISL 7
01F9 78                          LIS 8
01FA FC                          NS S
01FB 8404       0200             BZ SETP
01FD 290000     0000             JMP OPERATE
0200 290000     0000    SETP     JMP SETUP
                                 END
```

```
 THIS FILE ON DISK (CONT  2,0) 100% DRIVE
ERRS  LOC OBJECT ADDR LINE             SOURCE STATEMENT

                      0001      TITLE ' THIS FILE ON DISK (CONT  2,0) 100% DRIVE'
                      0002  *
                      0003  *   STARTING DATE 7/21/80
                      0004  *
                      0005  *   REVISION DATE 9\29\82
                      0006  *   VERSION #2
                      0007  *
                      0008  *   AUTHOR:  STEVE STONE
                      0009  *
                      0010  *   THIS PROGRAM IS USED TO CONTROL A CONVEYOR
                      0011  *   IN A SPREADER SYSTEM
                      0012  *
                 0FC0 0013  VGSTAC     EQU H'FC0'
                 0FD3 0014  KMLOW      EQU H'FD3'
                 0FF4 0015  WIDTH      EQU H'FF4'
                 0FE8 0016  APRATE     EQU H'FE8'
                 0FEE 0017  FDRATE     EQU H'FEE'
                 0FF1 0018  MATDEN     EQU H'FF1'
                 0FD9 0019  KRESULT    EQU H'FD9'
                 0FF7 0020  TRIM       EQU H'FF7'
                 0FDC 0021  APRIM      EQU H'FDC'
                 0FEB 0022  RATEST     EQU H'FEB'
                 0FFA 0023  DIST       EQU H'FFA'
                      0024  *
                      0025  *
                 0000 0026  POP       EQU 0
                 0001 0027  DCI       EQU 1
                 0002 0028  DC7273    EQU 2
                 0003 0029  DC7071    EQU 3
                 0004 0030  MVITMC    EQU 4
                 0005 0031  MVITMP    EQU 5
                 0006 0032  MVRTMC    EQU 6
                 0007 0033  MVRTMP    EQU 7
                 0008 0034  MULT      EQU 8
                 0009 0035  DIVIDE    EQU 9
                 000A 0036  ADDEXP    EQU 10
                 000B 0037  SUBEXP    EQU 11
                 000C 0038  NRMLZ     EQU 12
                 000D 0039  NRM14     EQU 13
                 000E 0040  EXPR60    EQU 14
                 000F 0041  EXPR2     EQU 15
                      0042  *
                 0000 0043  CON2       RORG 0
                      0044             ENTRY OPERATE,DOK,DOK1
                      0045             EXTRN DPX4,DPTBL,VGSUM,SR1,PWTBL
                      0046             EXTRN SHRES,SHREM,COMP2S,FLOAT,WAIT1
                      0047  *
                      0048  *   NOW PUT APP. RATE AS APRIM
                      0049  *
      0000 1A         0050  DOK        DI
      0001 2A0FE8 0FE8 0051            DCI APRATE
      0004 16         0052             LM
      0005 52         0053             LR 2,A
      0006 16         0054             LM
      0007 213F       0055             NI H'3F'
      0009 53         0056             LR 3,A
      000A 2A0FDC 0FDC 0057            DCI APRIM
      000D 42         0058             LR A,2
      000E 17         0059             ST
      000F 43         0060             LR A,3
      0010 17         0061             ST
                      0062  *
                      0063  *   NOW RESET APRATE STEP FLAG
                      0064  *
      0011 47         0065             LR A,7
      0012 21EF       0066             NI H'EF'
      0014 57         0067             LR 7,A
                      0068  *
                      0069  **************************************************
                      0070  *
```

```
                        0071  *    NOW DO CALCULATION FOR CONSTANT "K"
                        0072  *
                        0073  *    "K" TIMES VG = FC COUNTS
                        0074  ***********************************************************
                        0075  *
                        0076  *
                        0077  *    DO 'K' CALCULATION HERE
                        0078  *
0015 1A                 0079  DOK1      DI
0016 47                 0080            LR   A,7         SET DOING "K" FLAG
0017 2260               0081            OI   H'60'       AND APRATE UPDATE FLAG
0019 57                 0082            LR   7,A
001A 1B                 0083            EI
001B 2A0FE9 OFE9        0084            DCI  APRATE+1
001E 16                 0085            LM
001F 14                 0086            SR   4
0020 12                 0087            SR   1
0021 12                 0088            SR   1
0022 53                 0089            LR   3,A
0023 2A0FEF OFEF        0090            DCI  FDRATE+1
0026 16                 0091            LM
0027 14                 0092            SR   4
0028 12                 0093            SR   1
0029 12                 0094            SR   1
002A 18                 0095            COM
002B 1F                 0096            INC
002C C3                 0097            AS   3
002D 52                 0098            LR   2,A
002E C2                 0099            AS   2
002F C2                 0100            AS   2
0030 2A0000 0000        0101            DCI  PWTBL
0033 8E                 0102            ADC
0034 0E                 0103            LR   Q,DC
                        0104  *
                        0105  *    THE Q REG. NOW POINTS AT POWER TABLE
                        0106  *
0035 280000 0000        0107            PI   FLOAT
0038 0E                 0108            DC   AL1(EXPR60)
0039 2A                 0109            DC   42
003A 0F                 0110            DC   AL1(EXPR2)
003B 0B                 0111            DC   AL1(SUBEXP)
003C 02                 0112            DC   AL1(DC7273)
003D 01                 0113            DC   AL1(DCI)
003E 0FDC               0114            DC   AL2(APRIM)
0040 03                 0115            DC   AL1(DC7071)
0041 0D                 0116            DC   AL1(NRM14)
0042 0B                 0117            DC   AL1(SUBEXP)
0043 08                 0118            DC   AL1(MULT)
0044 06                 0119            DC   AL1(MVRTMC)
0045 0D                 0120            DC   AL1(NRM14)
0046 0B                 0121            DC   AL1(SUBEXP)
0047 01                 0122            DC   AL1(DCI)
0048 0FEE               0123            DC   AL2(FDRATE)
004A 02                 0124            DC   AL1(DC7273)
004B 00                 0125            DC   AL1(POP)
                        0126  *
                        0127  *    NOW REMOVE DP. LOCATION BITS FROM FDRATE
                        0128  *
004C 4C                 0129            LR   A,S
004D 213F               0130            NI   H'3F'
004F 5C                 0131            LR   S,A
0050 280000 0000        0132            PI   FLOAT
0053 0D                 0133            DC   AL1(NRM14)
0054 0A                 0134            DC   AL1(ADDEXP)
0055 09                 0135            DC   AL1(DIVIDE)
0056 06                 0136            DC   AL1(MVRTMC)
0057 0D                 0137            DC   AL1(NRM14)
0058 0B                 0138            DC   AL1(SUBEXP)
0059 01                 0139            DC   AL1(DCI)
005A 0FF1               0140            DC   AL2(MATDEN)
005C 02                 0141            DC   AL1(DC7273)
005D 0D                 0142            DC   AL1(NRM14)
005E 0A                 0143            DC   AL1(ADDEXP)
```

```
005F 09            0144              DC  AL1(DIVIDE)
0060 06            0145              DC  AL1(MVRTMC)
0061 0C            0146              DC  AL1(NRMLZ)
0062 0B            0147              DC  AL1(SUBEXP)
0063 01            0148              DC  AL1(DCI)
0064 0FF4          0149              DC  AL2(WIDTH)
0066 02            0150              DC  AL1(DC7273)
0067 0C            0151              DC  AL1(NRMLZ)
0068 0B            0152              DC  AL1(SUBEXP)
0069 08            0153              DC  AL1(MULT)
006A 06            0154              DC  AL1(MVRTMC)
006B 0C            0155              DC  AL1(NRMLZ)
006C 0B            0156              DC  AL1(SUBEXP)
006D 00            0157              DC  AL1(POP)
                   0158    *
                   0159    *   NOW GET ENGLISH OR METRIC CONSTANT
                   0160    *
006E 2A0078 0078   0161              DCI KFUDGE
0071 A1            0162              INS 1        CHECK ENGLISH OR METRIC
0072 810B    007E  0163              BP  ENG2
0074 73            0164              LIS 3
0075 8E            0165              ADC
0076 9007    007E  0166              BR  ENG2
0078 1A93C6        0167    KFUDGE    DC  H'1A93C6'
007B 18CAE8        0168              DC  H'18CAE8'
007E 0E            0169    ENG2      LR  Q,DC
007F 280000 0000   0170              PI  FLOAT
0082 0F            0171              DC  AL1(EXPR2)
0083 0B            0172              DC  AL1(SUBEXP)
0084 02            0173              DC  AL1(DC7273)
0085 08            0174              DC  AL1(MULT)
0086 06            0175              DC  AL1(MVRTMC)
0087 0C            0176              DC  AL1(NRMLZ)
0088 0B            0177              DC  AL1(SUBEXP)
0089 01            0178              DC  AL1(DCI)
008A 0FF7          0179              DC  AL2(TRIM)
008C 02            0180              DC  AL1(DC7273)
008D 0D            0181              DC  AL1(NRM14)
008E 0B            0182              DC  AL1(SUBEXP)
008F 08            0183              DC  AL1(MULT)
0090 06            0184              DC  AL1(MVRTMC)
0091 0D            0185              DC  AL1(NRM14)
0092 0B            0186              DC  AL1(SUBEXP)
0093 00            0187              DC  AL1(POP)
0094 2A0FD9 0FD9   0188              DCI KRESULT
0097 4C            0189              LR  A,S
0098 1A            0190              DI
0099 17            0191              ST
009A 67            0192              LISU 7
009B 4D            0193              LR  A,I
009C 17            0194              ST
009D 4C            0195              LR  A,S
009E 17            0196              ST
                   0197    *
                   0198    *   NOW RESET DOING "K" FLAG
                   0199    *   ALSO RESET DISTANCE CALIBRATE FLAGS.
                   0200    *
009F 47            0201              LR  A,7
00A0 21DC          0202              NI  H'DC'
00A2 57            0203              LR  7,A
                   0204    *
                   0205    *   NOW CHECK CHECKSUMS ON ALL PROGRAMED CONSTANTS
                   0206    *   IF ALL ARE OK CLR CHECKSUM FAIL FLAG BIT3 R7
                   0207    *
00A3 1A            0208    OPERATE   DI
00A4 20F7          0209              LI  H'F7'    CLR CKSUM FAIL FLAG
00A6 F7            0210              NS  7
00A7 57            0211              LR  7,A
00A8 78            0212              LIS 8
00A9 52            0213              LR  2,A      CLR CONSTANT COUNTER
00AA 2A0FE8 0FE8   0214              DCI APRATE   POINT DC A BEGINNING K
00AD 16            0215    ADDATA    LM
00AE 88            0216              AM
```

```
00AF 88              0217              AM
00B0 2555            0218              CI   H'55'       CHECK FOR VALID CHECKSUM
00B2 8405  00B8     0219              BZ   DEC         BR IF CHECKSUM OK
                    0220  *
                    0221  *   NOW SET CHECKSUM FAIL FLAG
                    0222  *
00B4 47             0223              LR   A,7
00B5 2208           0224              OI   8
00B7 57             0225              LR   7,A
                    0226  *
                    0227  *   NOW DEC CONSTANT COUNTER
                    0228  *
00B8 32             0229  DEC         DS   2
00B9 94F3  00AD     0230              BNZ  ADDATA
                    0231  *
                    0232  ***********************************************************
                    0233  *
                    0234  *   NOW DO OPERATE ROUTINES
                    0235  *
00BB 1B             0236  OP          EI
                    0237  *
                    0238  *   NOW CALCULATE VG
                    0239  *
                    0240  *
                    0241  *   FIRST PUT EXP IN R60
                    0242  *
00BC 280000 0000    0243              PI   FLOAT
00BF 0E             0244              DC   AL1(EXPR60)
00C0 07             0245              DC   7
                    0246  *
                    0247  *   NOW PUT DIST. CAL. # IN MPLIER
                    0248  *
00C1 01             0249              DC   AL1(DCI)
00C2 0FFA           0250              DC   AL2(DIST)
00C4 02             0251              DC   AL1(DC7273)
00C5 0C             0252              DC   AL1(NRMLZ)
00C6 0B             0253              DC   AL1(SUBEXP)
00C7 00             0254              DC   AL1(POP)
                    0255  *
                    0256  *   NOW ADD UP AND NRMLZ FG ACCUM.
                    0257  *
00C8 280000 0000    0258              PI   VGSUM
00CB 280000 0000    0259              PI   FLOAT
00CE 0C             0260              DC   AL1(NRMLZ)
00CF 0B             0261              DC   AL1(SUBEXP)
                    0262  *
                    0263  *   NOW MULTIPLY DIST. CAL. TIMES FG ACCUM
                    0264  *
00D0 08             0265              DC   AL1(MULT)
00D1 00             0266              DC   AL1(POP)
00D2 280000 0000    0267              PI   SHRES
                    0268  *
                    0269  *   NOW SAVE VG IN R44-45
                    0270  *
                    0271  *   THIS VG IS NRMLZED TO 1 SEC. WORTH OF FC
                    0272  *
00D5 67             0273              LISU 7
00D6 6D             0274              LISL 5
00D7 4D             0275              LR   A,I
00D8 54             0276              LR   4,A
00D9 4C             0277              LR   A,S
00DA 55             0278              LR   5,A
00DB 64             0279              LISU 4
00DC 6D             0280              LISL 5
00DD 5E             0281              LR   D,A
00DE 44             0282              LR   A,4
00DF 5C             0283              LR   S,A
                    0284  *
                    0285  *   IF MPH LESS THAN 1.5 THEN DONOT GET NEW KM
                    0286  *
00E0 48             0287              LR   A,8         RESET 1.5MPH FLAG
00E1 217F           0288              NI   H'7F'
00E3 58             0289              LR   8,A
```

```
00E4 70               0290           CLR
00E5 C5               0291           AS   5
00E6 9406    00ED     0292           BNZ  CKHLD
00E8 44               0293           LR   A,4
00E9 25F0             0294           CI   240
00EB 827E    016A     0295           BC   FCNEW         BR IF LESS
                      0296  *
                      0297  *   CHECK FOR HOLD SWITCH, IF SET THEN GO AROUND
                      0298  *   KM CALCULATION
                      0299  *
00ED 48               0300  CKHLD    LR   A,8           SET > 1.5MPH FLAG
00EE 2280             0301           OI   H'80'
00F0 58               0302           LR   8,A
00F1 A5               0303           INS  5
00F2 2104             0304           NI   4
00F4 9475    016A     0305           BNZ  FCNEW         BR IF HOLD SWITCH SET
                      0306  *
                      0307  *   NOW CHECK FOR KM STARTUP COUNTER
                      0308  *
00F6 2A0FD2  0FD2     0309           DCI  KMLOW-1
00F9 70               0310           CLR
00FA 88               0311           AM
00FB 846E    016A     0312           BZ   FCNEW         BR IF COUNTER AT 0
00FD 2502             0313           CI   2
00FF 9261    0161     0314           BNC  DECKM         BR IF >2
                      0315  *
                      0316  *   IF COUNTER IS 2 THEN CLR DELTA FC SUMS REG.
                      0317  *
0101 9406    0108     0318           BNZ  CKOFF         BR IF COUNTER = 1
0103 63               0319           LISU 3
0104 6A               0320           LISL 2
0105 70               0321           CLR
0106 5D               0322           LR   I,A
0107 5C               0323           LR   S,A
                      0324  *
                      0325  *   NOW FIND KM
                      0326  *
                      0327  *   FIRST GET FC' OLD AND DO 2SCOMP
                      0328  *
0108 64               0329  CKOFF    LISU 4
0109 69               0330           LISL 1
010A 280000  0000     0331           PI   COMP2S
                      0332  *
                      0333  *   DELTA FC = FC'NEW - FC'OLD
                      0334  *
010D 63               0335           LISU 3
010E 6C               0336           LISL 4
010F 42               0337           LR   A,2
0110 CD               0338           AS   I
0111 52               0339           LR   2,A
0112 43               0340           LR   A,3
0113 19               0341           LNK
0114 CC               0342           AS   S
0115 53               0343           LR   3,A
0116 8106    011D     0344           BP   POS           BR IF POSITIVE
                      0345  *
                      0346  *   IF NEG. MAKE POS.
                      0347  *
0118 73               0348           LIS  3
0119 0B               0349           LR   IS,A
011A 280000  0000     0350           PI   COMP2S
                      0351  *
                      0352  *   NOW ADD DELTA FC
                      0353  *   TO DELTA FC SUMMING REG. 32-33
                      0354  *
011D 63               0355  POS      LISU 3
011E 6A               0356           LISL 2
011F 42               0357           LR   A,2
0120 CC               0358           AS   S
0121 5D               0359           LR   I,A
0122 43               0360           LR   A,3
0123 19               0361           LNK
0124 CC               0362           AS   S
```

```
0125 5C                       LR S,A
                    *
                    *   IF KMCOUNTER IS 1 THEN DO KM CALCULATION
                    *
0126 2A0FD2 0FD2             DCI   KMLOW-1
0129 16                      LM
012A 2501                    CI    1
012C 9434    0161            BNZ   DECKM     BR IF NOT 1
                    *
                    *   NOW DO KM COMPUTATION
                    *
                    *
                    *  KM = 50 DIVIDED BY DELTA FC
                    *   SINCE THERE WILL BE 2 DELTA FC'S ADDED TOGETHER
                    *   50 IS MULTIPLIED BY 2 = 100 BUT WE ONLY WANT
                    *   70% SO WE DIVIDE 70 BY 2(DELTA FC'S)
                    *   NOW FC IS MULT. BY 4 SO 70/4=17.3 OR 20
                    *
                    *
                    *
                    *   FIRST LOAD EXP IN R60 TO GET THE NUMBER
                    *   THERE IS A -11 FOR DIVIDE
                    *   AND SINCE THERE IS 1 SINGLE BYTE DIGIT
                    *   WHICH IS SHIFTED 8 JUST BY PUTTING IT
                    *   IN HIGH BYTE THERE IS A -8 FOR IT
                    *  -11 -8 = -19 = H'ED'
                    *
                    *
                    *   FIRST PUT 20 IN DIVIDEND
                    *
012E 70             DOKM     CLR
012F 54                      LR 4,A
0130 2064                    LI 100
0132 55                      LR 5,A
0133 280000 0000             PI FLOAT
0136 0E                      DC AL1(EXPR60)
0137 ED                      DC H'ED'
0138 04                      DC AL1(MVITMC)
0139 04                      DC 4
013A 0D                      DC AL1(NRM14)
013B 0B                      DC AL1(SUBEXP)
                    *
                    *   NOW PUT DELTA FCSUMS IN DIVISOR
                    *
013C 05                      DC AL1(MVITMP)
013D 1A                      DC O'32'
013E 0D                      DC AL1(NRM14)
013F 0A                      DC AL1(ADDEXP)
0140 09                      DC AL1(DIVIDE)
0141 07                      DC AL1(MVRTMP)
0142 0D                      DC AL1(NRM14)
0143 0B                      DC AL1(SUBEXP)
0144 00                      DC AL1(POP)
                    *
                    *
                    *   NOW PUT RESULT AS NEW KM
                    *
0145 1A             STOR      DI
0146 2A0FD3 0FD3             DCI KMLOW
0149 0E                      LR Q,DC
014A 66                      LISU 6
014B 68                      LISL 0
014C 4C                       LR A,S      GET EXP
014D 17                       ST
014E 67                       LISU 7
014F 6A                       LISL 2
0150 4D                       LR A,I
0151 17                       ST
0152 4C                       LR A,S
0153 17                       ST
                    *
                    *   MAKE NEW CHECK SUM
                    *
```

```
0154 OF            0436              LR   DC,Q
0155 16            0437              LM
0156 88            0438              AM
0157 88            0439              AM
0158 18            0440              COM
0159 2456          0441              AI   H'56'
015B 17            0442              ST            STORE CKSUM
015C 47            0443              LR   A,7
015D 21EF          0444              NI   H'EF'
015F 57            0445              LR   7,A        CLR BLINK FLAG
0160 1B            0446              EI
                   0447       *
                   0448       *    NOW DECREMENT START UP COUNTER IF NOT ZERO
                   0449       *
0161 2A0FD2 0FD2   0450       DECKM  DCI  KMLOW-1
0164 0E            0451              LR   Q,DC
0165 16            0452              LM
0166 24FF          0453              AI   -1
0168 0F            0454              LR   DC,Q
0169 17            0455              ST
                   0456       *
                   0457       *    NOW PUT FCNEW R34-35 IN R40-41 AS FCOLD
                   0458       *
016A 63            0459       FCNEW  LISU 3
016B 6C            0460              LISL 4
016C 4D            0461              LR   A,I
016D 54            0462              LR   4,A
016E 4C            0463              LR   A,S
016F 55            0464              LR   5,A
0170 64            0465              LISU 4
0171 69            0466              LISL 1
0172 5E            0467              LR   D,A
0173 44            0468              LR   A,4
0174 5C            0469              LR   S,A
                   0470       *
                   0471       *
                   0472       *    NOW DO FORMULA TO FIND ERROR
                   0473       *
                   0474       *    ER = (VG)(K) - (FCSUM)4
                   0475       *
                   0476       *    FIRST PUT EXP IN R60
                   0477       *
0175 280000 0000   0478       ERSUM  PI   FLOAT
0178 0E            0479              DC   AL1(EXPR60)
0179 10            0480              DC   16
                   0481       *
                   0482       *    NOW PUT VG IN MCAND
                   0483       *
017A 04            0484              DC   AL1(MVITMC)
017B 24            0485              DC   O'44'
017C 0C            0486              DC   AL1(NRMLZ)
017D 0B            0487              DC   AL1(SUBEXP)
                   0488       *
                   0489       *    NOW MULTIPLY VG TIMES (K)
                   0490       *
017E 01            0491              DC   AL1(DCI)
017F 0FD9          0492              DC   AL2(KRESULT)
0181 0F            0493              DC   AL1(EXPR2)
0182 0A            0494              DC   AL1(ADDEXP)
0183 02            0495              DC   AL1(DC7273)
0184 08            0496              DC   AL1(MULT)
                   0497       *
                   0498       *    THE NEXT TWO INSTRUCTION ARE FOR DETERMINING
                   0499       *    HOW BIG THE NUMBER IS.
                   0500       *
0185 06            0501              DC   AL1(MVRTMC)
0186 0C            0502              DC   AL1(NRMLZ)
0187 00            0503              DC   AL1(POP)
                   0504       *
                   0505       *    NOW RESET ERROR JUNCTION OVER RANGE FLAG
                   0506       *
0188 20BF          0507              LI   H'BF'
018A F8            0508              NS   8
```

```
018B 58           0509          LR 8,A
                  0510  *
                  0511  *   NOW CHECK FLOATING PT. VALUE FOR >32767
                  0512  *
                  0513  *   IF RESULT IS ZERO THEN #<32767
                  0514  *
018C 67           0515          LISU 7
018D 6D           0516          LISL 5
018E 4D           0517          LR A,I
018F CC           0518          AS S
0190 19           0519          LNK
0191 8417    01A9 0520          BZ SHR          BR IF 0
0193 66           0521          LISU 6
0194 68           0522          LISL 0
0195 42           0523          LR A,2
0196 18           0524          COM
0197 1F           0525          INC
0198 CC           0526          AS S
0199 910F    01A9 0527          BM SHR          BR IF <32768
                  0528  *
                  0529  *   NUMBER IS GREATER THAN 32767 H'7FFF' SO
                  0530  *   SET ERROR JUNCT. FLAG AND SET RESULT TO 30000
                  0531  *
019B 48           0532          LR A,8
019C 2240         0533          OI H'40'
019E 58           0534          LR 8,A
019F 67           0535          LISU 7
01A0 6D           0536          LISL 5
01A1 2030         0537          LI H'30'
01A3 5D           0538          LR I,A
01A4 2075         0539          LI H'75'
01A6 5C           0540          LR S,A
01A7 9013    01BB 0541          BR GETFC
                  0542  *
                  0543  *   NOW UNFLOAT RESULT
                  0544  *
01A9 280000 0000 0545   SHR     PI SHREM
01AC 280000 0000 0546           PI SHRES
                  0547  *
                  0548  *   NOW CHECK REMAINDER FOR .5 OR GREATER
                  0549  *
01AF 2080         0550          LI H'80'
01B1 F4           0551          NS 4
01B2 8408    01BB 0552          BZ GETFC
01B4 6D           0553          LISL 5
01B5 4C           0554          LR A,S
01B6 1F           0555          INC
01B7 5D           0556          LR I,A
01B8 4C           0557          LR A,S
01B9 19           0558          LNK
01BA 5C           0559          LR S,A
                  0560  *
                  0561  *   NOW GET 2S COMP OF (FC)4 AND ADD TO RESULT
                  0562  *
01BB 63           0563  GETFC   LISU 3
01BC 6D           0564          LISL 5
01BD 4E           0565          LR A,D
01BE 13           0566          SL 1
01BF 13           0567          SL 1
01C0 53           0568          LR 3,A
01C1 4C           0569          LR A,S
01C2 14           0570          SR 4
01C3 12           0571          SR 1
01C4 12           0572          SR 1
01C5 C3           0573          AS 3
01C6 53           0574          LR 3,A
01C7 4C           0575          LR A,S
01C8 13           0576          SL 1
01C9 13           0577          SL 1
01CA 52           0578          LR 2,A
01CB 73           0579          LIS 3
01CC 0B           0580          LR IS,A
01CD 280000 0000 0581           PI COMP2S
```

```
01D0 67              0582            LISU 7
01D1 6D              0583            LISL 5
01D2 4D              0584            LR A,I
01D3 C2              0585            AS 2
01D4 54              0586            LR 4,A
01D5 4C              0587            LR A,S
01D6 19              0588            LNK
01D7 C3              0589            AS 3
01D8 55              0590            LR 5,A
                     0591    *
                     0592    *******************************************************
                     0593    *
                     0594    *    THIS IS THE BEGINING OF THE INTEGRATOR
                     0595    *
                     0596    *******************************************************
                     0597    *
01D9 8108    01E2    0598            BF      OKA         BR IF ER IS POS.
01DB 75              0599            LIS     5
01DC 0B              0600            LR      IS,A
01DD 280000 0000     0601            PI      COMP2S      MAKE POS IF NEG.
01E0 9005    01E6    0602            BR      OK1
01E2 45              0603    OKA     LR      A,5
01E3 53              0604            LR      3,A         KEEP \ER\ IN R2-3
01E4 44              0605            LR      A,4
01E5 52              0606            LR      2,A
                     0607    *
                     0608    *    SIGNED ERROR IN R4-5***ABS ERROR IN R2-3
                     0609    *
                     0610    *    TEST FOR CHANGE IN ERROR SIGNS
                     0611    *
01E6 65              0612    OK1     LISU 5
01E7 68              0613            LISL 0              POINT AT INTEGRATOR
01E8 45              0614            LR A,5
01E9 14              0615            SR 4
01EA 13              0616            SL 1
01EB 14              0617            SR 4
01EC E8              0618            XS 8
01ED 2101            0619            NI 1
01EF 840E    01FE    0620            BZ ADDINT
                     0621    *
                     0622    *    INTEGRATOR\2 IF ERROR SIGNS NOT EQUAL
                     0623    *
01F1 280000 0000     0624            PI SR1
01F4 2040            0625            LI H'40'
01F6 FC              0626            NS S
01F7 8406    01FE    0627            BZ ADDINT
01F9 4C              0628            LR A,S
01FA 22F0            0629            OI H'F0'
01FC 5C              0630            LR S,A
01FD 68              0631            LISL 0              KEEP AT LSB OF INT
                     0632    *
                     0633    *    NOW ADD SIGNED ERROR TO INTEGRATOR\4
                     0634    *
01FE 68              0635    ADDINT  LISL 0
01FF 4D              0636            LR A,I
0200 12              0637            SR 1
0201 12              0638            SR 1
0202 56              0639            LR 6,A
0203 4C              0640            LR A,S
0204 15              0641            SL 4
0205 13              0642            SL 1
0206 13              0643            SL 1
0207 C6              0644            AS 6
0208 C4              0645            AS 4
0209 52              0646            LR 2,A
020A 45              0647            LR A,5
020B 19              0648            LNK
020C 56              0649            LR 6,A
020D 4E              0650            LR A,D
020E 12              0651            SR 1
020F 12              0652            SR 1
0210 53              0653            LR 3,A
0211 2120            0654            NI H'20'
```

```
0213 8405    0219          BZ PLS
0215 20C0                  LI H'C0'
0217 C3                    AS 3
0218 53                    LR 3,A
0219 43           PLS      LR A,3
021A C6                    AS 6
021B 53                    LR 3,A
                  *
                  *   IF RESULT IS OVER + OR - 32767 THEN
                  *   CLEAR INTEGRATOR R50-51
                  *
021C 980A    0227          BNO BP1          BR IF LESS
021E 68                    LISL 0
021F 70                    CLR
0220 5D                    LR I,A
0221 5C                    LR S,A
                  *
                  *   NOW REPLACE RESULT WITH SIGNED ERROR
                  *
0222 44                    LR A,4
0223 52                    LR 2,A
0224 70                    CLR
0225 C5                    AS 5
0226 53                    LR 3,A
0227 810C    0234 BP1      BP PRO
0229 73                    LIS 3
022A 0B                    LR IS,A
022B 280000 0000           PI COMP2S
022E 48                    LR A,8      SET NEG. FLAG
022F 2201                  OI 1
0231 58                    LR 8,A
0232 9005    0238          BR PRO1
0234 48           PRO      LR A,8
0235 21FE                  NI H'FE'
0237 58                    LR 8,A
                  *
                  *  NOW ADD SIGNED ERROR TO INTEGRATOR
                  *
0238 65           PRO1     LISU 5
0239 68                    LISL 0
023A 44                    LR A,4
023B CC                    AS S
023C 5D                    LR I,A
023D 45                    LR A,5
023E 19                    LNK
023F CC                    AS S
0240 5E                    LR D,A
                  *
                  *   CHECK FOR GREATER THAN 32767 IF IT IS
                  *   THEN CLEAR INTEGRATOR
                  *
0241 9804    0246          BNO DCIK
0243 70                    CLR
0244 5D                    LR I,A
0245 5E                    LR D,A
                  *
                  *   IF START UP COUNTER IS NOT 0 THEN CHECK
                  *   FOR MPH >1.5 AND HOLD SW. NOT SET.  IF ALL
                  *   CONDITIONS ARE MET THEN SET VALVE FOR
                  *   FULL DRIVE POSITIVE
                  *
0246 2A0FD2 0FD2  DCIK     DCI KMLOW-1
0249 77                    LIS 7
024A 8A                    NM
024B 8417    0263          BZ SETSUM        BR IF COUNTER = 0
                  *
                  *   NOW CHECK FOR MPH >1.5
                  *
024D 2080                  LI H'80'
024F F8                    NS 8
0250 8412    0263          BZ SETSUM        BR IF < 1.5MPH
0252 A5           DOFULL   INS 5
0253 2104                  NI 4  CHECK HOLD SWITCH
```

```
0255 940D    0263 0728              BNZ SETSUM      BR IF ON
                  0729     *
                  0730     *   NOW SET ERROR TO POS. AND PW TO FULL DRIVE
                  0731     *
0257 20FE         0732              LI  H'FE'
0259 F8           0733              NS  8
025A 58           0734              LR  8,A
025B 7A           0735              LIS 10
025C 9055    02B2 0736              BR  OK
025E 401F         0737     ACONST   DC  HL2'401F'
0260 FD0033       0738     CCONST   DC  HL3'FD0033'
                  0739     *
                  0740     *
                  0741     *
                  0742     *   NOW GET PULSE WIDTH DRIVE INFO
                  0743     *
                  0744     *         PW = (KM)(ER)(C)
                  0745     *              ------------
                  0746     *                 (A+VG)
                  0747     *
                  0748     *   PWSTR = REMAINDER
                  0749     *
                  0750     *
0263 2A025E  025E 0751     SETSUM   DCI ACONST
0266 64           0752              LISU 4
0267 6C           0753              LISL 4
0268 16           0754              LM
0269 CD           0755              AS  I
026A 54           0756              LR  4,A
026B 16           0757              LM
026C 19           0758              LNK
026D CC           0759              AS  S
026E 55           0760              LR  5,A
                  0761     *
                  0762     *   (VG+A) IN R4-5
                  0763     *
026F 280000  0000 0764              PI  FLOAT       SET UP EXP. REG
0272 0E           0765              DC  AL1(EXPR60)
0273 15           0766              DC  21
                  0767     *
                  0768     *   NOW PUT ERROR IN MPLIER
                  0769     *
0274 04           0770              DC  AL1(MVITMC)
0275 02           0771              DC  2
0276 0C           0772              DC  AL1(NRMLZ)
0277 0B           0773              DC  AL1(SUBEXP)
                  0774     *
                  0775     *   NOW PUT KM IN MPCAND
                  0776     *
0278 01           0777              DC  AL1(DCI)
0279 0FD3         0778              DC  AL2(KMLOW)
027B 0F           0779              DC  AL1(EXPR2)
027C 0A           0780              DC  AL1(ADDEXP)
027D 02           0781              DC  AL1(DC7273)
027E 08           0782              DC  AL1(MULT)
027F 06           0783              DC  AL1(MVRTMC)
0280 0C           0784              DC  AL1(NRMLZ)
0281 0B           0785              DC  AL1(SUBEXP)
                  0786     *
                  0787     *   NOW MULTIPLY BY CONSTANT (C)
                  0788     *
0282 01           0789              DC  AL1(DCI)
0283 0260         0790              DC  AL2(CCONST)
0285 0F           0791              DC  AL1(EXPR2)
0286 0A           0792              DC  AL1(ADDEXP)
0287 02           0793              DC  AL1(DC7273)
0288 08           0794              DC  AL1(MULT)
0289 06           0795              DC  AL1(MVRTMC)
028A 0D           0796              DC  AL1(NRM14)
028B 0B           0797              DC  AL1(SUBEXP)
                  0798     *
                  0799     *   NOW DIVIDE BY (A + VG)
                  0800     *
```

```
028C 05                       DC AL1(MVITMP)
028D 04                       DC 4
028E 0D                       DC AL1(NRM14)
028F 0A                       DC AL1(ADDEXP)
0290 09                       DC AL1(DIVIDE)
0291 00                       DC AL1(POP)
0292 280000 0000               PI SHRES
                    *
                    *   IF ERROR IS GREATER THAN 255 THAN MAKE 10
                    *
0295 6E             PWSTR      LISL 6
0296 70                        CLR
0297 54                        LR 4,A       CLR PWSTR DATA TRANSFER REG.
0298 CE                        AS D
0299 7A                        LIS 10
029A 9417    02B2              BNZ OK
                    *
                    *   NOW GET PW BY DIVIDING BY 5
                    *
029C 4C                        LR A,S
029D 2532                      CI 50
029F 7A                        LIS 10
02A0 9211    02B2              BNC OK
02A2 70                        CLR
02A3 52                        LR 2,A
02A4 4C             T8J8       LR A,S
02A5 24FB                      AI -5
02A7 9205    02AD              BNC T8J7
02A9 5C                        LR S,A
02AA 32                        DS 2
02AB 90F8    02A4              BR T8J8
02AD 4C             T8J7       LR A,S       PWSTR
02AE 54                        LR 4,A
02AF 42                        LR A,2
02B0 18                        COM
02B1 1F                        INC          PW
                    *
                    *   NOW LOAD PW
                    *
02B2 62             OK         LISU 2
02B3 6E                        LISL 6
02B4 5E                        LR D,A
02B5 52                       LR 2,A       SAVE FOR CHECK FOR 10
                    *
                    *   NOW LOAD PWSTR
                    *
02B6 44                       LR A,4
02B7 5C             LDPWSTR   LR S,A
02B8 42                       LR A,2
02B9 250A                     CI 10
02BB 9406    02C2             BNZ BCONV
                    *
                    *  IF FULL DRIVE CLR INTEGRATOR SUM
                    *
02BD 65                       LISU 5
02BE 68                       LISL 0
02BF 70                       CLR
02C0 5D                       LR I,A
02C1 5C                       LR S,A
02C2 2B             BCONV     NOP
                    *
                    *****************************************************
                    *
                               END
```

```
. (CONT3,0) 100% DRIVE
.r ADDR LINE          SOURCE STATEMENT

                          TITLE 'THIS FILE ON DISK (CONT3,0) 100% DRIVE'
                     *
                     *    STARTING DATE 7/21/80
                     *
                     *    REVISION DATE 10\28\82
                     *
                     *    AUTHOR:  STEVE STONE
                     *
                     *
                     *    THIS PROGRAM IS USED TO CONTRON A CONVEYOR
                     *    IN A SPREADER SYSTEM
                     *
             0FE3    AREAINC    EQU H'FE3'
             0FE5    AREAAC     EQU H'FE5'
             0FDE    WETINC     EQU H'FDE'
             0FE0    WEIGHT     EQU H'FE0'
             0FDC    APRIM      EQU H'FDC'
             0FE8    APRATE     EQU H'FE8'
             0FEB    RATEST     EQU H'FEB'
             0FEE    FDRATE     EQU H'FEE'
             0FF1    MATDEN     EQU H'FF1'
             0FF4    WIDTH      EQU H'FF4'
             0FF7    TRIM       EQU H'FF7'
             0FFA    DIST       EQU H'FFA'
             0FFD    TSTSPD     EQU H'FFD'
             0FD7    COUNT      EQU H'FD7'
             0FD9    KRESULT    EQU H'FD9'
             0FD3    KMLOW      EQU H'FD3'
                     *
                     *
             0000    POP       EQU 0
             0001    DCI       EQU 1
             0002    DC7273    EQU 2
             0003    DC7071    EQU 3
             0004    MVITMC    EQU 4
             0005    MVITMP    EQU 5
             0006    MVRTMC    EQU 6
             0007    MVRTMP    EQU 7
             0008    MULT      EQU 8
             0009    DIVIDE    EQU 9
             000A    ADDEXP    EQU 10
             000B    SUBEXP    EQU 11
             000C    NRMLZ     EQU 12
             000D    NRM14     EQU 13
             000E    EXPR60    EQU 14
             000F    EXPR2     EQU 15
                     *
                     *
             0000    CON3       RORG 0
                     *
                     *
                                ENTRY DASHES
                                EXTRN LDDISP,SHRES,SHREM,MESSAGE,DOK
                                EXTRN DOK1,WAIT1,SR1
                                EXTRN FLOAT,PWTBL1,DPX4,COMP2S
                     *
                     *
                     *
0000 2040            OPER      LI H'40'
0002 F8                        NS 8
0003 942A    002E              BNZ FAIL1      BR IF ERROR JUNCT. TO BIG
                     *
                     *    IF KM HAS A CHECKSUM FAIL THEN PUT FAIL ON
                     *    DISPLAY UNLESS IN TEST SPEED MODE.
                     *
0005 2A0FD3  0FD3              DCI KMLOW
0008 16                        LM
0009 88                        AM
000A 88                        AM
000B 88                        AM
```

```
000C 2555                      CI H'55'
000E 841B    002A              BZ CFF         BR IF KM OK
0010 62                        LISU 2
0011 6F                        LISL 7
0012 77                        LIS 7
0013 FC                        NS S
0014 2504                      CI 4
0016 9417    002E              BNZ FAIL1       BR IF NOT TEST SPEED
0018 2A0FD2  0FD2              DCI KMLOW-1
001B 0E                        LR Q,DC
001C 77                        LIS 7
001D 8A                        NM
001E 9404    0023              BNZ LRA7        BR IF NOT 0
0020 0F                        LR DC,Q
0021 77                        LIS 7
0022 17                        ST
0023 47                LRA7    LR A,7
0024 2210                      OI H'10'        SET BLINK FLAG
0026 57                        LR 7,A
0027 290200  0200              JMP AD1
002A 78                CFF      LIS 8
002B F7                         NS 7
002C 8412    003F               BZ AREALL   BR IF FAIL FLAG RESET
                       *
                       *   FAIL FLAG IS SET PUT (FAIL) ON DISPLAY
                       *   AND TURN ON ALARM
                       *
002E 66                FAIL1    LISU 6
002F 69                         LISL 1
0030 76                         LIS 6
0031 5C                         LR S,A
0032 2A003B  003B               DCI FAIL
0035 280000  0000               PI MESSAGE
0038 290000  0000               JMP WAIT1
003B 717706            FAIL     DC H'71770638'
                       *
                       *   NOW DO AREA ALTIME ACCUMULATOR
                       *
                       *
                       *   FG" = DISTANCT COUNT ACCUMULATOR
                       *
                       *   INCREMENTAL AREA = (FG")(DIST.CAL.)(WIDTH)(CONST)
                       *
003F 207F              AREALL   LI H'7F'
0041 F7                         NS 7  CLR AREA OR WEIGHT FLAG
0042 57                         LR 7,A      AREA = 0 WEIGHT = 1
                       *
                       *   NOW CHECK FOR ENOUGH FG ACCUMULATION
                       *   TO ADD TO AREA ACCUM
                       *
                       *  FIRST PUT EXP IN R60
                       *
0043 280000  0000               PI FLOAT
0046 0E                         DC AL1(EXPR60)
0047 30                         DC 48
                       *
                       *   NOW PUT FG ACCUM. FOR AREA IN MC
                       *
0048 04                         DC AL1(MVITMC)
0049 2C                         DC O'54'
004A 0C                         DC AL1(NRMLZ)
004B 0B                         DC AL1(SUBEXP)
                       *
                       *   NOW GET DIST. CAL. #
                       *
004C 01                         DC AL1(DCI)
004D 0FFA                       DC AL2(DIST)
004F 02                         DC AL1(DC7273)
0050 0C                         DC AL1(NRMLZ)
0051 0B                         DC AL1(SUBEXP)
0052 08                         DC AL1(MULT)
0053 06                         DC AL1(MVRTMC)
0054 0C                         DC AL1(NRMLZ)
```

```
0055 0B              0144            DC AL1(SUBEXP)
                     0145  *
                     0146  *   NOW GET WIDTH
                     0147  *
0056 01              0148            DC AL1(DCI)
0057 0FF4            0149            DC AL2(WIDTH)
0059 02              0150            DC AL1(DC7273)
005A 0C              0151            DC AL1(NRMLZ)
005B 0B              0152            DC AL1(SUBEXP)
005C 08              0153            DC AL1(MULT)
005D 06              0154            DC AL1(MVRTMC)
005E 0C              0155            DC AL1(NRMLZ)
005F 0B              0156            DC AL1(SUBEXP)
0060 00              0157            DC AL1(POP)
                     0158  *
                     0159  *   NOW GET AREA ROLL OVER FLAG SO YOU CAN TELL
                     0160  *   IF YOU ARE COUNTING 1/10 OR ACRES
                     0161  *
0061 2A0FE6 0FE6     0162            DCI AREAAC+1     FLAG KEPT IN HI BYTE
0064 2080            0163            LI H'80'
0066 8A              0164            NM
0067 56              0165            LR 6,A
0068 2A0076 0076     0166            DCI AREACT
006B 8403   006F     0167            BZ INSONE     BR IF FLG NOT SET
006D 76              0168            LIS 6 POINT AT DIFFERENT SET
006E 8E              0169            ADC    OF CONSTANTS
                     0170  *
                     0171  *   NOW CHECK FOR ENGLISH OR METRIC
                     0172  *
006F A1              0173  INSONE    INS 1
0070 8111   0082     0174            BP ENG3      BR IF ENGLISH
0072 73              0175            LIS 3
0073 8E              0176            ADC
0074 900D   0082     0177            BR ENG3
0076 2FF5E1          0178  AREACT    DC H'2FF5E1'      ENGLISH 1\10
0079 2E0296          0179            DC H'2E0296'      METRIC  1\10
007C 32C3B4          0180            DC H'32C3B4'      ENGLISH 1'S
007F 3203F0          0181            DC H'3203F0'      METRIC  1'S
                     0182  *
                     0183  *
0082 0E              0184  ENG3     LR Q,DC          SAVE CONSTANT POINTER
0083 280000 0000     0185           PI FLOAT
0086 0F              0186           DC AL1(EXPR2)
0087 02              0187           DC AL1(DC7273)
0088 0B              0188           DC AL1(SUBEXP)
0089 08              0189           DC AL1(MULT)
008A 00              0190           DC AL1(POP)
008B 6E              0191           LISL 6
008C 280000 0000     0192           PI FLOAT
008F 0C              0193           DC AL1(NRMLZ)
0090 0B              0194           DC AL1(SUBEXP)
0091 00              0195           DC AL1(POP)
0092 4C              0196           LR A,S
0093 52              0197           LR 2,A           SAVE EXP.
                     0198  *
                     0199  ***************************************************
                     0200  *
                     0201  *   NOW INCREMENT AREA OR WEIGHT ACCUMULATORS ACCORD
                     0202  *   TO THE AREA OR WEIGHT FLAG BIT 7 R7
                     0203  *
                     0204  *   BIT 7 = 0 = AREA   BIT 7=1=WEIGHT
                     0205  *
                     0206  *
                     0207  *   IF FC OR FG ACCUM. MS BIT IS SET TAKE # NO
                     0208  *   MATTER WHAT
                     0209  *
0094 65              0210  DOBOTH    LISU 5
0095 6D              0211            LISL 5
0096 2080            0212            LI H'80'
0098 F7              0213            NS 7
0099 8402   009C     0214            BZ CKACC     BR IF AREA
009B 6F              0215            LISL 7       DO IF WEIGHT
009C 70              0216  CKACC     CLR
```

```
009D CC            0217           AS  S
009E 9109   00A8   0218           BM  OVER
                   0219  *
                   0220  *  NOW SEE IF THERE IS ENOUGH COUNTS TO TAKE BY
                   0221  *  CHECKING VALUE OR EXP.  IF IT IS WITHIN 16
                   0222  *  SHIFTS OF 0 THEN TAKE IT.  (I.E. EXP OF 'FX')
                   0223  *
00A0 42            0224           LR  A,2
00A1 25F0          0225           CI  H'F0'
00A3 9204   00A8   0226           BNC OVER      BR IF EXP IS BIG ENOUGH
00A5 29012A 012A   0227           JMP AREART
                   0228  *
                   0229  *  NOW GET READY TO ADD IN COUNTS TO REMAINDER
                   0230  *  AND INTIGER PARTS
                   0231  *
00A8 280000 0000   0232  OVER     PI  SHREM
00AB 280000 0000   0233           PI  SHRES
00AE 6D            0234           LISL 5        GET INTERGER
00AF 4D            0235           LR  A,I
00B0 55            0236           LR  5,A
00B1 4C            0237           LR  A,S
00B2 C6            0238           AS  6         ADD IN OVER FLAG IF ANY
00B3 56            0239           LR  6,A
                   0240  *
                   0241  *  NOW ADD NEW COUNTS TO ACCUM
                   0242  *
00B4 2A0FE3 0FE3   0243           DCI AREAINC
00B7 2080          0244           LI  H'80'     CHECK FOR AREA OR WEIGHT
00B9 F7            0245           NS  7
00BA 8404   00BF   0246           BZ  LDACC     BR IF AREA
00BC 2A0FDE 0FDE   0247           DCI WETINC
00BF 0E            0248  LDACC    LR  Q,DC
                   0249  *
                   0250  *  NOW CHECK FOR DIVIDE BY 10 FLAG
                   0251  *  IF SET DO NOT ADD PUT OLD# AS NEW#
                   0252  *
00C0 74            0253           LIS 4
00C1 F7            0254           NS  7
00C2 9425   00E8   0255           BNZ LDAR1
00C4 16            0256           LM            FOUR BYTE ADD
00C5 C3            0257           AS  3
00C6 53            0258           LR  3,A
00C7 16            0259           LM
00C8 19            0260           LNK
00C9 8203   00CD   0261           BC  A1
00CB C4            0262           AS  4
00CC 54            0263           LR  4,A
00CD 16            0264  A1       LM
00CE 19            0265           LNK
00CF 8203   00D3   0266           BC  A2
00D1 C5            0267           AS  5
00D2 55            0268           LR  5,A
00D3 16            0269  A2       LM
00D4 19            0270           LNK
00D5 217F          0271           NI  H'7F'     REMOVE ROLL OVER BIT FROM A
00D7 C6            0272           AS  6
00D8 56            0273           LR  6,A
                   0274  *
                   0275  *  NOW CHECK FOR OVER 9999
                   0276  *
00D9 213F          0277  LDAREA   NI  H'3F'     REMOVE FLAG
00DB 2527          0278           CI  H'27'     9999 = H'270F'
00DD 8405   00E3   0279           BZ  CKLO1     BR IF EQUAL
00DF 8208   00E8   0280           BC  LDAR1     BR IF LESS
00E1 9025   0107   0281           BR  X110      BR IF MORE
00E3 45            0282  CKLO1    LR  A,5       GET LOW BYTE
00E4 250F          0283           CI  H'F'
00E6 9220   0107   0284           BNC X110      BR IF MORE
                   0285  *
                   0286  *  NOW LOAD ACCUM. WITH NEW CHECKSUM
                   0287  *
00E8 0F            0288  LDAR1    LR  DC,Q
00E9 1A            0289           DI
```

```
00EA 43                           LR A,3
00EB 17                           ST
00EC 44                           LR A,4
00ED 17                           ST
00EE 45                           LR A,5
00EF 17                           ST
00F0 46                           LR A,6
00F1 17                           ST
                    *
                    *   NOW COMPUTE CHECKSUM
                    *
00F2 C5                           AS 5
00F3 C4                           AS 4
00F4 C3                           AS 3
00F5 18                           COM
00F6 2456                         AI H'56'
00F8 17                           ST    ST NEW CHECKSUM
                    *
                    *   NOW CLEAR FC OR FG ACCUM.  R56-56 OR R54-55
                    *
00F9 65                           LISU 5
00FA 6C                           LISL 4
00FB 2080                         LI H'80'    CHECK FOR AREA OR WEIGHT
00FD F7                           NS 7
00FE 8402     0101                BZ CLRACC
0100 6E                           LISL 6
0101 70             CLRACC        CLR
0102 5D                           LR I,A
0103 5C                           LR S,A
0104 1B                           EI
0105 9024     012A                BR AREART
                    *
                    *   NOW MULTIPLY AREA ACCUM BY .1:  IF ROLL OVER
                    *   FLAG IS ALREADY SET THEN CLR AREA ACCUM
                    *
0107 2080           X110          LI H'80'
0109 F6                           NS 6 CHECK FOR FLAG
010A 8408     0113                BZ X1
010C 70                           CLR
010D 53                           LR 3,A
010E 54                           LR 4,A
010F 55                           LR 5,A
0110 56                           LR 6,A
0111 90D6     00E8                BR LDAR1
0113 280000   0000  X1            PI FLOAT
0116 0E                           DC AL1(EXPR60)
0117 10                           DC 16
0118 04                           DC AL1(MVITMC)
0119 05                           DC 5
011A 0C                           DC AL1(NRMLZ)
011B 0B                           DC AL1(SUBEXP)
011C 00                           DC AL1(POP)
011D 2A0003   0003                DCI PWTBL1+3
                    *
                    *   NOW SET ROLL OVER FLAG AND DIVIDE BY 10 FLAG
                    *
0120 2080                         LI H'80'
0122 56                           LR 6,A
0123 47                           LR A,7
0124 2204                         OI 4
0126 57                           LR 7,A
0127 290082   0082                JMP ENG3
                    *
                    *   NOW CLEAR DIVIDE BY TEN FLAG
                    *
012A 20FB           AREART        LI H'FB'
012C F7                           NS 7
012D 57                           LR 7,A
                    *
                    *   NOW DECIDE WHETHER WEIGHT HAS BEEN DONE YET
                    *
012E 2080                         LI H'80'
0130 F7                           NS 7
```

```
0131 8404   0136  0363              BZ WEGHT    BR IF WEIGHT NOT DONE
0133 2901A2 01A2  0364              JMP MESS
                  0365  *
                  0366  *********************************************************
                  0367  *
                  0368  *   NOW DO MATERIAL SPREAD
                  0369  *
                  0370  *********************************************************
                  0371  *
                  0372  *   INCREMENTAL WEIGHT = (FC")(FEED RATE)(POWER OF 10)
                  0373  *   TIMES (DENSITY)(T')(CONST)
                  0374  *
0136 47           0375  WEGHT        LR A,7
0137 2280         0376               OI H'80'
0139 57           0377               LR 7,A
                  0378  *
                  0379  *   NOW SET UP EXP. REG. 60
                  0380  *
013A 280000 0000  0381               PI FLOAT
013D 0E           0382               DC AL1(EXPR60)
013E 4F           0383               DC 79
                  0384  *
                  0385  *   SINCE WE STARTED READING THE CLOCK LINE OF THE
                  0386  *   FC COUNTER THE WEIGHT ACCUMULATOR HAS BEEN OFF
                  0387  *   BY A FACTOR OF 2 CHANGING EXP. FROM 80 TO 79
                  0388  *   WILL FIX THE PROBLEM
                  0389  *
                  0390  *
                  0391  *   NOW PUT FC COUNTS IN MC
                  0392  *
013F 04           0393               DC AL1(MVITMC)
0140 2E           0394               DC 0'56'
0141 0C           0395               DC AL1(NRMLZ)
0142 0B           0396               DC AL1(SUBEXP)
                  0397  *
                  0398  *   NOW GET FEED RATE
                  0399  *
0143 01           0400               DC AL1(DCI)
0144 0FEE         0401               DC AL2(FDRATE)
0146 02           0402               DC AL1(DC7273)
0147 00           0403               DC AL1(POP)
0148 4C           0404               LR A,S       STRIP OFF POWER BITS
0149 52           0405               LR 2,A
014A 213F         0406               NI H'3F'
014C 5C           0407               LR S,A
014D 42           0408               LR A,2
014E 14           0409               SR 4
014F 12           0410               SR 1
0150 12           0411               SR 1
0151 52           0412               LR 2,A
0152 C2           0413               AS 2
0153 C2           0414               AS 2         MULT BY 3 FOR 3BYTE TBL
0154 2A0000 0000  0415               DCI PWTBL1
0157 8E           0416               ADC
0158 0E           0417               LR Q,DC      SAVE DC0
                  0418  *
                  0419  *   LEAVE Q-REG. POINTING AT POWER CONSTANT
                  0420  *
0159 280000 0000  0421               PI FLOAT
015C 0C           0422               DC AL1(NRMLZ)
015D 0B           0423               DC AL1(SUBEXP)
015E 08           0424               DC AL1(MULT)
015F 06           0425               DC AL1(MVRTMC)
0160 0C           0426               DC AL1(NRMLZ)
0161 0B           0427               DC AL1(SUBEXP)
                  0428  *
                  0429  *   NOW GET POWER OF TEST CONST
                  0430  *
0162 0F           0431               DC AL1(EXPR2)
0163 02           0432               DC AL1(DC7273)
0164 0B           0433               DC AL1(SUBEXP)
0165 08           0434               DC AL1(MULT)
0166 06           0435               DC AL1(MVRTMC)
```

```
0167 0C                       DC AL1(NRMLZ)
0168 0B                       DC AL1(SUBEXP)
                    *
                    *   NOW GET MATERIAL DENSITY
                    *
0169 01                       DC AL1(DCI)
016A 0FF1                     DC AL2(MATDEN)
016C 02                       DC AL1(DC7273)
016D 0C                       DC AL1(NRMLZ)
016E 0B                       DC AL1(SUBEXP)
016F 08                       DC AL1(MULT)
0170 06                       DC AL1(MVRTMC)
0171 0C                       DC AL1(NRMLZ)
0172 0B                       DC AL1(SUBEXP)
                    *
                    *   NOW GET TRIM
                    *
0173 01                       DC AL1(DCI)
0174 0FF7                     DC AL2(TRIM)
0176 02                       DC AL1(DC7273)
0177 0C                       DC AL1(NRMLZ)
0178 0B                       DC AL1(SUBEXP)
0179 08                       DC AL1(MULT)
017A 06                       DC AL1(MVRTMC)
017B 0C                       DC AL1(NRMLZ)
017C 0B                       DC AL1(SUBEXP)
017D 00                       DC AL1(POP)
017E 900D      018C             BR NEX
0180 2CE4BE         MATCT       DC H'2CE4BE'      ENGLISH X 1
0183 2D55EE                     DC H'2D55EE'      METRIC  X 1
0186 2FB698                     DC H'2FB698'      ENGLISH X10
0189 30ABBE                     DC H'30ABBE'      METRIC  X10
                    *
                    *
018C 2A0FE1 0FE1    NEX         DCI WEIGHT+1
018F 2080                       LI H'80'
0191 8A                         NM   GET ROLL OVER FLAG
0192 56                         LR 6,A
0193 2A0180 0180                DCI MATCT
0196 8403   019A                BZ CKEM           BR IF NO FLAG
0198 76                         LIS 6
0199 8E                         ADC  POINT AT X10TBL
019A A1             CKEM        INS 1 CHECK ENG. MET SWITCH
019B 8103   019F                BP ENG4
019D 73                         LIS 3
019E 8E                         ADC
019F 290082 0082    ENG4        JMP ENG3
                    *
                    *****************************************************
                    *
                    *   NOW DETERMIN WHAT SHOULD BE DISPLAYED ON READOUT
                    *
                    *****************************************************
                    *
                    *   FIRST CHECK FOR MESSAGES
                    *
                    *   CHECK FOR AP RATE ERR (APER)
                    *
01A2 A1             MESS        INS 1
01A3 2110                       NI H'10'
01A5 841C   01C2                BZ CKLOHP
                    *
                    *   NOW DO APER MESSAGE
                    *
01A7 62             DOAP        LISU 2
01A8 69                         LISL 1
01A9 77                         LIS 7
01AA FC                       NS S
01AB 52                         LR 2,A
01AC 2501                       CI 1
01AE 9205   01B4                BNC ARDALM        BR IF 1\4 SEC BEEP OVER
                    *
                    *   NOW SET ALARM
```

```
                     *
01B0 66                        LISU 6
01B1 69                        LISL 1
01B2 75                        LIS 5
01B3 5C                        LR S,A
                     *
                     *   NOW CHECK FOR 1\2 SEC UP
                     *
01B4 42              ARDALM    LR A,2
01B5 2503                      CI 3
01B7 920A    01C2              BNC CKLOHP       BR IF OVER 1\2 SEC
01B9 2A01BE  01BE              DCI APER
01BC 9039    01F6              BR MES1
01BE 777379          APER      DC H'77737950'
                     *
                     *   NOW CHECK FOR LOHP SW.
                     *
                     *  IF CLR SWITCH IS SET THEN ABORT LOW HOPPER
                     *
01C2 65              CKLOHP    LISU 5
01C3 6B                        LISL 3
01C4 A5                        INS 5
01C5 2101                      NI 1
01C7 9406    01CE              BNZ AD12         BR IF SWITCH IS SET
01C9 A1                        INS 1
01CA 2140                      NI H'40'
01CC 9405    01D2              BNZ DOLOHP
01CE 70              AD12      CLR
01CF 5C                        LR S,A           CLR 15 SEC TIMER
01D0 902F    0200              BR AD1
01D2 4C              DOLOHP    LR A,S
01D3 1F                        INC
01D4 2578                      CI 120           CHECK OVER 15 SEC
01D6 8202    01D9              BC DOLO
01D8 71                        LIS 1
01D9 5C              DOLO      LR S,A
01DA 52                        LR 2,A
01DB 2501                      CI 1
01DD 8407    01E5              BZ SETALM
01DF 2505                      CI 5
01E1 8403    01E5              BZ SETALM
01E3 900A    01EE              BR DOL1
01E5 A5              SETALM    INS 5            IF HOLD SWITCH THEN
01E6 2104                      NI 4               NO ALARM
01E8 9405    01EE              BNZ DOL1           BR IF IN HOLD
01EA 66                        LISU 6
01EB 69                        LISL 1
01EC 75                        LIS 5
01ED 5C                        LR S,A
01EE 42              DOL1      LR A,2           CHECK FOR OVER 3 SEC
01EF 2518                      CI 24
01F1 920E    0200              BNC AD1
01F3 2A01FC  01FC              DCI LOHP
01F6 280000  0000    MES1      PI MESSAGE
01F9 290000  0000              JMP WAIT1
01FC 385C76          LOHP      DC H'385C7673'
                     *
                     *  IF APRATE STEP FLAG IS SET (BIT 4 R7)
                     *  THEN BLINK DISPLAY OFF FOR 1\8 SEC
                     *
0200 2010            AD1       LI H'10'
0202 F7                        NS 7
0203 62                        LISU 2
0204 8411    0216              BZ AD2           BR IF NOT SET
0206 69                        LISL 1           BLINK ONLY IF 1 SEC
0207 77                        LIS 7
0208 FC                        NS S
0209 2503                      CI 3  BLINK FOR 1\8 SEC
020B 940A    0216              BNZ AD2
020D 2A0212  0212              DCI BLINK
0210 90E5    01F6              BR MES1
0212 000000          BLINK     DC H'00000000'
                     *
```

```
                          0582  *    NOW DO READOUT FOR OPERATE MODES
                          0583  *
0216 2A0223 0223  0584  AD2     DCI ADRES
0219 6F           0585          LISL 7
021A 77           0586          LIS 7   GET MODE
021B FD           0587          NS I         LEAVE ISAR LOWER AT 0
021C 13           0588          SL 1    2 BYTE TABLE
021D 8E           0589          ADC
021E 16           0590          LM
021F 04           0591          LR KU,A
0220 16           0592          LM
0221 05           0593          LR KL,A
0222 0C           0594          PK      GO TO MODE
0223 0233         0595  ADRES   DC AL2(APPRAT)
0225 0337         0596          DC AL2(SPEED)
0227 0419         0597          DC AL2(MATSPD)
0229 0414         0598          DC AL2(AREA)
022B 0387         0599          DC AL2(TSPEED)
022D 0233         0600          DC AL2(APPRAT)
022F 0395         0601          DC AL2(SENRPM)
0231 03B1         0602          DC AL2(SENCNT)
                          0603  *
                          0604  *********************************************************
                          0605  *
                          0606  *    NOW DO APP. RATE AND TEST APP. RATE
                          0607  *
                          0608  *
0233 280000 0000  0609  APPRAT  PI FLOAT
0236 0E           0610          DC AL1(EXPR60)
0237 FC           0611          DC H'FC'          = -4
0238 05           0612          DC AL1(MVITMP)
0239 24           0613          DC O'44'
023A 0D           0614          DC AL1(NRM14)
023B 0A           0615          DC AL1(ADDEXP)
                          0616  *
                          0617  *    NOW GET FC\4
                          0618  *    SINCE IT IS NOW USING FC DIVIDED BY 4
                          0619  *    2 HAS BEEN ADDED TO EXP. TO MULTIPLY IT BACK UP
                          0620  *
023C 04           0621          DC AL1(MVITMC)
023D 1C           0622          DC O'34'
023E 0D           0623          DC AL1(NRM14)
023F 0B           0624          DC AL1(SUBEXP)
0240 09           0625          DC AL1(DIVIDE)
0241 07           0626          DC AL1(MVRTMP)
0242 0D           0627          DC AL1(NRM14)
0243 0B           0628          DC AL1(SUBEXP)
                          0629  *
                          0630  *    NOW MULTIPLY BY APRIM
                          0631  *
0244 01           0632          DC AL1(DCI)
0245 0FDC         0633          DC AL2(APRIM)
0247 03           0634          DC AL1(DC7071)
0248 0C           0635          DC AL1(NRMLZ)
0249 0B           0636          DC AL1(SUBEXP)
024A 08           0637          DC AL1(MULT)
024B 06           0638          DC AL1(MVRTMC)
024C 0D           0639          DC AL1(NRM14)
024D 0B           0640          DC AL1(SUBEXP)
                          0641  *
                          0642  *    NOW DIVIDE BY "K"
                          0643  *
024E 01           0644          DC AL1(DCI)
024F 0FD9         0645          DC AL2(KRESULT)
0251 0F           0646          DC AL1(EXPR2)
0252 02           0647          DC AL1(DC7273)
0253 0B           0648          DC AL1(SUBEXP)
0254 09           0649          DC AL1(DIVIDE)
0255 00           0650          DC AL1(POP)
                          0651  *
                          0652  *    NOW GET RESULT AND PUT IN DISP REG.
                          0653  *
0256 280000 0000  0654          PI SHRES
```

```
0259 280000 0000  0655           PI FLOAT
025C 07           0656           DC AL1(MVRTMP)
025D 00           0657           DC AL1(POP)
                  0658  *
                  0659  *   IF MPH IS <1.5  OR START UP COUNTER IS NOT 0
                  0660  *   THEN MAKE READOUT REG.(727:3) ZERO.
                  0661  *
025E 2080         0662           LI H'80'
0260 F8           0663           NS 8              CHECK OVER 1.5MPH FLAG
0261 8408   026A  0664           BZ CLR72          BR IF < 1.5MPH
0263 2A0FD2 0FD2  0665  STCNT    DCI KMLOW-1
0266 77           0666           LIS 7
0267 8A           0667           NM
0268 8406   026F  0668           BZ SWIT
026A 67           0669  CLR72    LISU 7
026B 6A           0670           LISL 2
026C 70           0671           CLR
026D 5D           0672           LR I,A
026E 5C           0673           LR S,A
                  0674  *
                  0675  **********************************************************
                  0676  *
                  0677  *    NOW CHECK FOR APP RATE STEP SWITCH
                  0678  *
                  0679  *    DIGIT SELECT SWITCH = ADD STEP
                  0680  *    DIGIT SET    SWITCH = SUBTACT STEP
                  0681  *
026F A5           0682  SWIT     INS 5
0270 2103         0683           NI 3      CHECK FOR EITHER SW
0272 845A   02CD  0684           BZ APRET
0274 54           0685           LR 4,A
                  0686  *
                  0687  *   ONE OF THE SWITCHES ARE SET SO CHECK FOR
                  0688  *   SWITCH PRESSED FLAG
                  0689  *
0275 74           0690           LIS 4
0276 F8           0691           NS 8
0277 9455   02CD  0692           BNZ APRET         BR IF SP FLAG SET
0279 48           0693           LR A,8
027A 2204         0694           OI 4 SET SP FLAG
027C 58           0695           LR 8,A
027D 2A0FEB 0FEB  0696           DCI RATEST
0280 16           0697           LM
0281 52           0698           LR 2,A
0282 16           0699           LM
0283 53           0700           LR 3,A
                  0701  *
                  0702  *    NOW CHECK FOR ADD OR SUBTRACT
                  0703  *
0284 72           0704           LIS 2
0285 F4           0705           NS 4
0286 9406   028D  0706           BNZ ADDSTP  BR IF SELECT
                  0707  *
                  0708  *    NOW DO 2'S COMP ON STEP
                  0709  *
0288 60           0710           LISU 0
0289 6B           0711           LISL 3
028A 280000 0000  0712           PI COMP2S
                  0713  *
                  0714  *    NOT GET APRIM
                  0715  *
028D 2A0FDC 0FDC  0716  ADDSTP   DCI APRIM
0290 16           0717           LM
0291 54           0718           LR 4,A
0292 16           0719           LM
0293 55           0720           LR 5,A
                  0721  *
                  0722  *    NOW ADD
                  0723  *
0294 42           0724           LR A,2
0295 C4           0725           AS 4
0296 54           0726           LR 4,A
0297 43           0727           LR A,3
```

```
0298 19             0728              LNK
0299 C5             0729              AS 5
029A 55             0730              LR 5,A
029B 9131      02CD 0731              BM APRET     BR IF NEGATIVE
                    0732    *
                    0733    *   IF NEGATIVE NUMBER IS TRING TO GO PAST 0
                    0734    *
                    0735    *   NOW CHECK FOR OVER 30207
                    0736    *
029D 2575           0737              CI H'75'
029F 922D      02CD 0738              BNC APRET
                    0739    *
                    0740    *   NOW CHECK FOR APRIM AND APRATE EQUAL.
                    0741    *
02A1 1A             0742    LDAP      DI
02A2 20EF           0743              LI H'EF'
02A4 F7             0744              NS 7
02A5 57             0745              LR 7,A       RESET STEP FLAG
02A6 2A0FE8 0FE8    0746              DCI APRATE
02A9 16             0747              LM
02AA 52             0748              LR 2,A
02AB 16             0749              LM
02AC 213F           0750              NI H'3F'
02AE 53             0751              LR 3,A
02AF 60             0752              LISU 0
02B0 6B             0753              LISL 3
02B1 280000 0000    0754              PI COMP2S
02B4 44             0755              LR A,4
02B5 C2             0756              AS 2
02B6 52             0757              LR 2,A
02B7 45             0758              LR A,5
02B8 19             0759              LNK
02B9 C3             0760              AS 3
02BA C2             0761              AS 2
02BB 19             0762              LNK
02BC 8405      02C2 0763              BZ LDAP1     BR IF EQUAL
02BE 47             0764              LR A,7
02BF 2210           0765              OI H'10'     SET STEP FLAG
02C1 57             0766              LR 7,A
                    0767    *
                    0768    *   NOW LOAD NEW APRIM
                    0769    *
02C2 2A0FDC 0FDC    0770    LDAP1     DCI APRIM
02C5 44             0771              LR A,4
02C6 17             0772              ST
02C7 45             0773              LR A,5
02C8 17             0774              ST
                    0775    *
                    0776    *   NOW SET DO 'K' FLAG
                    0777    *
02C9 47             0778              LR A,7
02CA 2220           0779              OI H'20'
02CC 57             0780              LR 7,A
                    0781    *
                    0782    *   NOW CHECK FOR UPDATE FLAG OR ONE SECOND
                    0783    *   COUNTER EQUAL TO 4:  IF EITHER IS TRUE
                    0784    *   THEN UPDATE APPRATE READOUT
                    0785    *
02CD 2040           0786    APRET     LI H'40'
02CF F7             0787              NS 7
02D0 940C      02DD 0788              BNZ APRET1       BR IF UPDATE FLAG SET
02D2 62             0789              LISU 2
02D3 69             0790              LISL 1
02D4 77             0791              LIS 7
02D5 FC             0792              NS S
02D6 2504           0793              CI 4
02D8 8404      02DD 0794              BZ APRET1        BR IF = TO 4
02DA 290000 0000    0795              JMP WAIT1
                    0796    *
                    0797    *   NOW AVERAGE NEW READING WITH OLD UNLESS THE
                    0798    *   UPDATE FLAG IS SET.  IF IT IS SET THEN DO NOT
                    0799    *   AVERAGE IN OLD.
                    0800    *   IF NEW READING IS 0 THEN MAKE READOUT 0
```

```
                    0801  *
02DD 1A             0802  APRET1  DI
02DE 67             0803          LISU 7
02DF 6A             0804          LISL 2
02E0 4D             0805          LR A,I
02E1 CE             0806          AS D
02E2 19             0807          LNK
02E3 8408    02EC   0808          BZ LDOLD
                    0809  *
                    0810  *   NOW CHECK FOR UPDATE FLAG IF SET DO NOT AVG.
                    0811  *
02E5 2040           0812          LI H'40'
02E7 F7             0813          NS 7
02E8 9403    02EC   0814          BNZ LDOLD
                    0815  *
                    0816  *   PUT DISPLAY VALUE IN R2-3
                    0817  *   IF AVERAGING IS NOT IN EFFECT
                    0818  *
02EA 64             0819  DOROU   LISU 4
02EB 6A             0820          LISL 2
02EC 4D             0821  LDOLD   LR A,I
02ED 53             0822          LR 3,A
02EE 4C             0823          LR A,S
02EF 54             0824          LR 4,A
02F0 67             0825          LISU 7
02F1 6A             0826          LISL 2
02F2 4C             0827          LR A,S
02F3 C3             0828          AS 3
02F4 53             0829          LR 3,A
02F5 5D             0830          LR I,A
02F6 4C             0831          LR A,S
02F7 19             0832          LNK
02F8 C4             0833          AS 4
02F9 54             0834          LR 4,A
02FA 5E             0835          LR D,A
                    0836  *
                    0837  *   NOW SHIFT R72-73 RIGHT1
                    0838  *
02FB 280000 0000    0839          PI SR1
                    0840  *
                    0841  *   NOW SHIFT R2-3 RIGHT 1
                    0842  *
02FE 73             0843          LIS 3
02FF 0B             0844          LR IS,A
0300 280000 0000    0845          PI SR1
0303 64             0846          LISU 4
0304 6A             0847          LISL 2
0305 43             0848          LR A,3
0306 5D             0849          LR I,A
0307 44             0850          LR A,4
0308 5C             0851          LR S,A
                    0852  *
                    0853  *   NOW CHECK FOR OVER 9999 IN READOUT REG.
                    0854  *   IF OVER THEN SET DECIMAL PT. SHIFT FLAG
                    0855  *   R8 BIT-1 AND DIVIDE READOUT BY 10
                    0856  *
0309 20FD           0857          LI H'FD'
030B F8             0858          NS 8
030C 58             0859          LR 8,A           RESET D.P. SHIFT FLAG
030D 44             0860          LR A,4
030E 2527           0861          CI H'27'
0310 8406    0317   0862          BZ CKLO
0312 9209    031C   0863          BNC OVER1
0314 70             0864          CLR
0315 901E    0334   0865          BR EI2           BR IF LESS
0317 43             0866  CKLO    LR A,3
0318 250F           0867          CI H'F'
031A 8219    0334   0868          BC EI2
                    0869  *
                    0870  *   NUMBER IS OVER DIVIDE BY 10 (MULTIPLY BY .1)
                    0871  *
031C 2A0003 0003    0872  OVER1   DCI PWTBL1+3    POINT AT .1 CONST.
031F 0E             0873          LR Q,DC
```

```
0320 280000 0000  0874         PI FLOAT
0323 0E           0875         DC AL1(EXPR60)
0324 10           0876         DC 16
0325 0F           0877         DC AL1(EXPR2)
0326 02           0878         DC AL1(DC7273)
0327 0B           0879         DC AL1(SUBEXP)
0328 04           0880         DC AL1(MVITMC)
0329 03           0881         DC 3
032A 0C           0882         DC AL1(NRMLZ)
032B 0B           0883         DC AL1(SUBEXP)
032C 08           0884         DC AL1(MULT)
032D 00           0885         DC AL1(POP)
032E 48           0886         LR A,S
032F 2202         0887         OI 2
0331 58           0888         LR S,A        SET D.P. SHIFT FLAG
0332 9071    03A4 0889         BR SHR
0334 1B           0890  EI2    EI
0335 9076    03AC 0891         BR LD1
                  0892  *
                  0893  *************************************************************
                  0894  *
                  0895  *   NOW DO SPEED IN EITHER MPH OR KMPH
                  0896  *
                  0897  *************************************************************
                  0898  *
                  0899  *
                  0900  *   SPEED IN TENTHS = VG\16 ENGLISH = VG\16)(1.609)ME
                  0901  *   UP DATE SPEED EVERY SECOND OR WHEN UPDATE FLAG
                  0902  *   IS SET
                  0903  *
0337 62           0904  SPEED  LISU 2
0338 69           0905         LISL 1
0339 77           0906         LIS 7
033A FC           0907         NS S
033B 2504         0908         CI 4
033D 8406    0344 0909         BZ SPEED1
033F 2040         0910         LI H'40'
0341 F7           0911         NS 7
0342 841A    035D 0912         BZ NOTNOW
0344 64           0913  SPEED1 LISU 4        GET VG
0345 6C           0914         LISL 4
0346 4D           0915         LR A,I
0347 52           0916         LR 2,A
0348 4C           0917         LR A,S
0349 53           0918         LR 3,A
                  0919  *
                  0920  *   IF VG IS OVER 40 MPH OR H'1900' THEN PUT
                  0921  *   DASHES ON DISP.(----)
                  0922  *
034A 43           0923         LR A,3
034B 2519         0924         CI H'19'
034D 8405    0353 0925         BZ CHK2       BR IF EQUAL TO H'19'
034F 8214    0364 0926         BC SPDOK      BR IF UNDER
0351 9005    0357 0927         BR DAS        BR IF OVER
0353 70           0928  CHK2   CLR
0354 C2           0929         AS 2
0355 840E    0364 0930         BZ SPDOK      BR IF EQUAL TO H7'1900'
0357 2A0360  0360 0931  DAS    DCI DASHES    NOW PUT DASHES ON DISPLAY
035A 280000  0000 0932         PI MESSAGE
035D 290000  0000 0933  NOTNOW JMP WAIT1
0360 404040       0934  DASHES DC H'40404040'
                  0935  *
                  0936  *   NOW CHECK FOR METRIC OR ENGLISH
                  0937  *
0364 A1           0938  SPDOK  INS 1
0365 910E    0374 0939         BM METR
                  0940  *
                  0941  *   IT IS ENGLISH SO DIVIDE BY 16 BY PUTTING THE
                  0942  *   THE NUMBER IN THE RESULT REG. AND 4 IN THE EXP.
                  0943  *
                  0944  *   THEN CALL SHIFT RESULT
                  0945  *
0367 67           0946         LISU 7
0368 6D           0947         LISL 5
```

```
0369 42              0948              LR   A,2
036A 5D              0949              LR   I,A
036B 43              0950              LR   A,3
036C 5C              0951              LR   S,A
036D 66              0952              LISU 6
036E 68              0953              LISL 0
036F 20FC            0954              LI   -4
0371 5C              0955              LR   S,A
0372 9031    03A4    0956              BR   SHR
                     0957    *
                     0958    *    NOW DO METRIC CONVERSION
                     0959    *
0374 280000 0000     0960    METR      PI FLOAT
0377 0E              0961              DC AL1(EXPR60)
0378 FD              0962              DC H'FD'         = -3
0379 04              0963              DC AL1(MVITMC)
037A 24              0964              DC 0'44'
037B 0C              0965              DC AL1(NRMLZ)
037C 0B              0966              DC AL1(SUBEXP)
                     0967    *
                     0968    *    NOW LOAD CONTSTANT DIVIDED BY 16
                     0969    *
037D 01              0970              DC AL1(DCI)
037E 0385            0971              DC AL2(METCT)
0380 02              0972              DC AL1(DC7273)
0381 08              0973              DC AL1(MULT)
0382 00              0974              DC AL1(POP)
0383 9020    03A4    0975              BR SHR
0385 F4CD            0976    METCT     DC HL2'F4CD'
                     0977    ****************************************************
                     0978    *
                     0979    *    NOW DO TEST SPEED
                     0980    *
                     0981    ****************************************************
                     0982    *
0387 2A0FFD 0FFD     0983    TSPEED    DCI TSTSPD
                     0984    *
                     0985    *    IF HOLD SWITCH IS SET CHECK FOR SPECIAL
                     0986    *    CLEAR FOR KM
                     0987    *
038A A5              0988              INS  5
038B 2104            0989              NI   4
038D 9404    0392    0990              BNZ  CLRR          BR IF HOLD SET
038F 290490 0490     0991              JMP  OP1
0392 29041C 041C     0992    CLRR      JMP  CLEAR
                     0993    ****************************************************
                     0994    *
                     0995    *    NOW DO SENSOR RPM
                     0996    *
                     0997    ****************************************************
                     0998    *
0395 280000 0000     0999    SENRPM    PI FLOAT          PUT EXP IN R60
0398 0E              1000              DC AL1(EXPR60)
0399 FD              1001              DC H'FD'
                     1002    *
                     1003    *    GET ONE SECONDS WORTH OF FC COUNTS
                     1004    *
039A 04              1005              DC AL1(MVITMC)
039B 36              1006              DC 0'66'
039C 0C              1007              DC AL1(NRMLZ)
039D 0B              1008              DC AL1(SUBEXP)
                     1009    *
                     1010    *    NOW PUT CONSTANT IN MPLIER
                     1011    *
039E 01              1012              DC AL1(DCI)
039F 03AF            1013              DC AL2(SENCT)
03A1 02              1014              DC AL1(DC7273)
03A2 08              1015              DC AL1(MULT)
03A3 00              1016              DC AL1(POP)
03A4 280000 0000     1017    SHR       PI SHRES
03A7 280000 0000     1018              PI FLOAT
03AA 07              1019              DC AL1(MVRTMP)
03AB 00              1020              DC AL1(POP)
```

```
03AC 290000 0000  1021  LD1      JMP LDDISP
03AF ABAA         1022  SENCT    DC HL2'ABAA'
                  1023  ************************************************************
                  1024  *
                  1025  *    NOW DO SENSOR COUNTER
                  1026  *
                  1027  ************************************************************
                  1028  *
                  1029  *    IF IN SENSOR COUNT MODE AND TEST SPEED IS SET
                  1030  *    TO 0 THEN IT IS FOOT OR METER COUNTER.
                  1031  *
03B1 1A           1032  SENCNT   DI
03B2 20DF         1033           LI H'DF'
03B4 F8           1034           NS 8  CLR COUNTER FLAG
03B5 58           1035           LR 8,A
03B6 2A0FFD OFFD  1036           DCI TSTSPD  CHECK FOR 0
03B9 16           1037           LM
03BA 88           1038           AM
03BB 19           1039           LNK
03BC 2A0FD7 0FD7  1040           DCI COUNT
03BF 0E           1041           LR Q,DC
03C0 8416  03D7   1042           BZ FOOTCT      BR IF ZERO
03C2 1B           1043           EI
                  1044  *
                  1045  *    NOW DO SENSOR COUNTER
                  1046  *    IF COUNT REG. OVER 9999 THEN SUBTRACT
                  1047  *    10,000 AND PUT REMAINDER BACK.
                  1048  *
                  1049  *
03C3 16           1050           LM
03C4 24F0         1051           AI H'F0'
03C6 52           1052           LR 2,A
03C7 16           1053           LM
03C8 19           1054           LNK
03C9 24D8         1055           AI H'D8'
03CB 53           1056           LR 3,A
03CC 9242  040F   1057           BNC SENCN1
                  1058  *
                  1059  *    NOW PUT BACK REMAINDER
                  1060  *
03CE 0F           1061           LR DC,Q
03CF 42           1062           LR A,2
03D0 1A           1063           DI
03D1 17           1064           ST
03D2 43           1065           LR A,3
03D3 17           1066           ST
03D4 1B           1067           EI
03D5 9039  040F   1068           BR SENCN1
                  1069  *
                  1070  *    NOW DO FOOT COUNTER
                  1071  *
                  1072  *    FIRST SET FOOT COUNTER FLAG
                  1073  *
03D7 48           1074  FOOTCT   LR A,8
03D8 2220         1075           OI H'20'
03DA 58           1076           LR 8,A
03DB 280000 0000  1077           PI FLOAT
03DE 0E           1078           DC AL1(EXPR60)
03DF 20           1079           DC 32
03E0 03           1080           DC AL1(DC7071)
03E1 0C           1081           DC AL1(NRMLZ)
03E2 0B           1082           DC AL1(SUBEXP)
                  1083  *
                  1084  *    GET DISTANCE CALIBRATE #
                  1085  *
03E3 01           1086           DC AL1(DCI)
03E4 0FFA         1087           DC AL2(DIST)
03E6 02           1088           DC AL1(DC7273)
03E7 0C           1089           DC AL1(NRMLZ)
03E8 0B           1090           DC AL1(SUBEXP)
03E9 08           1091           DC AL1(MULT)
03EA 06           1092           DC AL1(MVRTMC)
03EB 0C           1093           DC AL1(NRMLZ)
```

```
03EC 0B                     DC AL1(SUBEXP)
03ED 00                     DC AL1(POP)
03EE 2A03F8 03F8            DCI FOTCON
03F1 A1                     INS 1
03F2 810B   03FE            BP ENG6
03F4 73                     LIS 3
03F5 8E                     ADC
03F6 9007   03FE            BR ENG6
03F8 1F3196      FOTCON     DC H'1F3196'
03FB 211B87                 DC H'211B87'       MET
03FE 0E          ENG6       LR Q,DC
03FF 280000 0000            PI FLOAT
0402 0F                     DC AL1(EXPR2)
0403 02                     DC AL1(DC7273)
0404 0B                     DC AL1(SUBEXP)
0405 08                     DC AL1(MULT)
0406 00                     DC AL1(POP)
0407 280000 0000            PI SHRES
040A 280000 0000            PI FLOAT
040D 07                     DC AL1(MVRTMP)
040E 00                     DC AL1(POP)
040F 2A0FD7 0FD7 SENCN1     DCI COUNT
0412 9009   041C            BR CLEAR
                 ******************************************************
                 *
                 *    NOW DO AREA
                 *
                 ******************************************************
                 *
0414 2A0FE5 0FE5 AREA       DCI AREAAC
0417 9004   041C            BR CLEAR
                 *
                 ******************************************************
                 *
                 *    NOW DO MATERIAL SPREAD
                 *
                 ******************************************************
                 *
0419 2A0FE0 0FE0 MATSPD     DCI WEIGHT
                 *
                 ******************************************************
                 *
                 *    CLEAR IS A ROUTINE THAT CLEARS AN ACCUMULATOR
                 *    IF THE CLEAR SWITCH ON FRONT PANEL IS HELD
                 *    FOR FIVE SECONDS
                 *
                 *    FIRST CHECK FOR SWITCH PRESSED FLAG
                 *
041C 74          CLEAR      LIS 4
041D F8                     NS 8
041E 9413   0432            BNZ CKTIMF         BR IF FLAG IS SET
                 *
                 *    NOW CHECK FOR "CLEAR" SWITCH
                 *
0420 A5                     INS 5
0421 2101                   NI 1
0423 8457   047B            BZ CLRTIM          BR IF NOT SET
                 *
                 *    SWITCH IS SET SO SET 5 SEC CTR.
                 *    SET SWITCH PRESSED FLAG
                 *
0425 48                     LR A,8
0426 2204                   OI 4
0428 58                     LR 8,A             SET S.P. FLAG
                 *
                 *    SET 5 SEC TIMER AND RESET FLAG
                 *
0429 65                     LISU 5
042A 6A                     LISL 2
042B 2028                   LI 40 SET FOR 5 SEC
042D 5C                     LR S,A
042E 20F7        CLRFLG     LI H'F7'
0430 F8                     NS 8
```

```
0431 58                     LR 8,A
                     *
                     *  NOW CHECK TIMER FLAG AND SET ALARM ON
                     *  IF FLAG IS SET CLEAR ACCUMULATOR
                     *
                     *  IF 5 SEC COUNTER IS 0 DO NOT SET ALARM
                     *
0432 65              CKTIMF LISU 5
0433 6A                     LISL 2
0434 70                     CLR
0435 CC                     AS S
0436 8406     043D          BZ CKF          BR IF TIMER IS 0
                     *
                     *  NOW SET ALARM
                     *
0438 66                     LISU 6
0439 69                     LISL 1
043A 2010                   LI 16
043C 5C                     LR S,A
043D 78              CKF    LIS 8
043E F8                     NS 8  CHECK FOR TIMER FLAG
043F 843F     047F          BZ LDDIS        BR IF NOT SET
                     *
                     *  TIMER FLAG IS SET SO CLEAR ACC POINTED TO
                     *  BY DC0.  AREA AND WEIGHT ARE 4 BYTES
                     *  SENSOR CNT AND FOOT CNT ARE 2 BYTES
                     *  IF TEST SPEED THEN CLR KM CONSTANT
                     *
0441 0E                     LR Q,DC
0442 62                     LISU 2
0443 6F                     LISL 7
0444 77                     LIS 7
0445 FC                     NS S
0446 1A                     DI
0447 2507                   CI 7
0449 52                     LR 2,A
044A 8425     0470          BZ CLR2         BR IF SENSOR OR FOOT CTR
044C 2504                   CI 4
044E 940C     045B          BNZ LD2         BR IF NOT TESTSPEED
0450 2A0FD2   0FD2          DCI KMLOW-1
0453 77                     LIS 7
0454 17                     ST
0455 70                     CLR
0456 17                     ST
0457 17                     ST
0458 17                     ST
0459 901D     0477          BR EI1
045B 20FE            LD2    LI -2
045D 8E                     ADC
045E 70                     CLR
045F 17                     ST
0460 17                     ST    CLR AREA OR WEIGHT
0461 17                     ST
0462 17                     ST
                     *
                     *  ALSO CLEAR FG AND FC ACCUMULATOR. IF IN AREA
                     *  CLR R54-55, IF WEIGHT CLR R56-57
                     *
0463 65                     LISU 5
0464 6C                     LISL 4
0465 42                     LR A,2
0466 2503                   CI 3  CHECK FOR AREA MODE
0468 8402     046B          BZ CLR3         BR IF AREA
046A 6E                     LISL 6
046B 70              CLR3   CLR
046C 5D                     LR I,A
046D 5C                     LR S,A
046E 9008     0477          BR EI1
0470 70              CLR2   CLR   CLEAR 2 BYTES
0471 17                     ST
0472 17                     ST
                     *
                     *  ALSO CLR SENSOR COUNT REGISTERS 30-31
```

```
                          *
0473 63                            LISU 3
0474 68                            LISL 0
0475 5D                            LR I,A
0476 5C                            LR S,A
0477 0F                   EI1      LR DC,Q
0478 1B                            EI
0479 90B4    042E                  BR CLRFLG
                          *
                          *   IF SWITCH IS NOT SET CLR 5 SEC TIMER
                          *
047B 65                   CLRTIM   LISU 5
047C 6A                            LISL 2
047D 70                            CLR
047E 5C                            LR S,A
                          *
                          *   NOW GET READY TO LOAD DISPLAY
                          *
047F 62                   LDDIS    LISU 2
0480 6F                            LISL 7
0481 77                            LIS 7
0482 FC                            NS S
0483 2504                          CI 4
0485 840A    0490                  BZ OP1          BR IF TEST SPEED
0487 2507                          CI 7
0489 9406    0490                  BNZ OP1          BR NOT FOOT OR SENSOR CT
                          *
                          *   NOW CHECK FOR FOOT OR SENSOR FLAG
                          *
048B 2020                          LI H'20'
048D F8                            NS 8
048E 9407    0496                  BNZ OP2          BR IF FOOT CTR
0490 0E                   OP1      LR Q,DC
0491 280000  0000                  PI FLOAT
0494 02                            DC AL1(DC7273)
0495 00                            DC AL1(POP)
0496 290000  0000         OP2      JMP LDDISP
                          ***************************************************
                          *
                          *
                                   END

THIS FILE ON DISK (CONT4,0) 100% DRIVE
ERRS  LOC OBJECT ADDR LINE          SOURCE STATEMENT

                              TITLE 'THIS FILE ON DISK (CONT4,0) 100% DRIVE'
                          *
                          *   STARTING DATE 7\21\80
                          *
                          *   REVISION DATE 9\29\82
                          *   VERSION #2
                          *
                          *   AUTHOR:  STEVE STONE
                          *
                          *   THIS PROGRAM IS USED TO CONTROL A CONVEYOR
                          *   IN A SPREADER SYSTEM
                          *
                  0FC0    VGSTAC     EQU H'FC0'
                  0FE4    WIDTH      EQU H'FE4'
                  0FE8    APRATE     EQU H'FE8'
                  0FEE    FDRATE     EQU H'FEE'
                  0FF1    MATDEN     EQU H'FF1'
                  0FD9    KRESULT    EQU H'FD9'
                  0FF7    TRIM       EQU H'FF7'
                  0FDC    APRIM      EQU H'FDC'  USED FOR APRATE IN CALCU.
                  0FEB    RATEST     EQU H'FEB'
                  0FD7    COUNT      EQU H'FD7'
                  0FE0    WEIGHT     EQU H'FE0'
                          *
                          *
                  0000    POP      EQU 0
                  0001    DCI      EQU 1
                  0002    DC7273   EQU 2
```

```
            0003 0029   DC7071    EQU 3
            0004 0030   MVITMC    EQU 4
            0005 0031   MVITMP    EQU 5
            0006 0032   MVRTMC    EQU 6
            0007 0033   MVRTMP    EQU 7
            0008 0034   MULT      EQU 8
            0009 0035   DIVIDE    EQU 9
            000A 0036   ADDEXP    EQU 10
            000B 0037   SUBEXP    EQU 11
            000C 0038   NRMLZ     EQU 12
            000D 0039   NRM14     EQU 13
            000E 0040   EXPR60    EQU 14
            000F 0041   EXPR2     EQU 15
                 0042   *
            0000 0043   CON4      RORG 0
                 0044             ENTRY SETUP
                 0045             EXTRN MODETB,MESSAGE,BINBCD,CONST,WAIT1
                 0046             EXTRN DPTBL,DPX4,DISPLA,BCDBIN,SHRES
                 0047             EXTRN FLOAT,DASHES
                 0048   *
                 0049   **********************************************************
                 0050   *
                 0051   *    NOW DO SETUP ROUTINES
                 0052   *
0000 2B          0053   SETUP     NOP
                 0054   *
                 0055   *    NOW CHECK FOR DIGIT SET SWITCH
                 0056   *
0001 A5          0057   DIGSET    INS 5
0002 2101        0058             NI 1
0004 9408   000D 0059             BNZ CKPSF
0006 20EF        0060             LI H'EF'
0008 F8          0061             NS 8 CLR 'NO BLINK' FLAG
0009 58          0062             LR 8,A
000A 2900A0 00A0 0063   BRSEL     JMP DIGSEL
                 0064   *
                 0065   *    IF PROG. SW. FLAG IS SET THEN CHECK FOR
                 0066   *    1/2 SEC. TIMER FLAG
                 0067   *
000D 74          0068   CKPSF     LIS 4
000E F8          0069             NS 8
000F 8405   0015 0070             BZ SET1
                 0071   *
                 0072   *    IF 1/2 SEC FLAG IS SET THEN RESET 1/2 SEC FLAG
                 0073   *    AND SET 'NO BLINK' FLAG.
                 0074   *
0011 78          0075             LIS 8
0012 F8          0076             NS 8
0013 84F6   000A 0077             BZ BRSEL    BR TO DIGSEL.
0015 48          0078   SET1      LR A,8
0016 2210        0079             OI H'10'
0018 21F7        0080             NI H'F7'
001A 58          0081             LR 8,A
                 0082   *
                 0083   *    NOW SET PROG. SW FLAG AND RESET 1/2 SEC CTR
                 0084   *
001B 48          0085             LR A,8
001C 2204        0086             OI 4
001E 58          0087             LR 8,A
001F 65          0088             LISU 5
0020 6A          0089             LISL 2
0021 74          0090             LIS 4
0022 5C          0091             LR S,A
                 0092   *
                 0093   *    NOW INCREMENT DIGIT POINTED TO BY DIGIT POINTER
                 0094   *    HI NIBBLE R27, TRIM IS SPECIAL MODE
                 0095   *
0023 62          0096             LISU 2
0024 6F          0097             LISL 7
0025 77          0098             LIS 7
0026 FC          0099             NS S
0027 2505        0100             CI 5
0029 9411   003B 0101             BNZ INCDIG  BR IF NOT TRIM
```

```
                          *
                          *   IF TRIM THAN INC BINARY # FROM 91-109
                          *
002B 67                                LISU 7
002C 6A                                LISL 2
002D 4C                                LR A,S
002E 1F                                INC
002F 256D                 CK109        CI 109
0031 8203        0035                  BC TRIMOK
0033 205B                              LI 91
0035 52                   TRIMOK       LR 2,A
0036 70                                CLR
0037 53                                LR 3,A
0038 56                                LR 6,A      CLR DP INFO REG.
0039 9057        0091                  BR PUTBAK
                          *
                          *   NOW INCREMENT DIGIT POINTED TO BY HI R27
                          *
                          *   IF MODE IS APP. RATE OR SPREADER CONTSTANT
                          *   SAVE UPPER TWO BITS AS D.P. POINTER.  IF NOT
                          *   EITHER OF THESE CLR UPPER TWO BITS
                          *
003B 280000      0000     INCDIG       PI CONST
003E 77                                LIS 7              GET MODE
003F FC                                NS S
0040 56                                LR 6,A
0041 67                                LISU 7
0042 6A                                LISL 2
0043 16                                LM
0044 5D                                LR I,A
0045 16                                LM
0046 5C                                LR S,A
0047 70                                CLR
0048 C6                                AS 6
0049 8406        0050                  BZ SAVEDP        BR IF APP. RATE MODE
004B 2502                              CI 2  CHECK FOR SPREADER CT.
004D 70                                CLR
004E 9404        0053                  BNZ CLR6         BR IF NOT SPREADER CT.
0050 20C0                 SAVEDP       LI H'C0'
0052 FC                                NS S
0053 56                   CLR6         LR 6,A      SAVE DP. INFO
0054 280000      0000                  PI BINBCD
0057 62                                LISU 2
0058 6F                                LISL 7
0059 4C                                LR A,S
005A 14                                SR 4
                          *
                          *   NOW POINT ISAR AT MSDIGIT
                          *
005B 60                                LISU 0
005C 6B                                LISL 3
005D 2503                              CI 3
005F 841A        007A                  BZ DIG31
0061 2502                              CI 2
0063 8406        006A                  BZ DIG20
0065 6A                                LISL 2
0066 2501                              CI 1
0068 8411        007A                  BZ DIG31
                          *
                          *   NOW DO DIGIT 0 OR 2
                          *
006A 7F                   DIG20        LIS H'0F'
006B FC                                NS S
006C 1F                                INC
006D 2509                              CI 9
006F 8202        0072                  BC DIGOK
0071 70                                CLR
0072 54                   DIGOK        LR 4,A
0073 20F0                              LI H'F0'
0075 FC                                NS S
0076 C4                                AS 4
0077 5C                                LR S,A
0078 900F        0088                  BR RECON
```

```
                  *
                  *   DO DIGIT 1 OR 3 HERE
                  *
007A 4C           DIG31    LR A,S
007B 14                    SR 4
007C 1F                    INC
007D 2509                  CI 9
007F 8202    0082          BC DIGOK1
0081 70                    CLR
0082 15           DIGOK1   SL 4
0083 54                    LR 4,A
0084 7F                    LIS H'0F'
0085 FC                    NS S
0086 C4                    AS 4
0087 5C                    LR S,A
                  *
                  *   NOW RECONVERT BCD TO BINARY
                  *
0088 67           RECON    LISU 7
0089 6A                    LISL 2
008A 42                    LR A,2
008B 5D                    LR I,A
008C 43                    LR A,3
008D 5C                    LR S,A
008E 280000  0000          PI BCDBIN
                  *
                  *   NOW PUT #BACK AND UPDATE CKSUM
                  *
0091 280000  0000 PUTBAK   PI CONST
0094 1A                    DI
0095 42                    LR A,2
0096 17                    ST
0097 43                    LR A,3
0098 C6                    AS 6
0099 17                    ST          PUT BACK DP INFO
009A C2                    AS 2        RECOMPUTE CKSUM
009B 18                    COM
009C 2456                  AI H'56'
009E 17                    ST          STORE NEW CKSUM
009F 1B                    EI
                  *
                  *   NOW DO DIGIT SELECT (INC DIGIT POINTER)
                  *
00A0 A5           DIGSEL   INS 5
00A1 2102                  NI 2  CHECK FOR SELECT SWITCH
00A3 8429    00CD          BZ DPSHIF   BR IF NOT SET
                  *
                  *   NOW CHECK FOR PROG. SW. PRESSED FLAG
                  *
00A5 74                    LIS 4
00A6 F8                    NS 8
00A7 9425    00CD          BNZ DPSHIF  BR IF S.P. FLAG IS SET
00A9 48                    LR A,8
00AA 2204                  OI 4
00AC 58                    LR 8,A      SET FLAG IF NOT SET
                  *
                  *   NOW INC DIGIT POINTER
                  *
00AD 62                    LISU 2
00AE 6F                    LISL 7
00AF 77                    LIS 7 CHECK FOR FEED RATE CAL.
00B0 FC                    NS S  IF SO KEEP DIGIT POINTER
00B1 2505                  CI 5  AT 0
00B3 8419    00CD          BZ DPSHIF
00B5 53                    LR 3,A      SAVE MODE
00B6 4C                    LR A,S
00B7 14                    SR 4
00B8 1F                    INC
00B9 2103                  NI 3
00BB 15                    SL 4
00BC 52                    LR 2,A
                  *
                  *   NOW CHECK FOR TEST SPEED.  IT ONLY PROGRAMS
```

```
                0248  *     3 DIGITS INSTEAD OF 4
                0249  *
00BD 43         0250              LR   A,3
00BE 2507       0251              CI   7
00C0 9408  00C9 0252              BNZ  LISHF
00C2 42         0253              LR   A,2
00C3 2520       0254              CI   H'20'
00C5 8203  00C9 0255              BC   LISHF
00C7 70         0256              CLR      PUT BACK TO DIGIT 0
00C8 52         0257              LR   2,A
00C9 7F         0258  LISHF  LIS  H'0F'
00CA FC         0259              NS   S
00CB C2         0260              AS   2
00CC 5C         0261              LR   S,A
                0262  *
                0263  *    NOW CHECK FOR DP SHIFT SWITCH (DP-DECIMAL POINT)
                0264  *
00CD 62         0265  DPSHIF LISU 2
00CE 6F         0266              LISL 7         FIRST CHECK FOR DP SHIFT
00CF 77         0267              LIS  7  MODES:  APRATE,FEEDRATE
00D0 FC         0268              NS   S
00D1 55         0269              LR   5,A       SAVE MODE FOR LATER
00D2 8405  00D8 0270              BZ   DP1       BR IF APP. RATE
00D4 2502       0271              CI   2
00D6 9423  00FA 0272              BNZ  DISP      BR IF NOT FEED RATE
                0273  *
                0274  *    RIGHT MODE NOW CHECK DP SHIFT SWITCH
                0275  *
00D8 A5         0276  DP1        INS  5
00D9 2108       0277              NI   8
00DB 941E  00FA 0278              BNZ  DISP      BR IF NOT SET
                0279  *
                0280  *    NOW CHECK P.S.P. FLAG
                0281  *
00DD 74         0282              LIS  4
00DE F8         0283              NS   8
00DF 941A  00FA 0284              BNZ  DISP      BR IF SET
                0285  *
                0286  *    NOW SET FLAG AND INC DP SHIFT #, ALSO UPDATE CKSU
                0287  *
00E1 48         0288              LR   A,8
00E2 2204       0289              OI   4
00E4 58         0290              LR   8,A
00E5 280000 0000 0291             PI   CONST
00E8 71         0292              LIS  1
00E9 8E         0293              ADC
00EA 0E         0294              LR   Q,DC      POINT DCO AT HIGH BYTE
00EB 16         0295              LM
00EC 2440       0296              AI   H'40'
00EE 1A         0297              DI
00EF 0F         0298              LR   DC,Q
00F0 17         0299              ST
                0300  *
                0301  *    NOW RECOMPUTE CKSUM
                0302  *
00F1 20FE       0303              LI   -2
00F3 8E         0304              ADC
00F4 16         0305              LM
00F5 88         0306              AM
00F6 18         0307              COM
00F7 2456       0308              AI   H'56'
00F9 17         0309              ST
                0310  *
                0311  *    NOW PUT # IN DISP REG. 62-63
                0312  *
00FA 280000 0000 0313 DISP       PI   CONST
00FD 70         0314              CLR
00FE 56         0315              LR   6,A       CLR COLON REG.
                0316  *
                0317  *    IF CKSUM ERROR THAN SET COLON FLAG
                0318  *    AND CLEAR CONSTANT
                0319  *
00FF 0E         0320              LR   Q,DC
```

```
0100 16              0321            LM
0101 88              0322            AM
0102 88              0323            AM
0103 2555            0324            CI   H'55'
0105 8409   010F     0325            BZ   DISP1
0107 2080            0326            LI   H'80'
0109 56              0327            LR   6,A
010A 0F              0328            LR   DC,Q
010B 70              0329            CLR
010C 17              0330            ST
010D 17              0331            ST
010E 17              0332            ST
                     0333   *
                     0334   *   NOW PUT DECIMAL POINT INFO IN R6
                     0335   *
010F 280000 0000     0336   DISP1   PI   FLOAT
0112 02              0337            DC   AL1(DC7273)
0113 00              0338            DC   AL1(POP)
0114 2A0000 0000     0339            DCI  DPTBL
0117 45              0340            LR   A,5    CHECK FOR MODE WITH VARIABLE
0118 2502            0341            CI   2      DECIMAL POINTS
011A 9212   012D     0342            BNC  GETDP   BR IF NOT A VARIABLE DP
011C 2A0000 0000     0343            DCI  DPX4
011F 8409   0129     0344            BZ   LICO    DR IF FEED RATE
                     0345   *
                     0346   *   NOW MAKE APP. RATE AND APP. RATE STEP THE SAME
                     0347   *
0121 2C              0348            XDC
0122 2A0FE9 0FE9     0349            DCI  APRATE+1
0125 16              0350            LM
0126 2C              0351            XDC
0127 9002   012A     0352            BR   SHR1
                     0353   *
                     0354   *   NOW GET DP INFO FROM TOP 2 BITS
                     0355   *
0129 4C              0356   LICO    LR   A,S
012A 12              0357   SHR1    SR   1
012B 12              0358            SR   1
012C 14              0359            SR   4
012D 8E              0360   GETDP   ADC
012E 46              0361            LR   A,6
012F 88              0362            AM
0130 56              0363            LR   6,A
0131 1B              0364            EI
                     0365   *
                     0366   *   NOW CHECK FOR TRIM MODE IF SO THEN SET NOBLINK
                     0367   *   FLAG AND GET READY FOR DISPLAY
                     0368   *
0132 45              0369            LR   A,5
0133 2505            0370            CI   5
0135 9419   014F     0371            BNZ  PIBIN
                     0372   *
                     0373   *   SET NO BLINK FLAG
                     0374   *
0137 48              0375            LR   A,8
0138 2210            0376            OI   H'10'
013A 58              0377            LR   8,A
013B 6A              0378            LISL 2
013C 4C              0379            LR   A,S
013D 249C            0380            AI   -100
013F 9105   0145     0381            BM   LOAD0
0141 24A0            0382            AI   H'A0'
0143 9005   0149     0383            BR   LOAD2
0145 18              0384   LOAD0   COM
0146 1F              0385            INC
0147 24B0            0386            AI   H'B0'   SET MINUS SIGN
0149 52              0387   LOAD2   LR   2,A
014A 20AA            0388            LI   H'AA'
014C 53              0389            LR   3,A
014D 900D   015B     0390            BR   LOAD1
                     0391   *
                     0392   *   NOW CONVERT NUMBER TO BCD AND PUT IN DISPLAY REG
                     0393   *
```

```
014F 280000 0000  PIBIN     PI BINBCD
0152 45                     LR A,5      CHECK FOR TEST SPEED MODE
0153 2507                   CI 7
0155 9405   015B            BNZ LOAD1
0157 43                     LR A,3      IF TEST SPEED THAN BLANK
0158 22A0                   OI H'A0'    DIGIT 3
015A 53                     LR 3,A
                  *
                  *   NOW BLINK DIGIT IF THE 'NO BLINK' FLAG IS NOT
                  *
015B 62           LOAD1     LISU 2
015C 69                     LISL 1
015D 72                     LIS 2 CHECK FOR 1\4 SEC ON FLAG
015E FC                     NS S
015F 9425   0185            BNZ LOAD3
                  *
                  *   NOW CHECK FOR NO BLINK FLAG
                  *
0161 2010                   LI H'10'
0163 F8                     NS 8
0164 9420   0185            BNZ LOAD3
                  *
                  *   NOW BLINK DIGIT POINTED TO BY R27 HI
                  *
0166 6F                     LISL 7
0167 4C                     LR A,S
0168 14                     SR 4
0169 60                     LISU 0
016A 6B                     LISL 3
016B 2503                   CI 3
016D 8412   0180            BZ DG31
016F 2502                   CI 2
0171 8406   0178            BZ DG20
0173 6A                     LISL 2
0174 2501                   CI 1
0176 8409   0180            BZ DG31
                  *
                  *   NOW DO DIGIT 2 OR 0
                  *
0178 20F0         DG20      LI H'F0'
017A FC                     NS S
017B 220A                   OI H'0A'
017D 5C                     LR S,A
017E 9006   0185            BR LOAD3
                  *
                  *   NOW DO DIGIT 3 OR 1
                  *
0180 7F           DG31      LIS H'OF'
0181 FC                     NS S
0182 22A0                   OI H'A0'
0184 5C                     LR S,A
                  *
                  *
                  *   NOW PUT CONSTANT IN DISPLAY REG. 62-63
                  *
0185 66           LOAD3     LISU 6
0186 6A                     LISL 2
0187 42                     LR A,2
0188 5D                     LR I,A
0189 43                     LR A,3
018A 5C                     LR S,A
                  *
                  ****************************************************
                  *
                  *   NOW CHECK FOR DISTANCE CAL MODE
                  *
018B 62                     LISU 2
018C 6F                     LISL 7
018D 77                     LIS 7
018E FC                     NS S
018F 2506                   CI 6
0191 9475   0207            BNZ ARDC
                  *
```

```
                    0467  *   NOW DO DIST. CAL ROUTINE
                    0468  *
                    0469  *   FIRST CHECK FOR ENABLE AND INPROGRESS FLAGS
                    0470  *
0193 72             0471         LIS 2
0194 F7             0472         NS 7
0195 940C    01A2   0473         BNZ CKFLAG
                    0474  *
                    0475  *   IF 0 THEN WAIT FOR SWITCH TO GO FROM HOLD
                    0476  *   TO SPREAD
                    0477  *
0197 A5             0478         INS 5
0198 2104           0479         NI 4  CHECK FOR HOLD
019A 8470    020B   0480         BZ ARD
                    0481  *
                    0482  *   IF SWITCH IS IN HOLD POSITION THAN SET ENABLE FL
                    0483  *
019C 47             0484         LR A,7
019D 2202           0485         OI 2
019F 57             0486         LR 7,A
01A0 906A    020B   0487         BR ARD
                    0488  *
                    0489  *   NOW CHECK FLAGS IF BOTH ARE SET THEN PUT ----
                    0490  *   ON DISPLAY AND WAIT FOR SWITCH TO GO TO HOLD
                    0491  *
                    0492  *   IF ONLY THE ENABLE FLAG IS SET WAIT FOR SWITCH
                    0493  *   TO GO TO THE SPREAD POSITION
                    0494  *
01A2 73             0495  CKFLAG LIS 3
01A3 F7             0496         NS 7
01A4 2503           0497         CI 3
01A6 944F    01F6   0498         BNZ CKHS
                    0499  *
                    0500  *   BOTH FLAGS ARE SET NOW PUT ---- ON DISPLAY
                    0501  *   AND CHECK FOR HOLD SWITCH
                    0502  *
01A8 2A0000  0000   0503         DCI DASHES
01AB 280000  0000   0504         PI MESSAGE
01AE A5             0505         INS 5
01AF 2104           0506         NI 4
01B1 9404    01B6   0507         BNZ DOCAL      BR IF IN HOLD POSITION
01B3 290000  0000   0508         JMP WAIT1
                    0509  *
                    0510  *   NOW CLR IN PROGRESS FLAG AND GET COUNTER INFO
                    0511  *
01B6 1A             0512  DOCAL  DI
01B7 20FE           0513         LI H'FE'
01B9 F7             0514         NS 7
01BA 57             0515         LR 7,A
                    0516  *
                    0517  *   NOW DO DISTANCE CAL CALCULATION
                    0518  *
01BB 2A0FD7  0FD7   0519         DCI COUNT
01BE 67             0520         LISU 7
01BF 6A             0521         LISL 2
01C0 16             0522         LM
01C1 5D             0523         LR I,A
01C2 16             0524         LM
01C3 5C             0525         LR S,A
01C4 280000  0000   0526         PI FLOAT
01C7 0D             0527         DC AL1(NRM14)
01C8 0E             0528         DC AL1(EXPR60)
01C9 00             0529         DC 0
01CA 0A             0530         DC AL1(ADDEXP)
01CB 00             0531         DC AL1(POP)
01CC 2A01D6  01D6   0532         DCI DISCAL
01CF A1             0533         INS 1
01D0 8109    01DA   0534         BP ENG1
01D2 72             0535         LIS 2
01D3 8E             0536         ADC
01D4 9005    01DA   0537         BR ENG1
                    0538  *
                    0539  *   DISCAL IS FUDGE # FOR DISTANCE CAL CALCULATION
```

```
                      0540   *
01D6 9D2A             0541  DISCAL     DC  H'9D2A'   ENGLISH
01D8 6E34             0542             DC  H'6E34'   METRIC
                      0543   *
                      0544   *
01DA 0E               0545  ENG1       LR  Q,DC
01DB 280000 0000 0546             PI  FLOAT
01DE 03               0547             DC  AL1(DC7071)
01DF 09               0548             DC  AL1(DIVIDE)
01E0 00               0549             DC  AL1(POP)
01E1 280000 0000 0550             PI  SHRES
01E4 280000 0000 0551             PI  CONST
01E7 67               0552             LISU 7
01E8 6D               0553             LISL 5
01E9 1A               0554             DI
01EA 4D               0555             LR  A,I
01EB 17               0556             ST
01EC 4E               0557             LR  A,D
01ED 17               0558             ST
01EE CC               0559             AS  S
01EF 18               0560             COM
01F0 2456             0561             AI  H'56'
01F2 17               0562             ST      STORE NEW CKSUM
01F3 1B               0563             EI
01F4 9016    020B 0564             BR  ARD
                      0565   *
                      0566   *   NOW CHECK FOR HOLD SPREAD IN SPREAD
                      0567   *
01F6 A5               0568  CKHS       INS 5
01F7 2104             0569             NI  4
01F9 9411    020B 0570             BNZ ARD      BR IF IN HOLD
                      0571   *
                      0572   *   NOW SET IN PROGRESS FLAG AND CLR 'COUNT' REG.
                      0573   *
01FB 47               0574             LR  A,7
01FC 2201             0575             OI  1
01FE 57               0576             LR  7,A
01FF 2A0FD7 0FD7 0577             DCI COUNT
0202 70               0578             CLR
0203 17               0579             ST
0204 17               0580             ST
0205 9005    020B 0581             BR  ARD
                      0582   *
                      0583   *   NOW CLR DIST. CAL FLAGS IF NOT IN DIST CAL MODE
                      0584   *
0207 20FC             0585  ARDC       LI  H'FC'
0209 F7               0586             NS  7
020A 57               0587             LR  7,A
020B 290000 0000 0588  ARD        JMP DISPLA
                      0589   ******************************************************
                      0590   *
                      0591   *
                      0592             END

THIS FILE ON DISK (CONT5,0) 100% DRIVE
ERRS  LOC  OBJECT ADDR LINE           SOURCE STATEMENT

                      0001             TITLE 'THIS FILE ON DISK (CONT5,0) 100% DRIVE'
                      0002   *
                      0003   *  STARTING DATE 7\21\80
                      0004   *
                      0005   *  REVISION DATE 10\5\82
                      0006   *  VERSION #2
                      0007   *
                      0008   *  AUTHOR: STEVE STONE
                      0009   *
                      0010   *  THIS PROGRAM IS USED TO CONTROL A CONVEYOR
                      0011   *  IN A SPREADER SYSTEM
                      0012   *
     0FC0             0013  VGSTAC     EQU H'FC0'
     0FF7             0014  TRIM       EQU H'FF7'
     0FE3             0015  AREAINC    EQU H'FE3'
```

```
            OFDE  WETINC   EQU H'FDE'
            OFFD  TSTSPD   EQU H'FFD'
            OFD3  KMLOW    EQU H'FD3'
            OFE5  AREAAC   EQU H'FE5'
            OFF1  MATDEN   EQU H'FF1'
            OFE8  APRATE   EQU H'FE8'
            OFE0  WEIGHT   EQU H'FE0'
                  *
            0000  CON5     RORG 0
                           ENTRY DISPLA,WAIT1,LDDISP,LOAD,MESSAGE
                           ENTRY EXTINT,WAIT,ALLON
                           EXTRN DOK,DOK1,CKMODE,DELAY1,BINBCD
                           EXTRN DPX4,DPTBL,DIGTBL,SHIFT8,MODETB
                  *
                  *
                  *  LDDISP IS USED TO PUT OPERATE MODES ON DISPLAY
                  *
0000 280000 0000  LDDISP   PI BINBCD       CONVERT # IN R72-73
                  *
                  *  NOW PUT APPROPRIATE DECIMAL POINT IN R6
                  *
0003 62                    LISU 2
0004 6F                    LISL 7          GET MODE
0005 77                    LIS 7
0006 FC                    NS S
0007 8425   002D           BZ GETDC        BR IF APRATE
0009 2505                  CI 5
000B 8421   002D           BZ GETDC        BR IF TEST APRATE
000D 2502                  CI 2
000F 8411   0021           BZ MATLDP       BR IF MATL SPREAD
0011 2503                  CI 3
0013 942C   0040           BNZ GETDP       BR IF OTHER THAN AREA
                  *
                  *  NOW CHECK FOR AREA ROLL OVER BIT.  IF IT IS
                  *  SET THEN (UNITS) ELSE (TENTHS)
                  *
0015 2A0FE6 0FE6  AREADP   DCI AREAAC+1
0018 70                    CLR
0019 88                    AM    SET SIGN BIT
001A 70                    CLR   O= UNITS
001B 9135   0051           BM LR6A         BR IF ROLL OVER SET
001D 2010                  LI H'10'        SET TENTHS
001F 9031   0051           BR LR6A
                  *
                  *  NOW CHECK MATERIAL SPREAD ROLL OVER FLAG
                  *
                  *  IF SET THEN LIGHT UP EXTRA O ELSE PUT NO
                  *  DECIMAL POINT ON DISPLAY
                  *
0021 2A0FE1 0FE1  MATLDP   DCI WEIGHT+1
0024 70                    CLR
0025 88                    AM    SET SIGN BIT
0026 70                    CLR   O=UNITS
0027 8129   0051           BP LR6A         BR IF NOT SET
0029 2040                  LI H'40'        TURN RIGHT HAND ZERO ON
002B 9025   0051           BR LR6A
                  *
                  *  NOW GET DP INFO FOR APRATE AND TEST APRATE
                  *
002D 2A0FE9 0FE9  GETDC    DCI APRATE+1
0030 16                    LM
0031 2A0000 0000           DCI DPX4
0034 14                    SR 4
0035 12                    SR 1
0036 12                    SR 1
0037 54                    LR 4,A
                  *
                  *  NOW CHECK FOR DECIMAL PT. SHIFT FLAG SET
                  *  IF IT IS THEN MOVE D.P. RIGHT ONE PLACE
                  *
0038 72                    LIS 2
0039 F8                    NS 8
003A 12                    SR 1
```

```
003B C4              0089            AS 4
003C 8E              0090            ADC
003D 16              0091            LM
003E 9012    0051    0092            BR LR6A
                     0093   *
                     0094   *   NOW GET DP INFO FOR OTHER MODES WITH SET DP'S
                     0095   *
0040 2507            0096   GETDP    CI 7            CHECK FOR FOOT OR SENSOR
0042 9409    004C    0097            BNZ DCID          COUNTER
0044 54              0098            LR 4,A          SAVE MODE
                     0099   *
                     0100   *   CHECK FOR FOOT CTR FLAG
                     0101   *
0045 2020            0102            LI H'20'
0047 F8              0103            NS 8
0048 44              0104            LR A,4
0049 8402    004C    0105            BZ DCID         BR IF SENSOR CTR
004B 70              0106            CLR             TURN OFF DP
004C 2A0008  0008    0107   DCID     DCI DPTBL+8
004F 8E              0108            ADC
0050 16              0109            LM
0051 56              0110   LR6A     LR 6,A
                     0111   *
                     0112   *   NOW BLANK LEADING ZEROS
0052 70              0113            CLR
0053 C3              0114            AS 3    CHECK HI BYTE
0054 9406    005B    0115            BNZ D03
0056 20AA            0116            LI H'AA'
0058 53              0117            LR 3,A
0059 900A    0064    0118            BR CK2
005B 14              0119   D03      SR 4
005C 9414    0071    0120            BNZ D04
005E 43              0121            LR A,3
005F 24A0            0122            AI H'A0'
0061 53              0123            LR 3,A
0062 900E    0071    0124            BR D04
                     0125   *
                     0126   *   IF DECIMAL POINT INFO IS 100TH'S (I.E. .00)
                     0127   *   THEN DO NOT BLANK PAST DP
                     0128   *
0064 46              0129   CK2      LR A,6
0065 2520            0130            CI H'20'
0067 8409    0071    0131            BZ D04
0069 42              0132            LR A,2          CHECK LOW BYTE
006A 14              0133            SR 4
006B 9405    0071    0134            BNZ D04
006D 42              0135            LR A,2
006E 24A0            0136            AI H'A0'
0070 52              0137            LR 2,A
0071 9007    0079    0138   D04      BR DISP1
                     0139   *
                     0140   *
                     0141   *
                     0142   *   NOW PUT DISPLAY REG. ON READOUT
                     0143   *
0073 66              0144   DISPLA   LISU 6
0074 6A              0145            LISL 2
0075 4D              0146            LR A,I
0076 52              0147            LR 2,A
0077 4C              0148            LR A,S
0078 53              0149            LR 3,A
0079 2A0000  0000    0150   DISP1    DCI DIGTBL
007C 0E              0151            LR Q,DC
007D 43              0152            LR A,3
007E 14              0153            SR 4
007F 8E              0154            ADC
0080 280000  0000    0155            PI SHIFTS
0083 43              0156            LR A,3
0084 15              0157            SL 4
0085 14              0158            SR 4
0086 0F              0159            LR DC,Q
0087 8E              0160            ADC
0088 280000  0000    0161            PI SHIFTS
```

```
008B 42              0162            LR   A,2
008C 14              0163            SR   4
008D 0F              0164            LR   DC,Q
008E 8E              0165            ADC
008F 280000 0000     0166            PI   SHIFT8
0092 42              0167            LR   A,2
0093 15              0168            SL   4
0094 14              0169            SR   4
0095 0F              0170            LR   DC,Q
0096 8E              0171            ADC
0097 280000 0000     0172            PI   SHIFT8
009A 28012C 012C     0173            PI   LOAD
                     0174    *
                     0175    *   NOW GO INTO WAIT LOOP
                     0176    *
009D 1B              0177    WAIT1   EI
                     0178    *
                     0179    *   NOW CHECK FUNCTION SWITCH FOR A CHANGE
                     0180    *
009E A5              0181    MODESW  INS  5            CHECK FOR PRT5 BITS0&1 LOW
009F 2103            0182            NI   3
00A1 2503            0183            CI   3
00A3 8442       00E6 0184            BZ   INPUT
00A5 2A0000 0000     0185            DCI  MODETB
00A8 A1              0186            INS  1 GET SWITCH INFO
00A9 210F            0187            NI   H'0F'
00AB 8E              0188            ADC
00AC 16              0189            LM
00AD 52              0190            LR   2,A
                     0191    *
                     0192    *   NOW CHECK WITH OLD MODE TO SEE IF IT HAS CHANGED
                     0193    *
00AE 62              0194            LISU 2
00AF 6F              0195            LISL 7
00B0 7F              0196            LIS  15
00B1 FC              0197            NS   S
00B2 E2              0198            XS   2    COMPARE WITH OLD
00B3 84EA       009E 0199            BZ   MODESW          BR IF NO CHANGE
                     0200    *
                     0201    *   IF MODE DID CHANGE THEN SET DIGIT POINTER
                     0202    *   TO 0 AND REPLACE OLD MODE WITH NEW
                     0203    *   ALSO SET APRATE UPDATE FLAG
                     0204    *
00B5 47              0205            LR   A,7
00B6 2240            0206            OI   H'40'
00B8 57              0207            LR   7,A
00B9 7F              0208            LIS  H'F'
00BA FC              0209            NS   S
00BB 53              0210            LR   3,A          SAVE OLD TEMPORARY
00BC 42              0211            LR   A,2
00BD 5C              0212            LR   S,A          THIS ALSO CLEARS DIGIT PTR
                     0213    *
                     0214    *   IF NEW MODE IS A TEST MODE THEN JMP TO DOK
                     0215    *
00BE 250B            0216            CI   H'0B'
00C0 9208       00C9 0217            BNC  DO
                     0218    *
                     0219    *   NOW CHECK IF NEW MODE WAS A SETUP MODE
                     0220    *
00C2 78              0221            LIS  8
00C3 FC              0222            NS   S
00C4 8407       00CC 0223            BZ   PASTK
                     0224    *
                     0225    *   NOW CHECK IF OLD MODE WAS A SETUP MODE
                     0226    *
00C6 F3              0227            NS   3
00C7 9404       00CC 0228            BNZ  PASTK
00C9 290000 0000     0229    DO      JMP  DOK
00CC 290000 0000     0230    PASTK   JMP  CKMODE
                     0231    **
                     0232    ****************************************************
                     0233    **
                     0234    **
```

```
                    0235  ***  NOW DO EXTERNAL INTERUPT ROUTINE
                    0236  **
                    0237  **   THIS ROUTINE ASSUME THERE IS A SHORT CIRCUIT
                    0238  **   ALTHOUGH IS ALSO COMES HERE FOR POWER DOWN.
                    0239  **
                    0240  **   FIRST TURN OFF EXTERNAL POWER AND ALARM ON
                    0241  **
00CF A0             0242  EXTINT   INS 0
00D0 2244           0243           OI H'44'
00D2 B0             0244           OUTS 0
                    0245  *
                    0246  *    PUT SHORT CIRCUIT MESSAGE (SHCR) ON DISPLAY
                    0247  *
00D3 2A00E2 00E2 0248        DCI SHCR
00D6 280115 0115 0249        PI MESSAGE
00D9 280000 0000 0250        PI DELAY1
                    0251  *
                    0252  *    NOW ENABLE POWER AND GO TO WAIT ROUTINE
                    0253  *
00DC A0             0254           INS 0
00DD 21BF           0255           NI H'BF'
00DF B0             0256           OUTS 0
00E0 90BC    009D 0257            BR WAIT1
00E2 6D7439         0258  SHCR    DC H'6D743950'
                    0259  *
                    0260  *
                    0261  ***********************************************
                    0262  *
                    0263  *    NOW AUTO INPUT ROUTINE FOR CONSTANTS
                    0264  *
                    0265  ***********************************************
                    0266  *
00E6 1A             0267  INPUT    DI
00E7 2A0FC0 0FC0 0268           DCI H'FC0'
00EA 2040           0269           LI 64
00EC 50             0270           LR 0,A
                    0271  *
                    0272  *    REG. 0 HOLDS NUMBER OF BYTES TO RECEIVE
                    0273  *
00ED 70             0274  TST3     CLR
00EE 52             0275           LR 2,A          CLR DATA REG.
00EF 78             0276           LIS 8
00F0 51             0277           LR 1,A          LOAD BIT COUNTER
00F1 900D    00FF 0278            BR NOTRDY
00F3 A5             0279  TST1     INS 5  GET DATA
00F4 12             0280           SR 1
00F5 2101           0281           NI 1
00F7 E2             0282           XS 2
00F8 52             0283           LR 2,A
00F9 31             0284           DS 1   DECREMENT BIT CTR
00FA 8410    010B 0285            BZ TST2
00FC 42             0286           LR A,2
00FD 13             0287           SL 1
00FE 52             0288           LR 2,A
00FF 75             0289  NOTRDY   LIS 5
0100 53             0290           LR 3,A
0101 33             0291           DS 3
0102 94FE    0101 0292            BNZ *-1
0104 A5             0293  NOT1     INS 5
0105 2101           0294           NI 1
0107 94FC    0104 0295            BNZ NOT1
0109 90E9    00F3 0296            BR TST1
010B 42             0297  TST2     LR A,2
010C 17             0298           ST
010D 30             0299           DS 0
010E 94DE    00ED 0300            BNZ TST3
0110 70             0301           CLR
0111 B5             0302           OUTS 5
0112 290000 0000 0303           JMP 0
                    0304  *
                    0305  *    MESSAGE IS USED TO PUT ABBREVIATED WORDS
```

```
                    0306  *     ON DISPLAY
                    0307  *
                    0308  *     IT ASSUMES THAT DC0 IS POINTING AT MESSAGE
                    0309  *
0115 08             0310  MESSAGE LR K,P
0116 74             0311          LIS 4     LOAD # OF BYTES CTR
0117 54             0312          LR 4,A
0118 16             0313  L1      LM
0119 18             0314          COM       GET DATA BYTE
011A 52             0315          LR 2,A
011B 78             0316          LIS 8
011C 53             0317          LR 3,A          LOAD # OF SHIFTS CTR
011D 2080           0318  L2      LI H'80'
011F F2             0319          NS 2      GET DATA BIT
0120 B4             0320          OUTS 4
0121 42             0321          LR A,2
0122 13             0322          SL 1      SHIFT DATA
0123 52             0323          LR 2,A
0124 33             0324          DS 3      DEC # OF SHIFTS CTR
0125 94F7  011D     0325          BNZ L2          BR IF DATA BYTE NOT DONE
0127 34             0326          DS 4      DEC # OF BYTES CTR
0128 94EF  0118     0327          BNZ L1          BR IF ALL BYTES NOT DONE
012A 9002  012D     0328          BR LOAD1
                    0329  *
                    0330  *     LOAD PULSES THE LATCH LINE ON LCD DRIVER
                    0331  *
012C 08             0332  LOAD    LR K,P
012D A0             0333  LOAD1   INS 0
012E 21F7           0334          NI H'F7'
0130 B0             0335          OUTS 0
0131 2208           0336          OI 8
0133 B0             0337          OUTS 0
                    0338  *
                    0339  *     RESET DISPLAY UPDATE FLAG HERE
                    0340  *
0134 20BF           0341          LI H'BF'
0136 F7             0342          NS 7
0137 57             0343          LR 7,A
0138 0C             0344          PK        RETURN
                    0345  *
                    0346  *     ALLON IS USED TO TURN THE DISPLAY ON
                    0347  *
0139 FFFFFF         0348  ALLON   DC H'FFFFFFFF'
                    0349  *
                    0350  ****************************************************
                    0351  *
                    0352  *     WAIT IS THE REST OF THE START UP ROUTINE
                    0353  *
013D 2A0FC0 0FC0    0354  WAIT    DCI VGSTAC      RESET VGSTAC
0140 7F             0355          LIS 15
0141 52             0356          LR 2,A
0142 70             0357          CLR
0143 17             0358  STVG    ST
0144 32             0359          DS 2
0145 82FD  0143     0360          BC STVG
                    0361  *
                    0362  *     NOW LOAD TIMERS AND ENABLE INTERRUPTS
                    0363  *
0147 2032           0364          LI 50
0149 B7             0365          OUTS 7
014A 20CB           0366          LI H'CB'
014C B6             0367          OUTS 6
014D 1B             0368          EI
                    0369  *
                    0370  *     ENABLE EXTERNAL POWER
                    0371  *
014E 2028           0372          LI H'28'
0150 B0             0373          OUTS 0
                    0374  *
                    0375  *     NOW CHECK FOR TRIM IN RANGE
                    0376  *
0151 2A0FF7 0FF7    0377          DCI TRIM
0154 0E             0378          LR Q,DC
```

```
0155 16              0379            LM
0156 88              0380            AM
0157 88              0381            AM
0158 2555            0382            CI   H'55'
015A 940F    016A    0383            BNZ  ST100        BR IF CKSUM BAD
015C 0F              0384            LR   DC,Q
015D 16              0385            LM
015E 255A            0386            CI   90
0160 8209    016A    0387            BC   ST100
0162 256D            0388            CI   109
0164 9205    016A    0389            BNC  ST100
0166 70              0390            CLR
0167 88              0391            AM
0168 840A    0173    0392            BZ   AREACK
016A 0F              0393   ST100    LR   DC,Q
016B 2064            0394            LI   100
016D 17              0395            ST
016E 70              0396            CLR
016F 17              0397            ST
0170 20F1            0398            LI   H'F1'
0172 17              0399            ST        STORE NEW CHECKSUM
                     0400   *
                     0401   *   NOW CHECK AREA AND WEIGHT CHECKSUMS
                     0402   *   IF ERROR THEN CLR ACCUMULATORS
                     0403   *
0173 2A0FDE  0FDE    0404   AREACK   DCI  WETINC
0176 0E              0405   CKS4     LR   Q,DC
0177 16              0406            LM        LO BYTE INC.
0178 88              0407            AM        HI BYTE INC.
0179 88              0408            AM        LO BYTE ACCUM.
017A 88              0409            AM        HI BYTE ACCUM.
017B 88              0410            AM        CKSUM
017C 2555            0411            CI   H'55'
017E 8407    0186    0412            BZ   CKRET
                     0413   *
                     0414   *   NOW RESET
                     0415   *
0180 0F              0416            LR   DC,Q
0181 17              0417            ST
0182 17              0418            ST
0183 17              0419            ST
0184 17              0420            ST
0185 17              0421            ST
0186 03              0422   CKRET    LR   A,QL
0187 25E3            0423            CI   H'E3'
0189 94EC    0176    0424            BNZ  CKS4
                     0425   *
                     0426   *   NOW CHECK FOR TEST SPEED UNDER 999 H'3E7'
                     0427   *
018B 2A0FFD  0FFD    0428            DCI  TSTSPD
018E 0E              0429            LR   Q,DC
018F 16              0430            LM
0190 52              0431            LR   2,A
0191 16              0432            LM
0192 2503            0433            CI   3
0194 9208    019D    0434            BNC  STO
0196 940B    01A2    0435            BNZ  KMCK
0198 42              0436            LR   A,2
0199 25E7            0437            CI   H'E7'
019B 8206    01A2    0438            BC   KMCK
019D 0F              0439   STO      LR   DC,Q
019E 70              0440            CLR
019F 17              0441            ST
01A0 17              0442            ST
01A1 17              0443            ST
                     0444   *
                     0445   *   CLR KM START UP COUNTER
                     0446   *
01A2 2A0FD2  0FD2    0447   KMCK     DCI  KMLOW-1
01A5 70              0448            CLR
01A6 17              0449            ST        STORE COUNTER HERE
01A7 29009D  009D    0450            JMP  WAIT1
```

```
*
*
            END
```

THIS FILE ON DISK (CONT6,0) 100% DRIVE

```
ERRS  LOC OBJECT ADDR LINE          SOURCE STATEMENT

                 TITLE 'THIS FILE ON DISK (CONT6,0) 100% DRIVE'
            *
            *    STARTING DATE 7\21\80
            *
            *    REVISION DATE 9\28\82
            *    VERSION #2
            *
            *    AUTHOR: STEVE STONE
            *
            *    THIS PROGRAM IS USED TO CONTROL A CONVEYOR
            *    IN A SPREADER SYSTEM
            *
      0FC0  VGSTAC    EQU H'FC0'
      0FF7  TRIM      EQU H'FF7'
      0FE3  AREAINC   EQU H'FE3'
      0FDE  WETINC    EQU H'FDE'
      0FFD  TSTSPD    EQU H'FFD'
      0FD3  KMLOW     EQU H'FD3'
      0FE5  AREAAC    EQU H'FE5'
      0FF1  MATDEN    EQU H'FF1'
      0FE8  APRATE    EQU H'FE8'
      0FE0  WEIGHT    EQU H'FE0'
            *
      0000  CON6      RORG 0
                      ENTRY MODETB,DPX4
                      ENTRY DPTBL,SR1,CONST
                      ENTRY VGSUM,COMP2S,SHRES
                      ENTRY BCDBIN,BINBCD
                      ENTRY PWTBL,PWTBL1,SHREM,DELAY1
            *
            *****************************************************
            *
            *
            * MODE               #
            *
            * APRATE             0
            * SPEED              1
            * TOTAL APPLIED      2
            * AREA               3
            * TEST SPEED         4
            * TEST APPL.RATE     5
            * TEST RPM           6
            * TEST COUNTS        7
            *
            * SETUP MODE         #
            *
            * APRATE             0
            * APRATE(STEP)       1
            * SPREAD CONST.      2
            * MAT. DENSITY       3
            * TEST SPEED         4
            * SPREAD WIDTH       5
            * FINE TUNE %        6
            * DIST. CALIB.       7
            *
            **************************************************
                      ENTRY SHIFT8,DIGTBL
            *
            *****************************************************
            *
            *  NOW DO SUBRUTINES AND TABLES
            *
            *****************************************************
            *
```

```
                0065  *   SHIFT8 IS USED TO PUT OUT 7SEGMENT DIGIT INFO
                0066  *
0000 08         0067  SHIFT8   LR   K,P
0001 78         0068           LIS  8
0002 54         0069           LR   4,A
0003 2080       0070           LI   H'80'          ADD IN DP AND COLON CODE
0005 F6         0071           NS   6
0006 88         0072           AM
0007 18         0073           COM
0008 55         0074  Q4       LR   5,A
0009 2180       0075           NI   H'80'
000B B4         0076           OUTS 4
000C 45         0077           LR   A,5
000D 13         0078           SL   1
000E 34         0079           DS   4
000F 94F8  0008 0080           BNZ  Q4
0011 46         0081           LR   A,6
0012 13         0082           SL   1
0013 56         0083           LR   6,A
0014 0C         0084           PK
                0085  *
                0086  *   DELAY1 IS AN APPROXIMATLY 1.5 SEC DELAY
                0087  *
0015 08         0088  DELAY1   LR   K,P
0016 70         0089           CLR
0017 52         0090           LR   2,A
0018 73         0091           LIS  3
0019 53         0092           LR   3,A
001A 54         0093           LR   4,A
001B 32         0094  DEL1     DS   2
001C 94FE  001B 0095           BNZ  DEL1
001E 33         0096           DS   3
001F 94FB  001B 0097           BNZ  DEL1
0021 34         0098           DS   4
0022 94F8  001B 0099           BNZ  DEL1
0024 0C         0100           PK        RETURN
                0101  *
                0102  *   DIGTBL IS THE DIGIT LOOK UP TABLE
                0103  *
                0104  *   BIT 7 6 5 4 3 2 1 0
                0105  *   SEG.0 G F E D C B A
                0106  *
0025 3F         0107  DIGTBL   DC   H'3F'  = 0
0026 06         0108           DC   H'06'  = 1
0027 5B         0109           DC   H'5B'  = 2
0028 4F         0110           DC   H'4F'  = 3
0029 66         0111           DC   H'66'  = 4
002A 6D         0112           DC   H'6D'  = 5
002B 7D         0113           DC   H'7D'  = 6
002C 07         0114           DC   H'07'  = 7
002D 7F         0115           DC   H'7F'  = 8
002E 6F         0116           DC   H'6F'  = 9
002F 00         0117           DC   H'00'  = BLANK
0030 40         0118           DC   H'40'  = -
                0119  *
                0120  *   MODETABLE IS USED TO KEEP FRONT PANEL SWITCH
                0121  *   CHANGES FROM AFFECTING PROGRAM
                0122  *
0031 04         0123  MODETB   DC   4
0032 02         0124           DC   2
0033 05         0125           DC   5
0034 01         0126           DC   1
0035 07         0127           DC   7
0036 03         0128           DC   3
0037 06         0129           DC   6
0038 00         0130           DC   0
0039 0D         0131           DC   H'D'
003A 0A         0132           DC   H'A'
003B 0E         0133           DC   H'E'
003C 09         0134           DC   9
003D 0C         0135           DC   H'C'
003E 0B         0136           DC   H'B'
003F 0F         0137           DC   H'F'
```

```
0040 08              0138              DC 8
                     0139    *
                     0140    * DPX4 AND DPTBL ARE USED TO PUT UP DECIMAL POINTS
                     0141    * ON DISPLAY
                     0142    *
                     0143    *    H'20' = 00.00
                     0144    *    H'10' = 000.0
                     0145    *    H'00' = 0000
                     0146    *    H'40' = 00000
                     0147    *
0041 20              0148    DPX4    DC H'20'
0042 10              0149    DPTBL   DC H'10'
0043 00              0150            DC H'00'
0044 40              0151            DC H'40'
0045 10              0152            DC H'10'
0046 10              0153            DC H'10'
0047 00              0154            DC H'00'
0048 00              0155            DC H'00'
0049 10              0156            DC H'10'
004A 00              0157            DC 0
004B 10              0158            DC H'10'
004C 00              0159            DC 0
004D 00              0160            DC 0
004E 10              0161            DC H'10'
004F 00              0162            DC 0
0050 00              0163            DC 0
0051 10              0164            DC H'10'
                     0165    *
                     0166    *  SR1 IS A PROGRAM THAT ASSUMES THAT ISAR IS
                     0167    *  POINTING AT THE LOW BYTE OR A 2 BYTE REGISTER.
                     0168    *  IT SHIFTS THE REGISTER RIGHT 1 PLACE AND
                     0169    *  LEAVES ISAR POINTING AT HIGH BYTE
                     0170    *
0052 08              0171    SR1     LR K,P
0053 4C              0172            LR A,S
0054 12              0173            SR 1
0055 5D              0174            LR I,A
0056 4E              0175            LR A,D
0057 15              0176            SL 4
0058 12              0177            SR 1
0059 15              0178            SL 4
005A CC              0179            AS S
005B 5D              0180            LR I,A
005C 4C              0181            LR A,S
005D 12              0182            SR 1
005E 5C              0183            LR S,A
005F 0C              0184            PK
                     0185    *
                     0186    *  PWTBL IS A TABLE USED FOR MULTIPLING A CONST
                     0187    *  TIMES A POWER OF TEN SO IT'S D.P. IS IN THE
                     0188    *  RIGHT PLACE
                     0189    *
                     0190    *  PWTBL1 IS A DIFFERENT ENTRY POINT FOR THIS
                     0191    *  SAME TABLE
                     0192    *
0060 20C6A7          0193            DC H'20C6A7'    =.00001
0063 1DB7D1          0194            DC H'1DB7D1'    =.0001
0066 191283          0195            DC H'191283'    =.001
0069 16D7A3          0196    PWTBL1  DC H'16D7A3'    =.01
006C 13CDCC          0197            DC H'13CDCC'    =.1
006F 0F0080          0198    PWTBL   DC H'0F0080'    =1
0072 0C00A0          0199            DC H'0C00A0'    =10
0075 0900C8          0200            DC H'0900C8'    =100
0078 0600FA          0201            DC H'0600FA'    =1000
                     0202    *
                     0203    * PUT DC0 AT LOCATION OF CONST POINTED TO BY
                     0204    * MODE REG.
                     0205    *
007B 08              0206    CONST   LR K,P
007C 62              0207            LISU 2
007D 6F              0208            LISL 7
007E 77              0209            LIS 7
007F FC              0210            NS S
```

```
0080 54             0211           LR 4,A
0081 C4             0212           AS 4
0082 C4             0213           AS 4
0083 2A0FE8 0FE8    0214           DCI H'FE8'
0086 8E             0215           ADC
0087 0C             0216           PK     RETURN
                    0217  *
                    0218  *   VGSUM ADDS UP 8LONG STACK OF VG
                    0219  *   AND PUTS RESULT IN R70-71 (MPCAND)
                    0220  *
0088 08             0221  VGSUM    LR K,P
0089 2A0FC0 0FC0    0222           DCI VGSTAC
008C 78             0223           LIS 8 LOAD # OF 16BIT BYTES
008D 52             0224           LR 2,A
008E 67             0225           LISU 7
008F 68             0226           LISL 0
0090 70             0227           CLR    CLR MPCAND
0091 5D             0228           LR I,A
0092 5E             0229           LR D,A
0093 16             0230  ADD8     LM
0094 CC             0231           AS S
0095 5D             0232           LR I,A
0096 4C             0233           LR A,S
0097 19             0234           LNK
0098 88             0235           AM
0099 5E             0236           LR D,A
009A 32             0237           DS 2  DEC # OF BYTES CTR.
009B 94F7    0093   0238           BNZ ADD8
009D 69             0239           LISL 1           LEAVE POINTING AT HI BYTE
009E 0C             0240           PK     DONE- RETURN
                    0241  *
                    0242  *   COMP2S DOES A 2SCOMP ON TWO REGISTERS AND
                    0243  *   PUTS RESULT IN REG 2-3
                    0244  *
009F 08             0245  COMP2S   LR K,P
00A0 4E             0246           LR A,D
00A1 18             0247           COM
00A2 53             0248           LR 3,A
00A3 4D             0249           LR A,I           LEAVE POINTING AT HIGH BYTE
00A4 18             0250           COM
00A5 1F             0251           INC
00A6 52             0252           LR 2,A
00A7 43             0253           LR A,3
00A8 19             0254           LNK
00A9 53             0255           LR 3,A
00AA 0C             0256           PK     RETURN
                    0257  *
                    0258  *
                    0259  *   SHREM IS USED TO SHIFT A FLOATING POINT#
                    0260  *   SO THE FRACTIONAL PART IS THE MSBIT IN THE
                    0261  *   THE TWO BYTE RESULT
                    0262  *
00AB 08             0263  SHREM    LR K,P
00AC 66             0264           LISU 6
00AD 68             0265           LISL 0           GET EXP
00AE 4C             0266           LR A,S
00AF 52             0267           LR 2,A
00B0 67             0268           LISU 7
00B1 6D             0269           LISL 5
00B2 4D             0270           LR A,I
00B3 53             0271           LR 3,A
00B4 4C             0272           LR A,S
00B5 54             0273           LR 4,A
00B6 42             0274           LR A,2
00B7 25F0           0275           CI H'F0'
00B9 840F    00C9   0276           BZ SHR4
00BB 60             0277           LISU 0
00BC 6B             0278           LISL 3
00BD 2410           0279           AI 16
00BF 900B    00CB   0280           BR SHR8
                    0281  *
                    0282  *   SHIFT RESULT BY NUMBER IN EXP.
                    0283  *
```

```
                0284  *
00C1 08         0285  SHRES   LR    K,P
00C2 66         0286          LISU  6           SHIFT RESULT TILL
00C3 68         0287          LISL  0           R60 IS ZERO
00C4 70         0288          CLR
00C5 CC         0289          AS    S
00C6 67         0290          LISU  7
00C7 9402  00CA 0291          BNZ   SHR1
00C9 0C         0292  SHR4    PK                ZERO-RETURN
00CA 6D         0293  SHR1    LISL  5
00CB 52         0294  SHR3    LR    2,A
00CC 8113  00E0 0295          BP    SHR2
00CE 4C         0296          LR    A,S         LESS THAN 0; SHIFT RIGHT
00CF 12         0297          SR    1
00D0 5D         0298          LR    I,A
00D1 4E         0299          LR    A,D
00D2 15         0300          SL    4
00D3 12         0301          SR    1
00D4 15         0302          SL    4
00D5 EC         0303          XS    S
00D6 5D         0304          LR    I,A
00D7 4C         0305          LR    A,S
00D8 12         0306          SR    1
00D9 5E         0307          LR    D,A
00DA 42         0308          LR    A,2
00DB 1F         0309          INC
00DC 84EC  00C9 0310          BZ    SHR4
00DE 90EC  00CB 0311          BR    SHR3
                0312  *
                0313  *
00E0 4C         0314  SHR2    LR    A,S         GREATER THAN 0: SHIFT LEFT
00E1 CC         0315          AS    S
00E2 5D         0316          LR    I,A
00E3 4C         0317          LR    A,S
00E4 19         0318          LNK
00E5 CC         0319          AS    S
00E6 5E         0320          LR    D,A
00E7 32         0321          DS    2
00E8 94F7  00E0 0322          BNZ   SHR2
00EA 0C         0323          PK
                0324  *
                0325  ****************************************************
                0326  *
                0327  *   THIS PROGRAM CONVERT BCD (I.E. DECIMAL) NUMBERS
                0328  *   TO BINARY
                0329  *
                0330  *   IT USES REG. 2,3,4,AND 5  ALSO Q-REG. AND DC0
                0331  *   THE NUMBER IT CONVERTS IS HELD IN REG. 72-73
                0332  *
                0333  *
00EB 08         0334  BCDBIN  LR    K,P
00EC 2A0123 0123 0335         DCI   HXTBL
00EF 0E         0336          LR    Q,DC
00F0 67         0337          LISU  7
00F1 6B         0338          LISL  3
00F2 70         0339          CLR
00F3 52         0340          LR    2,A
00F4 53         0341          LR    3,A
00F5 54         0342          LR    4,A
00F6 4C         0343  LP2     LR    A,S
00F7 14         0344          SR    4
00F8 8410  0109 0345          BZ    NEXT
00FA 55         0346  LP3     LR    5,A
00FB 0F         0347  L11     LR    DC,Q
00FC 44         0348          LR    A,4
00FD 13         0349          SL    1
00FE 8E         0350          ADC
                0351  *   NOW ADD HEX TABLE TO R2-3
00FF 42         0352          LR    A,2
0100 88         0353          AM
0101 52         0354          LR    2,A
0102 43         0355          LR    A,3
0103 19         0356          LNK
```

```
0104 88           0357           AM
0105 53           0358           LR    3,A
0106 35           0359           DS    5
0107 94F3  00FB   0360           BNZ   L11
0109 44           0361   NEXT    LR    A,4
010A 1F           0362           INC
010B 54           0363           LR    4,A
010C 2502         0364           CI    2
010E 84E7  00F6   0365           BZ    LP2
0110 2503         0366           CI    3
0112 8408  011B   0367           BZ    UNITS
0114 4E           0368           LR    A,D
0115 15           0369           SL    4
0116 14           0370           SR    4
0117 84F1  0109   0371           BZ    NEXT
0119 90E0  00FA   0372           BR    LP3
                  0373   *    NOW ADD UNITS AND RETURN
011B 7F           0374   UNITS   LIS   H'0F'
011C FC           0375           NS    S
011D C2           0376           AS    2
011E 52           0377           LR    2,A
011F 43           0378           LR    A,3
0120 19           0379           LNK
0121 53           0380           LR    3,A
0122 0C           0381           PK              RETURN
0123 E803         0382   HXTBL   DC    H'E803'
0125 6400         0383           DC    H'6400'
0127 0A00         0384           DC    H'0A00'
                  0385   *
                  0386   *  THIS PROGRAM CONVERTS BINARY NUMBERS TO BCD
                  0387   *  IT USES REG. 2 AND 3 FOR RESULT
                  0388   *  IT USES REG 70-71
                  0389   *  THE NUMBER TO BE CONVERTED IS IN R72-73
                  0390   *
0129 08           0391   BINBCD  LR    K,P        BINARY # IN MPIER
012A 71           0392           LIS   1
012B 52           0393           LR    2,A
012C 70           0394           CLR              R2 IS LO ADDER
012D 53           0395           LR    3,A        R3 IS HI ADDER
012E 67           0396           LISU  7
012F 68           0397           LISL  0
0130 5D           0398           LR    I,A
0131 5D           0399           LR    I,A
                  0400   *
                  0401   *   REMOVE DP POSITION BITS
                  0402   *
0132 6B           0403           LISL  3
0133 203F         0404           LI    H'3F'
0135 FC           0405           NS    S
0136 5E           0406           LR    D,A
0137 4D           0407   HXT1    LR    A,I
0138 CE           0408           AS    D
0139 19           0409           LNK
013A 842A  0165   0410           BZ    HXT2       BINARY 0 YET
013C 71           0411           LIS   1
013D FC           0412           NS    S
013E 840D  014C   0413           BZ    HXT3
0140 68           0414           LISL  0
0141 2066         0415           LI    H'66'
0143 CC           0416           AS    S
0144 D2           0417           ASD   2
0145 5D           0418           LR    I,A
0146 43           0419           LR    A,3
0147 19           0420           LNK
0148 2466         0421           AI    H'66'
014A DC           0422           ASD   S
014B 5D           0423           LR    I,A
014C 4C           0424   HXT3    LR    A,S
014D 12           0425           SR    1
014E 5D           0426           LR    I,A
014F 4E           0427           LR    A,D
0150 15           0428           SL    4
0151 12           0429           SR    1
```

```
0152 15            0430            SL    4
0153 EC            0431            XS    S
0154 5D            0432            LR    I,A
0155 4C            0433            LR    A,S
0156 12            0434            SR    1
0157 5E            0435            LR    D,A
0158 42            0436            LR    A,2
0159 2466          0437            AI    H'66'
015B D2            0438            ASD   2
015C 52            0439            LR    2,A
015D 43            0440            LR    A,3
015E 19            0441            LNK
015F 2466          0442            AI    H'66'
0161 D3            0443            ASD   3
0162 53            0444            LR    3,A
0163 90D3     0137 0445            BR    HXT1
0165 68            0446 HXT2       LISL  0
0166 4D            0447            LR    A,I
0167 52            0448            LR    2,A
0168 4C            0449            LR    A,S
0169 53            0450            LR    3,A
016A 0C            0451            PK
                   0452            END

THIS FILE ON DISK (CONT7,0) 100% DRIVE
ERRS  LOC OBJECT ADDR LINE              SOURCE STATEMENT

                        0001        TITLE 'THIS FILE ON DISK (CONT7,0) 100% DRIVE'
                        0002  *
                        0003  *     STARTING DATE 7\21\80
                        0004  *
                        0005  *     REVISION DATE 4\6\82
                        0006  *     VERSION #2
                        0007  *
                        0008  *     AUTHOR: STEVE STONE
                        0009  *
                        0010  *
                   0000 0011  CON7       RORG 0
                        0012             ENTRY FLOAT
                        0013  *
                        0014  *
                        0015  ***************************************************
                        0016  *
                        0017  *     NOW DO FLOATING POINT PROCESSOR
                        0018  *
                        0019  ****************************************************
                        0020  *
                        0021  *
      0000 1A           0022  FLOAT      DI
      0001 08           0023             LR K,P
      0002 00           0024             LR A,KU
      0003 5A           0025             LR 10,A
      0004 01           0026             LR A,KL
      0005 5B           0027             LR 11,A
      0006 10           0028             LR DC,H
      0007 1B           0029             EI
      0008 16           0030  FLOAT1     LM             GET ADDRESS DATA
      0009 2C           0031             XDC   SAVE DATA ADDRESS
      000A 2A0015 0015  0032             DCI FLTADS
      000D 13           0033             SL 1
      000E 8E           0034             ADC
      000F 16           0035             LM
      0010 04           0036             LR KU,A
      0011 16           0037             LM
      0012 05           0038             LR KL,A
      0013 2C           0039             XDC    POINT DCO AT DATA
      0014 0C           0040             PK     GO TO ROUTINE
                        0041  *
                        0042  *     NEXT IS A TABLE OF SUBROUTINE ADDRESSES
                        0043  *
      0015 0035         0044  FLTADS     DC AL2(POP)     =0
      0017 0045         0045             DC AL2(DCI)     =1
```

```
0019 004B       0046           DC   AL2(DC7273) =2
001B 0056       0047           DC   AL2(DC7071) =3
001D 0062       0048           DC   AL2(MVITMC) =4
001F 0059       0049           DC   AL2(MVITMP) =5
0021 006E       0050           DC   AL2(MVRTMC) =6
0023 0079       0051           DC   AL2(MVRTMP) =7
0025 00AD       0052           DC   AL2(MULT)   =8
0027 00F3       0053           DC   AL2(DIVIDE) =9
0029 00AA       0054           DC   AL2(ADDEXP) =10
002B 00A1       0055           DC   AL2(SUBEXP) =11
002D 0081       0056           DC   AL2(NRMLZ)  =12
002F 009D       0057           DC   AL2(NRM14)  =13
0031 0037       0058           DC   AL2(EXPR60) =14
0033 003D       0059           DC   AL2(EXPR2)  =15
                0060     *
                0061     *     NOW RETURN TO CALLING PROGRAM
                0062     *
0035 0E         0063     POP    LR Q,DC
0036 0D         0064            LR P0,Q
                0065     *
                0066     *     NOW PUT BEGINNING EXPONENT IN R60
                0067     *
0037 66         0068     EXPR60 LISU 6
0038 68         0069            LISL 0
0039 16         0070            LM
003A 5C         0071            LR S,A
003B 90CC  0008 0072            BR FLOAT1
                0073     *
                0074     *     NOW PUT EXPONENT OF CONSTANT IN R2
                0075     *
003D 2C         0076     EXPR2  XDC
003E 0F         0077            LR DC,Q
003F 16         0078            LM
0040 0E         0079            LR Q,DC
0041 52         0080            LR 2,A
0042 2C         0081            XDC
0043 90C4  0008 0082            BR FLOAT1
                0083     *
                0084     *     NOW PUT DC0 DATA IN QU AND QL
                0085     *
0045 16         0086     DCI    LM
0046 06         0087            LR QU,A
0047 16         0088            LM
0048 07         0089            LR QL,A
0049 90BE  0008 0090            BR FLOAT1
                0091     *
                0092     *     MOVE DATA AT DC0 TO REG 72-73
                0093     *
004B 6A         0094     DC7273 LISL 2
004C 67         0095     DC1    LISU 7
004D 2C         0096            XDC
004E 0F         0097            LR DC,Q
004F 16         0098            LM
0050 5D         0099            LR I,A
0051 16         0100            LM
0052 5C         0101            LR S,A
0053 2C         0102            XDC
0054 90B3  0008 0103            BR FLOAT1
                0104     *
                0105     *     MOVE DATA AT DC0 TO REG 70-71
                0106     *
0056 68         0107     DC7071  LISL 0
0057 90F4  004C 0108            BR DC1
                0109     *
                0110     *     MVITMP AND MVITMC ARE PROGRAMS WHICH PUT DATA
                0111     *     AT ISAR INTO EITHER MPCAND OR MPLIER
                0112     *
0059 16         0113     MVITMP LM
005A 0B         0114            LR IS,A
005B 40         0115            LR A,I
005C 52         0116            LR 2,A
005D 4C         0117            LR A,S
005E 67         0118            LISU 7
```

```
005F 6B              0119           LISL 3
0060 9008  0069 0120                BR   MVI1
0062 16         0121   MVITMC       LM
0063 0B         0122                LR   IS,A
0064 4D         0123                LR   A,I
0065 52         0124                LR   2,A
0066 4C         0125                LR   A,S
0067 67         0126                LISU 7
0068 69         0127                LISL 1
0069 5E         0128   MVI1         LR   D,A
006A 42         0129                LR   A,2
006B 5D         0130                LR   I,A
006C 909B  0008 0131                BR   FLOAT1
                0132   *
                0133   *  MVRTMC IS A PROGRAM USED TO MOVE RESULT TO
                0134   *  MULTIPLCAND
                0135   *
006E 67         0136   MVRTMC       LISU 7
006F 6E         0137                LISL 6
0070 4E         0138                LR   A,D
0071 52         0139                LR   2,A
0072 4C         0140                LR   A,S
0073 68         0141                LISL 0
0074 5D         0142   MV1          LR   I,A
0075 42         0143                LR   A,2
0076 5C         0144                LR   S,A
0077 9090  0008 0145   FLOAT2       BR   FLOAT1
                0146   *
                0147   *  MVRTMP IS A PROGRAM USED TO MOVE RESULT TO
                0148   *  MULTIPLIER.
                0149   *
0079 67         0150   MVRTMP       LISU 7
007A 6E         0151                LISL 6
007B 4E         0152                LR   A,D
007C 52         0153                LR   2,A
007D 4C         0154                LR   A,S
007E 6A         0155                LISL 2
007F 90F4  0074 0156                BR   MV1
                0157   *
                0158   *   NORMALIZE # POINTED TO BY ISAR; EXP. RETURNED R2
                0159   *
0081 2080       0160   NRMLZ        LI   H'80'
0083 53         0161   NRM3         LR   3,A
0084 70         0162                CLR
0085 52         0163                LR   2,A
0086 CE         0164                AS   D
0087 CD         0165                AS   I
0088 19         0166                LNK
0089 9403  008D 0167                BNZ  NRM1        CHECK FOR ZERO
008B 90EB  0077 0168   NRM2         BR   FLOAT2
008D 43         0169   NRM1         LR   A,3
008E FE         0170                NS   D
008F 94FB  008B 0171                BNZ  NRM2
0091 4C         0172                LR   A,S
0092 CC         0173                AS   S
0093 5D         0174                LR   I,A
0094 4C         0175                LR   A,S
0095 19         0176                LNK
0096 CC         0177                AS   S
0097 5C         0178                LR   S,A
0098 42         0179                LR   A,2
0099 1F         0180                INC
009A 52         0181                LR   2,A         KEEP NUMBER OF SHIFTS
009B 90F1  008D 0182                BR   NRM1
009D 20E0       0183   NRM14        LI   H'E0'
009F 90E3  0083 0184                BR   NRM3
                0185   *
                0186   *
                0187   *   NOW ADD OR SUBTRACT EXPONIENTS
                0188   *
                0189   *
00A1 42         0190   SUBEXP       LR   A,2         SUBTRACT R2 FROM 60
00A2 18         0191                COM
```

```
00A3 1F            0192           INC
00A4 66            0193  SBX1     LISU 6
00A5 68            0194           LISL 0
00A6 CC            0195           AS S
00A7 5C            0196           LR S,A
00A8 90CE  0077    0197  FLOAT3   BR FLOAT2
                   0198  *
                   0199  *
00AA 42            0200  ADDEXP   LR A,2          ADD R2 TO R60
00AB 90F8  00A4    0201           BR SBX1
                   0202  *
                   0203  *************************************************
                   0204  *
                   0205  *  NOW DO 16 BY 16 BINARY MULTIPLY WITH 16 BIT RESULT
                   0206  *
                   0207  *************************************************
                   0208  *
00AD 67            0209  MULT     LISU 7
00AE 6C            0210           LISL 4          70-71 X 72-73 -> 75-76
00AF 2080          0211           LI H'80'
00B1 5D            0212           LR I,A          ROUND RESULT TO 16 BITS
00B2 70            0213           CLR
00B3 5D            0214           LR I,A
00B4 5D            0215           LR I,A
00B5 5C            0216           LR S,A          CLR BOTTOM OF MPCAND
00B6 70            0217  MUL2     CLR
00B7 6A            0218           LISL 2
00B8 CD            0219           AS I
00B9 CC            0220           AS S
00BA 19            0221           LNK   IS MPIER ZERO YET?
00BB 8435  00F1    0222           BZ MUL3
00BD 72            0223           LIS 2
00BE 52            0224           LR 2,A
00BF 6F            0225           LISL 7
00C0 4C            0226  MUL1     LR A,S          SHIFT MPCAND RIGHT
00C1 12            0227           SR 1
00C2 5D            0228           LR I,A
00C3 4E            0229           LR A,D
00C4 15            0230           SL 4
00C5 12            0231           SR 1
00C6 15            0232           SL 4
00C7 EC            0233           XS S
00C8 5D            0234           LR I,A
00C9 32            0235           DS 2
00CA 94F5  00C0    0236           BNZ MUL1
00CC 4C            0237           LR A,S
00CD 12            0238           SR 1
00CE 5C            0239           LR S,A
00CF 6B            0240           LISL 3          LOOK AT MSBIT OF MPLIER
00D0 70            0241           CLR
00D1 CC            0242           AS S
00D2 8114  00E7    0243           BP MUL4
00D4 6F            0244           LISL 7          WAS 1; ADD MPCAND TO RESULT
00D5 4C            0245           LR A,S
00D6 6C            0246           LISL 4
00D7 CC            0247           AS S
00D8 5C            0248           LR S,A
00D9 68            0249           LISL 0
00DA 4C            0250           LR A,S
00DB 19            0251           LNK
00DC 8204  00E1    0252           BC MUL5         IF CARRY HERE, DON'T
00DE 6D            0253           LISL 5          CHANGE RESULT BYTE
00DF CC            0254           AS S
00E0 5C            0255           LR S,A
00E1 69            0256  MUL5     LISL 1
00E2 4C            0257           LR A,S
00E3 19            0258           LNK
00E4 6E            0259           LISL 6
00E5 CC            0260           AS S
00E6 5C            0261           LR S,A          HI BYTE OF RESULT
00E7 6A            0262  MUL4     LISL 2
00E8 4C            0263           LR A,S          SHIFT MPLIER LEFT
00E9 CC            0264           AS S
```

```
00EA 5D              0265          LR I,A
00EB 4C              0266          LR A,S
00EC 19              0267          LNK
00ED CC              0268          AS S
00EE 5C              0269          LR S,A
00EF 90C6   00B6 0270              BR MUL2        NEXT
00F1 90B6   00A8 0271  MUL3        BR FLOAT3
                     0272  *
                     0273  ****************************************************
                     0274  *
                     0275  *   NOW DO 14 / 14 DIVIDE WITH 12 BIT RESULT
                     0276  *
                     0277  ****************************************************
                     0278  *
00F3 67              0279  DIVIDE  LISU 7
00F4 6D              0280          LISL 5
00F5 70              0281          CLR           CLR RESULT
00F6 5D              0282          LR I,A
00F7 5D              0283          LR I,A
00F8 6A              0284          LISL 2
00F9 4D              0285          LR A,I
00FA CC              0286          AS S
00FB 19              0287          LNK
00FC 843C   0139 0288              BZ DIV9        RETURN 0 IF DIVISOR=0
00FE 7C              0289          LIS 12
00FF 52              0290          LR 2,A         R2 IS BIT COUNTER
0100 9011   0112 0291              BR DIV2        SKIP SHIFT FIRST TIME
0102 68              0292  DIV1    LISL 0
0103 4C              0293          LR A,S
0104 CC              0294          AS S  SHIFT NUMERATOR LEFT
0105 5D              0295          LR I,A
0106 4C              0296          LR A,S
0107 19              0297          LNK
0108 CC              0298          AS S
0109 5C              0299          LR S,A
010A 6D              0300          LISL 5         SHIFT QUOTIENT LEFT
010B 4C              0301          LR A,S
010C CC              0302          AS S
010D 5D              0303          LR I,A
010E 4C              0304          LR A,S
010F 19              0305          LNK
0110 CC              0306          AS S
0111 5C              0307          LR S,A
0112 6A              0308  DIV2    LISL 2         SUBTRACT DIVISOR
0113 4C              0309          LR A,S
0114 18              0310          COM   FROM NUMERATOR
0115 1F              0311          INC
0116 1A              0312          DI
0117 1E              0313          LR J,W
0118 68              0314          LISL 0
0119 CC              0315          AS S
011A 53              0316          LR 3,A         LO BYTE OF RESULT
011B 9202   011E 0317              BNC DIV3
011D 1E              0318          LR J,W
011E 6B              0319  DIV3    LISL 3
011F 4C              0320          LR A,S
0120 18              0321          COM
0121 1D              0322          LR W,J
0122 19              0323          LNK
0123 1E              0324          LR J,W
0124 69              0325          LISL 1
0125 CC              0326          AS S
0126 8204   012B 0327              BC DIV4        HI BYTE OF RESULT IN ACC
0128 1D              0328          LR W,J
0129 920B   0135 0329              BNC DIV5
012B 5E              0330  DIV4    LR D,A         CARRY OUT! SAVE IT
012C 43              0331          LR A,3
012D 5C              0332          LR S,A
012E 71              0333          LIS 1  ADD 1 TO QUOTIENT
012F 6D              0334          LISL 5
0130 CC              0335          AS S
0131 5D              0336          LR I,A
0132 4C              0337          LR A,S
```

```
0133 19          0338          LNK
0134 5C          0339          LR S,A
0135 1B          0340  DIV5    EI
0136 32          0341          DS 2
0137 94CA   0102 0342          BNZ DIV1
0139 90B7   00F1 0343  DIV9    BR MUL3
                 0344  *
                 0345  *
                 0346          END
```

The invention is claimed as follows:

1. An improvement in a control system for a mobile material distribution apparatus including ground speed sensor means for developing a signal corresponding to the ground speed of the mobile apparatus, distributing means for spreading said material along the path of travel of the mobile apparatus, variable rate delivery means for delivering material at a controllably variable rate to said distributing means, delivery rate sensor means for developing a signal corresponding to the actual rate of delivery of material to said distributing means, and desired distribution rate control means for developing a signal corresponding to a desired distribution rate of material per unit area; said control system comprising: calculating circuit means responsive to said ground speed signal, to said actual delivery rate signal and to said desired distribution rate signal for periodically calculating a desired delivery rate of material to the distributing means necessary to achieve said desired distribution rate and for periodically calculating the difference between said desired delivery rate and said actual delivery rate and developing a corresponding difference signal; and control signal producing means responsive to each said difference signal for developing a control signal; said variable rate delivery means being responsive to said control signal for varying the delivery rate of material to said distributing means in the amount necessary to achieve said desired material delivery rate, so as to achieve and thereafter maintain said desired distribution rate; the improvement comprising: said control signal producing means further including means responsive to values of said differences signal within a predetermined range of values for developing said control signal as a cyclical signal having a duty cycle which varies in a predetermined fashion in accordance with the value of said difference signal; and means responsive to values of said difference signal which are below said predetermined range of values for accumulating said periodically developed difference signals until the sum of the values of the accumulated difference signals is within said predetermined range of values and for thereafter developing said cyclical, variable duty cycle control signal in accordance with the value of said sum.

2. The improvement according to claim 1 wherein said control signal producing means further includes means responsive to values of said difference signal above said predetermined range of values for developing said control signal at a predetermined, substantially continuous level until said difference signal returns to a value within said predetermined range of values.

3. The improvement according to claim 1 wherein said desired rate control means further includes means for selectively developing a percentage variation signal; and wherein said calculating means is responsive to said percentage variation signal for varying the desired distribution rate signal by an amount less than or equal to a predetermined percentage thereof in either direction; so as to achieve and maintain said desired distribution rate substantially without regard for variations in the nominal operating characteristics of said material distribution apparatus.

4. The improvement according to claim 1 and further including operator accessible manual control means for controlling said variable rate delivery means directly to achieve and maintain said desired distribution rate.

5. The improvement according to claim 2 wherein said desired rate control means further includes means for developing a percentage variation signal for varying the desired distribution rate signal by an amount less than or equal to a predetermined percentage thereof in either direction so as to achieve and maintain said desired distribution rate substantially without regard for variations in the nominal operating characteristics of said material distribution apparatus.

6. The improvement according to claim 5 and further including operator accessible manual control means for controlling said variable rate delivery means directly to achieve and maintain said desired distribution rate.

7. The improvement according to claim 1 wherein said cyclical signal developing means is further operative in response to values of said difference signal within said predetermined range of values for developing said control signal as a predetermined plurality of incrementally variable duty cycle signals, each duty cycle signal occurring in one of a corresponding plurality of successive periods of predetermined duration, the number of increments of said duty cycle signal in each said period being at least as great as the integer part of a quotient defined by the value of said difference signal divided by the number of periods, any fractional part of said quotient resulting in the addition of one increment to said duty cycle control signal in each of one or more of said periods up to the number of added increments equal to the dividend of said fractional part.

8. A control system for a mobile material distribution apparatus including ground speed sensor means for developing a signal corresponding to the ground speed of the mobile apparatus, distributing means for spreading said material along the path of travel of the mobile apparatus, variable rate delivery means for delivering material at a controllably variable rate to said distributing means, delivery rate sensor means for developing a signal corresponding to the actual rate of delivery of material to said distributing means, and desired distribution rate control means for developing a signal corresponding to a desired distribution rate of material per unit area, said control system comprising: control circuit means responsive to said ground speed signal, to said actual delivery rate signal and to said desired distribution rate signal for periodically calculating a desired delivery rate of material to the distributing means necessary to achieve said desired distribution rate and for periodically developing a difference signal corresponding to the difference between said desired delivery rate and said actual delivery rate; and control signal producing means responsive to each said difference signal for developing a control signal; said variable rate delivery means being responsive to said control signal for varying the delivery rate of material to said distributing means in the amount necessary to achieve said desired material delivery rate, so as to achieve and thereafter maintain said desired distribution rate; wherein said control signal producing means is responsive to values of said difference signal within a predetermined range of values for developing said control signal as a cyclical signal having a duty cycle which varies in a predetermined fashion in accordance with the value of said difference signal; said control signal producing means being further responsive to values of said difference signal which are below said predetermined range of values for accumulating said periodically developed difference signals until the sum of the values of the accumulated difference signals is within said predetermined range of values and for thereafter developing said cyclical, variable duty cycle control signal in accordance with the value of said sum.

9. The control system according to claim 8 wherein said control signal producing means is further responsive to values of said difference signal above said predetermined range of values for developing said control signal at a predetermined, substantially continuous level until said difference signal returns to a value within said predetermined range of values.

10. The control system according to claim 8 wherein said desired rate control means further includes means for selectively developing a percentage variation signal; and wherein said control circuit means is responsive to said percentage variation signal for varying the desired distribution rate signal by an amount less than or equal to a predetermined percentage thereof in either direction; so as to achieve and maintain said desired distribution rate substantially without regard for variations in the nominal operating characteristics of said material distribution apparatus.

11. The control system according to claim 8 and further including operator accessible manual control means for controlling said variable rate delivery means directly to achieve and maintain said desired distribution rate.

12. The control system according to claim 8 wherein said control signal producing means is further operative in response to values of said difference signal within said predetermined range of values for developing said control signal as a plurality of incrementally variable duty cycle signals, each duty cycle signal occurring in one of a corresponding plurality of successive periods of predetermined duration, the number of increments of said duty cycle signal in each said period being a least as great as the integer part of a quotient defined by the value of said difference signal divided by the number of periods, any fractional part of said quotient resulting in the addition of one increment to said duty cycle control signal in each of one or more of said periods up to the number of added increments equal to the dividend of said fractional part.

* * * * *